(12) United States Patent
Moriyama et al.

(10) Patent No.: US 8,757,664 B2
(45) Date of Patent: Jun. 24, 2014

(54) STEERING COLUMN APPARATUS

(75) Inventors: Seiichi Moriyama, Gunma (JP); Shin Mihara, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 13/391,883

(22) PCT Filed: Jan. 24, 2012

(86) PCT No.: PCT/JP2012/051475
§ 371 (c)(1),
(2), (4) Date: Mar. 11, 2013

(87) PCT Pub. No.: WO2012/114812
PCT Pub. Date: Aug. 30, 2012

(65) Prior Publication Data
US 2013/0160595 A1    Jun. 27, 2013

(51) Int. Cl.
*B62D 1/18*        (2006.01)
*B62D 1/184*       (2006.01)
*B62D 1/185*       (2006.01)

(52) U.S. Cl.
CPC ............... *B62D 1/184* (2013.01); *B62D 1/185* (2013.01)
USPC ............................................. 280/775; 74/493

(58) Field of Classification Search
CPC ........... F16F 7/125; B62D 1/18; B62D 1/184; B62D 1/185; B62D 1/19; B62D 1/192
USPC .................... 74/492, 493; 280/775, 777, 779
See application file for complete search history.

(56) References Cited

U.S. PATENT DOCUMENTS

| | | | |
|---|---|---|---|
| 5,476,284 A * | 12/1995 | DuRocher et al. | 280/777 |
| 5,787,759 A | 8/1998 | Olgren | |
| 5,845,936 A * | 12/1998 | Higashino | 280/775 |
| 8,505,407 B2 * | 8/2013 | Nomura et al. | 74/493 |
| 8,590,933 B2 * | 11/2013 | Narita et al. | 280/777 |
| 8,601,901 B2 * | 12/2013 | Ishii et al. | 74/493 |
| 2004/0261565 A1 | 12/2004 | Uphaus et al. | |
| 2007/0234838 A1 * | 10/2007 | Sadakata | 74/492 |
| 2011/0036198 A1 | 2/2011 | Minamigata | |

FOREIGN PATENT DOCUMENTS

| | | |
|---|---|---|
| GB | 2352285 | 1/2001 |
| JP | 10-035511 | 2/1998 |
| JP | 2001322552 | 11/2001 |
| JP | 2006-232103 | 9/2006 |
| JP | 2006255785 | 9/2006 |

(Continued)

*Primary Examiner* — Paul N Dickson
*Assistant Examiner* — Timothy Wilhelm
(74) *Attorney, Agent, or Firm* — Hartman Global IP Law; Gary M. Hartman; Domenica N. S. Hartman

(57) ABSTRACT

Construction is achieved capable of stably maintaining an inner column 43 on the inner diameter side of an outer column 42. The outer column 42, including a support section 46 is formed by using hydroforming to swell a hollow tube outward in the radial direction. A displacement bracket 34 is also integrally formed with the outer column 42 by tube swelling. Furthermore, raised sections 47a, 47b of the support section 46 are formed at three or more location in the circumferential direction on the inner circumferential surface of the outer column 42, and these raised sections 47a, 47b and the outer circumferential surface of the inner column 43 come in contact with each other at three or more locations in the circumferential direction.

10 Claims, 43 Drawing Sheets

(56) References Cited

FOREIGN PATENT DOCUMENTS

| | | |
|---|---|---|
| JP | 2007069821 | 3/2007 |
| JP | 2007-203881 | 8/2007 |
| JP | 2008-030542 | 2/2008 |
| JP | 2008302751 | 12/2008 |
| JP | 10-52639 | 3/2010 |
| JP | 2011005896 | 1/2011 |

* cited by examiner (b)

(a)  (b)

(a)　　　　　　　　(b)

(A)

(B)

(C)

(D)

STEERING COLUMN APPARATUS

TECHNICAL FIELD

The present invention relates to a steering column apparatus that is applied to a telescopic steering apparatus comprising a telescopic mechanism for adjusting the forward/backward position of a steering wheel.

BACKGROUND ART

As illustrated in FIG. 46, a steering apparatus for an automobile is constructed so that rotation of a steering wheel 1 is transmitted to an input shaft 3 of a steering unit 2, and as the input shaft 3 rotates, a pair of left and right tie rods 4 are pushed or pulled, applying a steering angle to the front wheels. The steering wheel 1 is supported by and fastened to the rear end section of a steering shaft 5, and with this steering shaft inserted in the axial direction through a cylindrical shape steering column 6, the steering shaft 5 is supported by the steering column 6 so as to be able to rotate freely. Moreover, the front end section of the steering shaft 5 is connected to the rear end section of an intermediate shaft 8 by way of a universal joint 7, and the front end section of this intermediate shaft 8 is connected to the input shaft 3 by way of a separate universal joint 9.

Conventionally, in this kind of steering apparatus, a tilt mechanism for adjusting the up/down position of the steering wheel 1 and/or or a telescopic mechanism for adjusting the forward/backward position of the steering wheel 1 according to the size and driving posture of the driver have been widely known. In order to construct the tilt mechanism, the steering column 6 is supported by the vehicle body 10 so as to be able to pivot around a pivot shaft 11 that is arranged in the width direction. In order to construct the telescopic mechanism that can displace in the forward/backward direction, the steering column 6 is constructed by combining an outer column 13 and an inner column 14 so as to be able to expand and contract freely in a telescopic manner, and the steering shaft 5 is constructed by combining an outer shaft (outer tube) 15 and an inner shaft 16 with a spline fit or the like such that torque can be freely transmitted, and so as to be able to expand and contract freely. A displacement bracket that is fastened to the portion of the steering column 6 near the rear end section is supported by a support bracket 12 that is supported by the vehicle body 10 such that the displacement bracket can displace in the up/down direction and forward/backward direction. Here, the width direction means the width direction of the vehicle, and corresponds to the left/right direction. Also, the forward/backward direction is the forward/backward direction of the vehicle. In the example illustrated in the figure, in order to reduce the force required for operating the steering wheel 1, an electric power steering apparatus, having an electric motor 17 as the source of assist power, is also assembled in the steering apparatus.

In a steering apparatus that comprises a tilt mechanism and a telescopic mechanism, construction is necessary wherein the position of the steering wheel 1 can be adjusted, and can be fastened at the adjusted position. FIG. 47 and FIG. 48 illustrate construction that is disclosed in JP2001-322552(A) wherein by rotating a rod shaped member 19 by an adjustment lever 18, the dimension in the width direction of a cam apparatus 20 is expanded or contracted, and at the same time a cam member 21 pivots and displaces. In this construction, due to the expansion or contraction of the cam apparatus 20, it is possible for a displacement bracket 22 that is fastened to the outer column 13a to engage with or disengage from a fastening bracket 12a. Moreover, it is possible to switch whether or not to allow relative movement of the inner column 14a with respect to the outer column 13 according to the pivotal displacement of the cam member 21.

The outer column 13a and inner column 14a of the steering column 6a of this kind of steering apparatus fit together such that the inner circumferential surface on the portion near the front end of the outer column 13a and the outer surface of the portion near the rear end of the inner column 14a are capable of relative displacement in the axial direction. Moreover, when the manufacturing the outer column 13a, first the main outer column is formed by aluminum die casting. After that, the inner circumferential surface of the main outer column is machined and finished. On the other hand, the displacement bracket 22 is formed separate from the outer column 13a, and integrally joined and fastened to the part of the outer column 13a by welding.

In the case of this kind of steering apparatus, it is necessary to finish the inner diameter of the outer column 13a with good precision, however, there is a problem in that the machining work is troublesome and costly. Furthermore, the inner circumferential surface of the outer column 13a and the outer circumferential surface of the inner column 14 fit all the way around, so in the case that the precision of the inner diameter of the outer column 13a is not sufficient, there is a problem in that the columns may become off centered, and the inner column 14a cannot be stably held on the inner-diameter side of the outer column 13a.

FIG. 49 illustrates construction that is disclosed in JP2008-302751(A), wherein raised sections 23 that protrude inward in the radial direction from the inner circumferential surface of the outer column 13b are formed at a plurality of locations in the circumferential direction of the inner circumferential surface of the outer column 13b that overlap the outer circumferential surface of the inner column 14a, and the tip end section (inside end sections in the radial direction) of these raised sections 23 come in contact with the outer circumferential surface of the inner column 14a. In this construction, of the inner circumferential surface of the outer column 13b, machining and finishing such as broaching only needs to be performed for the tip end section of the raised sections 23, so it is possible to reduce the processing cost.

When manufacturing the outer column 13b, first the main outer column is formed by aluminum die casting, hydroforming or the like. After that, forging and broaching is performed on a plurality of locations (eleven locations in the figure) in the circumferential direction of portions of the inner circumferential surface of the main outer column that overlap with the outer circumferential surface of the inner column 14a to form the raised sections 23 that protrude inward in the radial direction from the inner circumferential surface of the outer column 13b. However, in this case as well, the method for forming the outer column 13b and the method for form the raised sections 23 differ, so processing requires time and labor, so an increase in cost is unavoidable.

In order to stably support the inner column 14a on the inner-diameter side of the outer column 13b with the column being off center or without backlash or the like occurring, preferably all of the raised sections 23 will come in contact with the outer circumferential surface of the inner column 14a in the same contact state. However, the processing work for achieving the same contact state for a plurality of raised sections 23 is troublesome.

FIG. 50 illustrates construction of a steering column 6c that is disclosed in JP2008-302751(A). The outer column 13c of this steering column 6c is formed into a cylindrical shape by being a plate shaped material and welding together the edges on the end in the circumferential direction (top edges in FIG. 50). Moreover, support tabs 24 are formed in three locations in the circumferential direction of the inner circumferential surface of the outer column 13c such that these support tabs 24 face the outer circumferential surface of the inner column 14a in the assembled state. The support tabs 24 are formed by pressing part of the outer column 13c and bending that part toward the inside in the radial direction from the inner circumferential surface of the outer column 13.

The displacement bracket 22a is provided on part in the axial direction of the outer circumferential surface of the outer column 13c. The displacement bracket 22a is formed by bending a plate shaped raw material that is the same as the material used for forming the outer column 13c so that the edge on one end is continuous with the outer circumferential surface of the outer column 13c, and the edge on the other end is welded to this outer circumferential surface, forming a pair of left and right clamped sections 25.

In the case of the outer column 13c, support tabs 24 are formed at three uniformly spaced locations in the circumferential direction. Therefore, processing for making the contact state between the tip end edges of all of the support tabs 24 and the outer circumferential surface of the inner column 14a the same can be performed easily. However, the support tabs 24 have cantilever like construction, so there is a problem in that it is difficult to maintain rigidity for stably supporting the inner column 14a on the inner-diameter side of the outer column 13c.

Furthermore, in the telescopic steering apparatuses having these kinds of conventional construction, the longer the dimension in the axial direction of the portion of the outer column 13 and inner column 14 that overlap in the radial direction is, the higher the rigidity in the width direction of the displacement bracket 22 becomes, and it becomes difficult to bend. Therefore, it is necessary to change the operating force applied to the adjustment lever depending on the dimension in the axial direction of the portion of the outer column 13 and inner column 14 that overlap in the radial direction. As a result, there is a possibility that operability of the adjustment lever 18 will become unstable, and that it will not be possible to provide stable support rigidity (tightening force) to the inner column 14.

Moreover, in a typical telescopic steering apparatus, when adjusting the position of the steering wheel 1, the adjustment lever 18 is operated in a specified direction, which decreases the friction force acting between the fastened bracket 12a and the displacement bracket 22. On the other hand, when maintaining the steering wheel 1 at the adjusted position, the adjustment lever 8 is operated in the opposite direction of the specified direction, which increases the friction force between these brackets. In this kind of construction, the amount that the adjustment lever 18 is operated is not large, and in order to increase the force for maintaining the steering wheel 1 in the adjusted position, preferably the number of friction surfaces is increased, increasing the friction surface area. JP2008-100597(A), JP10-35511(A), JP2007-69821 (A), JP2011-5896(A) and JP62-19483(Y) disclose construction in which the number of friction surfaces is increased by layering together a plurality of friction members.

FIG. 51 and FIG. 52 illustrate an example of the construction of the telescopic steering apparatus disclosed in JP2011-5896(A). In this apparatus, a long hole 29 in the forward/backward direction that extends such that it is long in the axial direction of the steering column 6d is formed in the displacement bracket 22b for inserting the rod shaped member 19, and is formed such that it passes through the displacement bracket 22 in the left/right direction (width direction). On the other hand, the fastened bracket 12a is formed by joining and fastening together an upper bracket element 26 and a lower bracket 27, which are both formed by bending metal plate. The upper bracket element 26 is supported by the vehicle using known construction so as to be able to break away in the forward direction during a secondary collision. Moreover, the lower bracket element 27 comprises a pair of left and right support plate sections 28 that are separated from each other in the width direction. The distance D between the inside surfaces of these support plate sections 28 coincides with the space W between the outside surfaces of the displacement bracket 22b (width of the displacement bracket 22b) (D≈W). Partial arc shaped long holes 30 in the up/down direction that extend such that they are long in the up/down direction centered around a pivot shaft 11 are formed in positions in the pair of support plate sections 28 that are aligned with each other, and are for inserting the rod shaped member 19 through. A plurality of first friction plates 31 and second friction plates 32 are arranged on portions on the outsides of the support plate sections 28.

First long holes 33 are formed in the first friction plates 31, and second long holes 34 are formed in the second friction plates 32. The end sections of the first friction plates 31 are connected to and supported by outside surfaces on the top end of the support plate sections 28 by first locking screws 35, and the end section of the second friction plates 32 are connected to and supported by the outside surfaces on the front end of the displacement bracket 22b by second locking screws 36, thus preventing the first friction plates 31 from displacing in the lengthwise direction of the first long holes 33, and preventing the second friction plates 32 from displacing in the lengthwise direction of the second long holes 34. These kinds of first friction plates 31 and second friction plates 32 are arranged on the outside surfaces of the support plate sections 28 so that they are alternately layered.

The rod shaped member 19 is inserted through the long hole 29 in the forward/backward direction, the long holes 30 in the up/down direction, the first long holes 33 and the second long holes 34. An outward facing flange section 38 is formed on the base end section (right end section in FIG. 52) of the rod section 37 of the rod shaped member 19. Locking convex sections 39, having an elliptical cross section, that are formed in the portion near the base end section of the rod section 37 engages with one of the long holes 30 in the up/down direction (right hole in FIG. 52) so as to be able to freely displace (move up or down) along the long hole 30 in the up/down direction.

On the other hand, a pressure plate 40 is fitted around the portion in the middle section of the rod section 37 near the tip end, that protrudes from the other support plate section 28 (left support plate section 28 in FIG. 52), the first friction plate 31 and second friction plate 32 that are provided on the outside surface of that support plate section 28, and further a cam apparatus 20 is provided on this portion. This cam apparatus 20 and the rod shaped member 19 form a pressure apparatus. The cam apparatus 20 is such that the dimension T in the axial direction thereof expands or contracts according the operation of the adjustment lever 18, and has known construction. When the adjustment lever 18 is rotated in a specified direction, the dimension T in the axial direction expands, and the space between the surface on one side of the pressure plate 40 and the inside surface of the flange section 38 contracts, and the friction force that acts between opposing surfaces that are engaged by a friction fit increases.

In other words, in this state, on both the left and right sides, the contact pressure between the side surfaces of the displacement bracket 22b and the inside surfaces of the support plate sections 28, the contact pressure between the outside surfaces of the support plate sections 28 and the inside surfaces of the second friction plates 32 that are located on the very inside, the contact pressure between the inside surfaces of the adjacent first friction plates 31 and the outside surfaces of the second friction plates 32, and the contact pressure between the outside surfaces of the first friction plates 31 located on the very outside and the surface of one side of the pressure plate 40 or the inside surface of the flange section 38 increase. In this state, the total friction force that acts between these sections of frictional engagement becomes sufficiently large. As a result, it is possible to sufficiently increase the support strength of the displacement bracket 22b with respect to the fastened bracket 12a.

On the other hand, when adjusting the position of the steering wheel 1, the adjustment lever 18 is rotated in the opposite direction from the specified direction, causing the dimension T in the axial direction of the cam apparatus 20 to contract, and the space between the surface on one side of the pressure plate 40 and the inside surface of the flange section 38 to expand. In this state, the friction force that acts between these sections of frictional engagement is decreased or lost, and it is becomes possible to adjust the displacement bracket 22b in the up/down direction and forward/backward direction with respect to the fastened bracket 12a. In this state, by rotating the adjustment lever 18 in the specified direction after the position of the steering wheel 1 has been adjusted to a desired position, it becomes possible to stably maintain the position of the steering wheel 1 at the desired position.

However, in the case of this kind of conventional construction, there is a problem in that the construction for assembling the first friction plates 31 and the second friction plates 32 is complicated, and thus the manufacturing cost increases. Moreover, when the steering wheel 1 is moved to the very front adjustable position or to the very back adjustable position, there is a possibility that the outer circumferential surface of the rod section 37 of the rod shaped member 19 and the inner surface of the long hole 29 in the forward/backward direction in the displacement bracket 22b, which are both made of metal, will collide with much energy. When these surfaces energetically collide, there is a possibility that the driver operating the steering wheel 1 will feel a strange or uncomfortable feeling. In response to this, JP10-512825(A) (WO96/15931) discloses construction where an impact absorbing sleeve is provided that surrounds the long hole in the forward/backward direction of the displacement bracket. However, construction that combines the construction of providing this impact absorbing sleeve and the construction illustrated in FIG. 51 and FIG. 52 that improves the holding force for maintaining the position of the steering wheel 1 by using a plurality of friction plates is not suggested. These kinds of construction can be independently assembled in a telescopic steering apparatus, however, the assembly work is troublesome and increased costs are unavoidable.

As technology related to the construction of a steering column is method for manufacturing a steering column as disclosed in JP2006-255785 wherein hydroforming is used to form a bulging section in the middle section in the axial direction of a hollow cylindrical shaped raw material, after which this bulging section is formed into a column bracket by forming a through hole through the side wall section of the bulging section.

RELATED LITERATURE

Patent Literature

| [Patent Literature 1] | JP2001-322552(A) |
| [Patent Literature 2] | JP2008-302751(A) |
| [Patent Literature 3] | JP2008-100597(A) |
| [Patent Literature 4] | JP10-35511(A) |
| [Patent Literature 5] | JP2007-69821(A) |
| [Patent Literature 6] | JP2011-5896(A) |
| [Patent Literature 7] | JP62-19483(Y) |
| [Patent Literature 8] | JP10-512825(A) (WO96/15931) |
| [Patent Literature 9] | JP2010-52639(A) |
| [Patent Literature 10] | JP2006-255785(A) |

SUMMARY OF THE INVENTION

Problem to be Solved by the Invention

An object of the present invention is to provide construction of a steering column apparatus for telescopic steering apparatus that is capable of stably holding the inner column on the inner-diameter side of the outer column, and is capable of obtaining stable adjustment lever operation without an increase in the operation force that is applied to the adjustment lever.

Moreover, another object of the present invention is to provide construction of a steering column apparatus that is capable of increasing the holding force of maintaining the steering wheel in an adjusted position, and when further necessary, preventing giving the driver an strange or uncomfortable feeling when the forward/backward position of the steering wheel is moved to the adjustable limit positions, and is also capable of keeping the assembly simple and costs low.

Means for Solving the Problems

The present invention relates to a steering column apparatus for a telescopic steering apparatus. The steering apparatus of the present invention comprises:

a steering column provided with: a cylindrical shaped outer column having a portion of which the inner diameter of at least part in the axial direction can expand and contract and support sections that are formed in three locations or more in the circumferential direction of the inner circumferential surface the outer column with the support sections obtained by swelling a hollow tube outward in the radial direction; and a cylindrical shaped inner column having an outer circumferential surface that comes in contact with the support sections in at least three locations in the circumferential direction, the inner column fitted inside the inner diameter side of the outer column and supported by the support sections so as to move in the axial direction; this steering column supporting a steering shaft, to which a steering wheel is mounted to the rear end section, on the inside thereof such that the steering shaft can rotate freely;

a fastened bracket provided with: a portion fastened to the vehicle body; a pair of support plate sections supported by the portion fastened to the vehicle body, and holding the portion of the outer column, of which the inner diameter can expand and contract, on both sides in the width direction; and through holes on the vehicle side formed in positions in the pair of support plate sections that are aligned with each other;

a displacement bracket provided with: a pair of clamped sections, that are integrally formed with the outer column by swelling the hollow tube, and that are clamped by the pair of support plate sections; and though holes on the column side that are long in the axial direction of the outer column and that are formed in the clamped sections;

a mechanism provided with a rod shaped member that is arranged in the width direction and is inserted through the through holes on the vehicle side, and the through holes on the column side, this mechanism expanding or contracting the space between the pair of support plate sections according to rotation of this rod shaped member; and an adjustment lever provided on the base end section of the rod shaped member so as to rotate the rod shaped member.

Preferably, construction is employed wherein the outer column is located to rearward of the inner column; wherein the displacement bracket further comprises a pair of inclined sections, these inclined sections being such that one end is connected to the pair of clamped sections, the inclined sections then extending from the pair of clamped sections in the width direction toward each other, with the other ends connected to each other by way of a connecting section; and wherein in part of the displacement bracket that is aligned with (corresponds with) the through holes on the column side in the axial direction of the outer column, the angle that is formed between the pair of inclined sections and the direction in which the support plate sections apply pressure to the clamped sections becomes greater going from the front toward the rear.

Alternatively, it is preferred that construction be employed wherein the outer column is located in rearward of the inner column; wherein the displacement bracket further comprises a bottom section that connects the pair of clamped sections in the width direction; and wherein a long hole that is long in the axial direction is formed in the middle section in the width direction of this bottom section.

Alternatively or additionally, it is preferred that construction be employed wherein the displacement bracket further comprises a bottom section that connects the pair of clamped section in the width direction; and wherein a long hole is formed in the rear end section in the axial direction of the displacement bracket that is continuous from one of the clamped sections to the other clamped section by way of the bottom section.

Alternatively or additionally, construction is employed wherein long column holes that are long in the axial direction of the outer column are formed in a portion of the outer column that are at least partly aligned with (corresponds in part with) the through holes on the column side in the axial direction.

In this case, preferably construction is employed wherein the long column holes are formed further on the displacement bracket side in the circumferential direction of the outer column than a virtual plane that passes through the center axis of the inscribed circle of the support sections and is orthogonal to the pair of support plate sections of the fastened bracket.

In this case, preferably construction is employed wherein the displacement bracket further comprises a bottom section that connects the pair of clamped sections in the width direction; and wherein the rear end in the axial direction of the bottom section and the outer circumferential surface of the outer column are connected by a connecting section on the rear end side, and wherein the positions in the axial direction of the rear end sections of the long column holes are further toward the rear than the connecting section on the rear end side.

Alternatively or additionally, it is preferred that construction be employed wherein the support sections are formed at two positions in the axial direction of the outer column both of which exist in a section where the outer column overlaps in the circumferential direction with the inner column in a state where the dimension in the axial direction of the overlapping section is shortest.

In this case, preferably, construction is employed wherein the support sections are provided at the two positions on the inner circumferential surface of the outer column which exist in a position that coincides in the axial direction of the outer column with a position near the front end of the displacement bracket, and in a position that coincides in the axial direction of the outer column with a position near the rear end of the displacement bracket.

Moreover, preferably, construction is employed wherein a first friction plate that is supported by the displacement bracket, and a second friction plate that is supported by a rod shape member so as to be able to move with the operation of the rod shaped member, are alternately placed in each of the portions between the outside surfaces of the pair of clamped sections of the displacement bracket and the inside surfaces of the pair of support plate sections of the fastened bracket.

In the present invention, the steering column apparatus of an additionally applied aspect, as in the steering column apparatus of the aspect described above, comprises a steering column, a displacement bracket, first long holes in the forward/backward direction, a support bracket (fastened bracket), first through holes, first friction members, second long holes in the forward/backward direction, second friction members, second through holes and a pressure apparatus that comprises a rod shaped member. However, the support structure (construction of the support section) for the outer column and supporting the inner column by the outer column is not limited to the form above. Furthermore, the outer column and the displacement bracket do not need to be integrated together, and do not need to be obtained by bulge formation.

Particularly, in the steering column apparatus of this aspect, the first long holes in the forward/backward direction are formed in the displacement bracket and are long in the axial direction of the steering column. The support bracket has a pair of left and right support plate sections that hold the displacement bracket on both sides in the width direction, and this support bracket is supported by the vehicle body. The first through holes are formed in portions of the support plate sections that are aligned with each other, and are formed in portions that are aligned with part of the first long holes in the forward/backward direction. The first friction members are supported by part of the displacement bracket so as to be able to displace together with the displacement bracket. The second long holes in the forward/backward direction are formed in portions of the first friction members that are aligned with the first long holes in the forward/backward direction, and are long in the axial direction of the steering column. The second friction members are held between the outside surfaces of the displacement bracket and the first friction members. The second through holes are formed in portions of part of the second friction members that are aligned with part of the second long holes in the forward/backward direction. Furthermore, the pressure apparatus comprises the rod shaped member that is inserted through the first through holes, the second long holes in the forward/backward direction and the second through holes, and a pair of pressure sections that are provided on the both ends of the rod shaped member and protrude from the outside surfaces of the support plate sections. The pressure apparatus presses the first and second friction members and the support plate sections toward the outside surfaces of the displacement bracket. The rod shaped member is inserted through the second through holes so that displacement is possible in the axial direction of the rod shaped member, and so that displacement in a direction other than the axial direction is substantially prevented.

Furthermore, the first friction members comprise a first friction plate section, a connecting plate section and a locking section. The first friction plate section is held between the inside surface of the support plate section and the second friction member. The connecting plate section is bent from the edge on the end of the first friction plate section toward the center in the width direction of the displacement bracket. The locking section is formed into a hook shape by bending from the tip end section of the connecting plate section toward the first friction plate section. A locking hole is formed in the middle section in the width direction of the displacement bracket. The first friction members are assembled in the displacement bracket with the locking section being locked with the edge on the ends in the width direction of the locking holes, and with the connecting plate sections overlapping the displacement bracket.

In this aspect of the invention, preferably a support concave sections are provided on the portions of the outside surfaces of the first friction members that surround the second long holes in the forward/backward direction. The support concave sections support impact absorbing sleeves that are made of an elastic material such as an elastomer like rubber or vinyl, and in which third long holes in the forward/backward direction are formed. Moreover, the rear end sections of the third long holes in the forward/backward direction are located further near the front than the rear end sections of the second long holes in the forward/backward direction, and the front end sections of the third long holes in the forward/backward direction are located further near the rear than the rear end sections of the second long holes in the forward/backward direction.

Furthermore, preferably, the second friction members comprise a flat plate shaped second friction plate section in which a second through hole is formed, and a locking plate section that is bent from the top end section of the second friction plate section toward the outside in the width direction, and that has a wave shape as seen from the side. A locking groove section that is long in the axial direction of the steering column is provided between an upper dividing plate section, which divides the top end section of the supporting concave section, and the bottom surface of the connecting plate section. The locking plate section fits in this locking groove section so that displacement in the axial direction is possible, and displacement in the up/down direction, which is the direction orthogonal to the axial direction, is prevented.

In this aspect of the invention, when it is particularly necessary to increase the holding force for maintaining the steering wheel in the adjusted position, the first friction members comprise a combination of a plurality of first friction member elements. These first friction member elements are supported by part of the displacement bracket so as to be able to displace together with the displacement bracket. In this state, the first friction plate sections of the of these first friction member elements are separated from each other in the axial direction of the rod shaped member and overlap the connecting plate sections and hook sections. One or more second friction members are supported in the portion between at least one of the portion between the first friction plate sections of the first friction member elements, the portion between the first friction plate section of one of the friction member elements and the outside surface of the displacement bracket, and the portion between the first friction plate section of one of the friction member elements and the inside surface of the support plate section.

In order to increase the holding force while maintaining balance on the left and right, preferably, one set each of first and second friction members will be provided between both outside surfaces of the displacement bracket and the inside surfaces of the both support plate sections. The material and method for manufacturing the first friction members is not particularly specified as long as the necessary strength and friction coefficient are obtained. For example, it is possible to manufacture the first friction member by cutting a light alloy material such as an aluminum alloy that has been extruded or drawn into a specified length, and performing trimming to remove the unneeded material. Alternatively, it is possible to manufacture the first friction member by bending an intermediate material that is obtained by punching a metal plate such as a ferrous metal plate like carbon steel or stainless steel.

Preferably a pair of bent sections are formed on both end sections in forward/backward direction of the supporting concave section so as to block at least part of the openings on both end in the forward/backward direction of the supporting concave sections, such that these bend sections are on both sides in the forward/backward direction of the impact absorbing sleeves that are held in the supporting concave sections, and prevent the impact absorbing sleeves from shifting in the forward/backward direction with respect to the first friction members. Alternatively or additionally, the impact absorbing members can be joined to the inside surfaces of the supporting concave sections with adhesive of the like.

Effect of the Invention

In the telescopic steering apparatus of the present invention, an outer column that includes a support section from supporting an inner column, and a displacement bracket that is integrally formed with the outer column are integrally formed by bulge formation using a hydroforming method. Therefore, even when the support section comprises a plurality (three or more) of raised sections, it is possible to lower the processing cost, and increase the rigidity of the support sections. Moreover, there is no need for troublesome work such as forming the displacement bracket and outer column separately and fastening them together by welding or the like.

Particularly, when the support section and the outer circumferential surface of the inner column that overlaps the support section come in contact with each other at three locations in the circumferential direction, the support section can certainly be in contact with the outer circumferential surface of the inner column, and because there are only three contact locations, processing for making the contact state at all of the contact locations uniform becomes simple.

BRIEF DESCRIPTION OF THE DRAWINGS

FIG. 6A is a side view, and FIG. 6B is a bottom view.

FIG. 8A is a side view, FIG. 8B is a bottom view that illustrates a first example of a long hole that is formed in the bottom section of the outer column, and FIG. 8C is a bottom view illustrating a second example of the long hole.

FIG. 10A is a side view, and FIG. 10B is a bottom view.

FIG. 11A is a top view, and FIG. 11B is a side view.

FIG. 22B is a cross-sectional view of section M-M.

FIG. 31A is a side view, FIG. 31B is a bottom view illustrating a first example of a long hole that is formed in the bottom section of the outer column, and FIG. 31C is a bottom view illustrating a second example of the long hole.

FIG. 33A is a side view, FIG. 33B is a bottom view illustrating a first example of a long hole that is formed in the continuous section on the rear end side of the displacement bracket that connects the rear end section of the displacement bracket with the outer circumferential surface of the outer column, and FIG. 33C is a bottom view illustrating a second example of the long hole.

BEST MODES FOR CARRYING OUT THE INVENTION

Embodiment 1

Example 1

Figure 1:
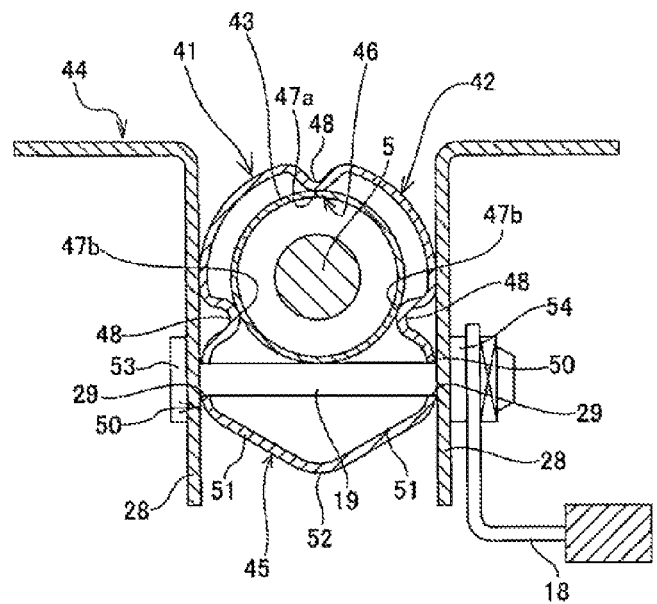
FIG. 1 is a cross-sectional view illustrating a first example of a first embodiment of the present invention.
Figure 2:
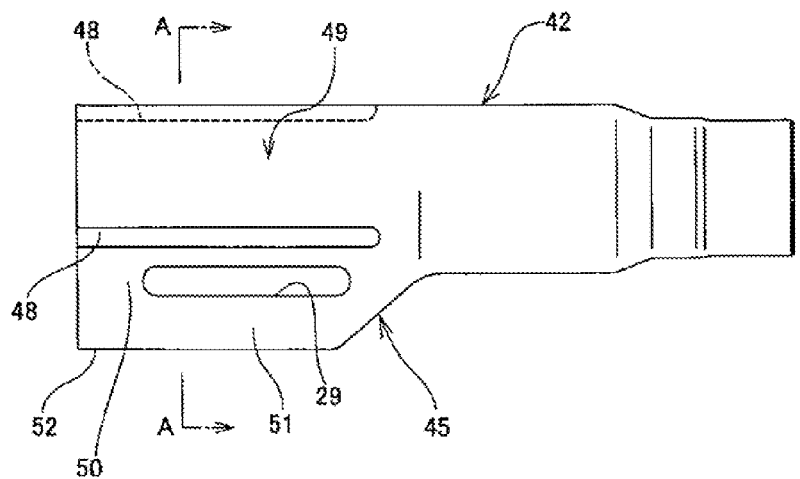
FIG. 2 is a side view illustrating just the removed outer column of the first example of the first embodiment of the present invention.
Figure 3:
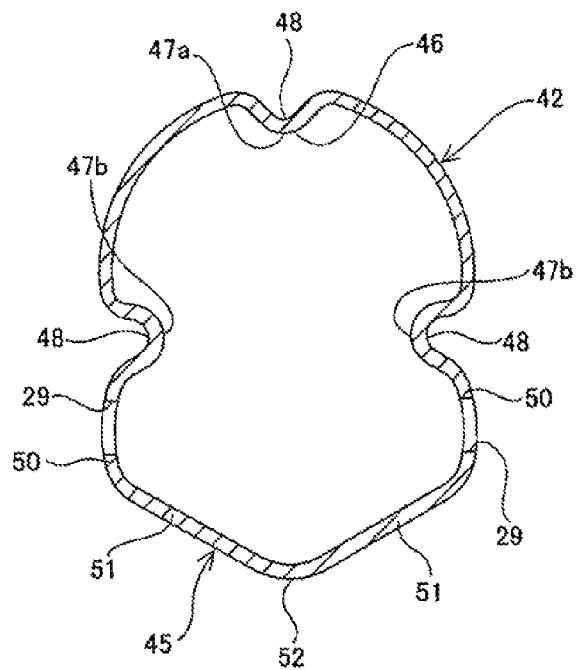
FIG. 3 is a cross-sectional view of section A-A in FIG. 2.

FIG. 1 to FIG. 3 illustrate a first example of a first embodiment of the present invention. A feature of the steering column apparatus of the present invention, including this example, is the construction of the outer column of the steering column. The present invention, can be applied to the construction of a telescopic steering apparatus, that in addition a telescopic mechanism for adjusting the forward/backward position of a steering wheel, also comprises a tilt mechanism for adjusting the up/down position of the steering wheel. The construction of other parts other than the features of the present invention is the same as that of a conventional telescopic steering apparatus and the construction of a steering column apparatus that is applied to that telescopic steering apparatus, so drawings and explanations of parts that are the same as in the conventional construction will be simplified or omitted, with the explanation below centering on the features of this example.

The telescopic steering apparatus of this example comprises a steering shaft 5, a steering column 41, a fastened bracket 44, a displacement bracket 45, a rod shaped member 19 and an adjustment lever 18. The steering wheel 1 is mounted on the rear end section of the steering shaft 5, and the steering shaft 5 is supported on the inside of the steering column 41 so as to be able to rotate freely.

The steering column comprises an outer column 42 and an inner column 43. This steering column 41 is such that the outer column 42 is the upper column on the steering wheel 1 side, and the inner column 43 is a lower column on the side far from the steering wheel 1.

The outer column 42 is cylindrical shaped such that at least part of the inner diameter in the axial direction can elastically expand and contract, and comprises a support section 46 for fitting with and supporting the inner column 43 on the inner-diameter side of the outer column 42.

The support section 46 comprises raised sections 47a, 47b that are formed at three locations that are uniformly spaced in the circumferential direction of the portion of the inner circumferential surface of the outer column 42 that overlaps the inner column 43 in the radial direction, and these raised sections 47a, 47b protrude inward in the radial direction from the inner circumferential surface of the outer column 42. Moreover, concave sections 48 that that are recessed inward in the radial direction from this outer circumferential surface of the outer column 42 are formed at positions in the circumferential direction on the outer circumferential surface of the outer column outer column 42 are aligned with the raised sections 47a, 47b. The edges on the tip ends of these raised sections 47a, 47b come in contact with the outer circumferential surface of the inner column 43. From the aspect of causing the tip end sections of the raised sections 47a, 47b to come in contact with the outer circumferential surface of the inner column without increasing the processing precision of the raised sections 47a, 47b of the support sections 46, preferably, the number of these raised sections 47a, 47b is three in this example. However, when taking into consideration the balance with the processing cost or the like, it is possible to form more than three of these raised sections (for example, two each on the left and right, for a total of four). Moreover, the positions where these raised sections 47a, 47b are formed are not limited to being positions that are uniformly spaced in the circumferential direction on the inner circumferential surface of the outer column 42. However, preferably they are distributed in a range that exceeds the semispherical half circle without being one sided on the semispherical side.

This outer column 42 (including the support section 46) is formed by forming a bulge by hydroforming wherein fluid pressure (for example, water pressure) is applied to the inner circumferential surface of a metal cylinder, which is a hollow member made of steel plate or aluminum alloy, and causing this metal cylinder to plastically deform in the radial direction. In the method of forming a bulge in the outer column 42 by hydroforming, the metal cylinder, which is the raw material, is set into a metal die having a inner surface shape that corresponds to the outer surface shape of the outer column 42 that is to be expanded to a larger diameter, both ends of the metal cylinder are blocked by an axial pressure tool, high fluid pressure is applied to the inside of the metal cylinder, and this metal cylinder is expanded outward in the radial direction until it reaches the inner surface of the die cavity, forming the outer column 42. After the outer column 42 has been formed by hydroforming, grinding or pressing can be performed on the tip end sections of the raised sections 47a, 47b of the support section 46. The method of bulge forming of the outer column 42 is not limited to hydroforming, and an arbitrary method can be employed for forming a bulge such as pressing, bulge processing, vacuum forming, air-blow molding, explosive forming or the like.

The fastened bracket 44 is provided on the vehicle body 10 or a portion that is fastened to the vehicle body 10, and comprises a pair of left and right supporting plate sections 28 that hold the portion 49 of the outer column 42, whose inner diameter can be expanded or contracted, on both sides in the width direction.

The displacement bracket 45 is integrally formed with the outer column 42 by hydroforming, and comprises a pair of clamped sections 50 that are clamped between the pair of support plate sections 28, and came expand or contract in the width direction, and a pair of inclined sections 51. The clamped sections 50 are such that one end is continuous with the bottom end of the raised sections 47b that, of the raised sections 47a, 47b of the outer column 42, are the raised sections formed below, and these clamped sections 50 are parallel with the pair of support plate sections 28. Moreover, long column-side through holes (long holes in the forward/backward direction) 29 that are long in the axial direction of the outer column 42 are formed in positions of the clamped sections 50 that are aligned with each other. The inclined sections 51 are continuous with the other end of the clamped sections 50, extend toward each other (obliquely downward in FIG. 1) in the width direction (left/right direction in FIG. 1), and the other ends are connected to each other by way of a connecting section 52.

The rod shaped member 19 is inserted in the width direction through the through holes on the vehicle side (not illustrated in the figure) that are formed in positions of the support plate sections 28 that are aligned with each other, and through the through holes 29 on the column side that are formed in the clamped sections 50. A head section 53, which is a pressure section, is formed on one end of the rod shaped member 19. A nut 54, which is a pressure member, is screwed onto the portion on the other end (right side in FIG. 1) of the rod shaped member 19 that protrude from the outside surface (right side surface in FIG. 1) of the support plate section 28 of the fastened bracket 44. The base end section of the adjustment lever 18 is joined and fastened to the nut 54. Therefore, when the adjustment lever 18 is operated, the rod shaped member 19 is rotated, and at the same time the nut 54 is rotated, causing the space in the width direction between the nut 54 and the head section 53 to change (expand or contract), which makes it possible to cause the space between the support plate sections 28 to expand or contract. In addition to construction that combines the rod shaped member 19 and the nut as the mechanism for expanding or contracting the space between the support plate sections 28, it is also possible to employ construction, as in the conventional construction, that combines the rod shaped member 19 and a cam apparatus.

When adjusting the position in the forward/backward direction of the steering wheel 1, the adjustment lever 18 is rotated in a specified direction, which expands the space in the width direction between the nut 54 and the head section 53. As a result, the space between the pair of support plate sections 28 of the fastened bracket 44 elastically expands, and the contact pressure at the area of contact between the inside surfaces of these support plate sections 28 and the outside surfaces of the clamped sections 50 of the displacement bracket 45 is lowered or lost. Therefore, the contact pressure of the fitting section between the support section 46 of the outer column and the outer circumferential surface of the inner column 43 is lower or lost, and the outer column 42 and inner column can displace relative to each other in the axial direction (forward/backward direction). As a result, the position in the forward/backward direction of the steering wheel 1 can be adjusted.

After the position has been adjusted, by rotating the adjustment lever 18 in the opposite direction to the specified direction, the space in the width direction between the nut 54 and the head section 53 is contracted. As a result, the space between the inside surfaces of the support plate sections 28 contacts, and the contact pressure at the area of contact between the inside surfaces of these support plate sections 28 and the outside surfaces of the clamped sections 50 increases. This causes the contact pressure at the fitting section between the support section 46 of the outer column 42 and the outer circumferential surface of the inner column 43 to increase. As a result, the steering wheel 1 is held in the adjusted position.

When the present invention is applied to construction where the outer column is a lower column and the inner column is an upper column, the shape of the through holes on the column side that are formed in the displacement bracket that is integrally formed with the outer column are round holes through which the rod shaped member is inserted instead of being long holes that are long in the axial direction (long holes in the forward/backward direction).

In the case of the steering column apparatus of this example, the outer column 42 that includes the support section 46, and the displacement bracket 45 that is integrally formed with the outer column 42 are formed by hydroforming. Therefore, it is possible to lower the processing cost when compared with the conventional construction.

Figure 50:
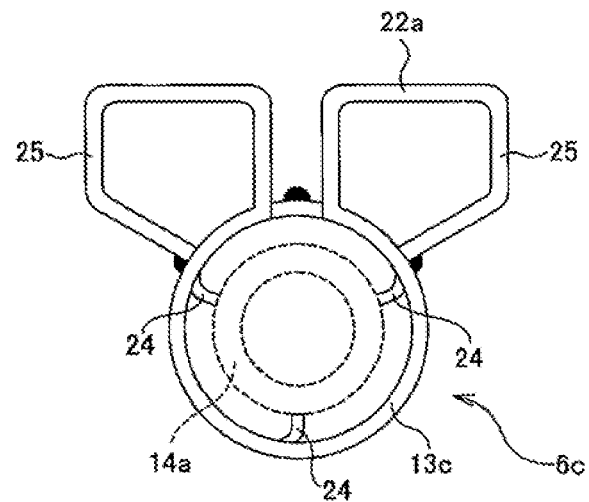
FIG. 50 is a front view illustrating just the removed outer column of a third example of a conventional steering column apparatus.
Figure 51:
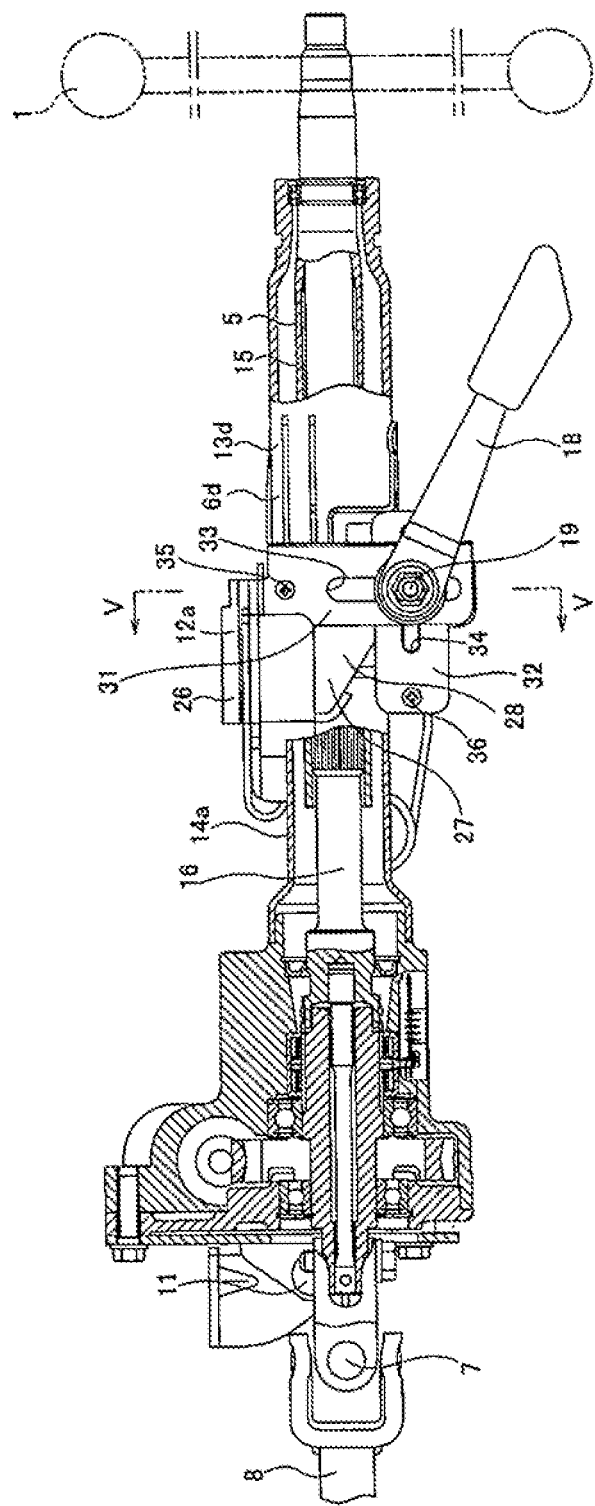
FIG. 51 is a partial cross-sectional side view illustrating a fourth example of a conventional steering column apparatus.
Figure 52:
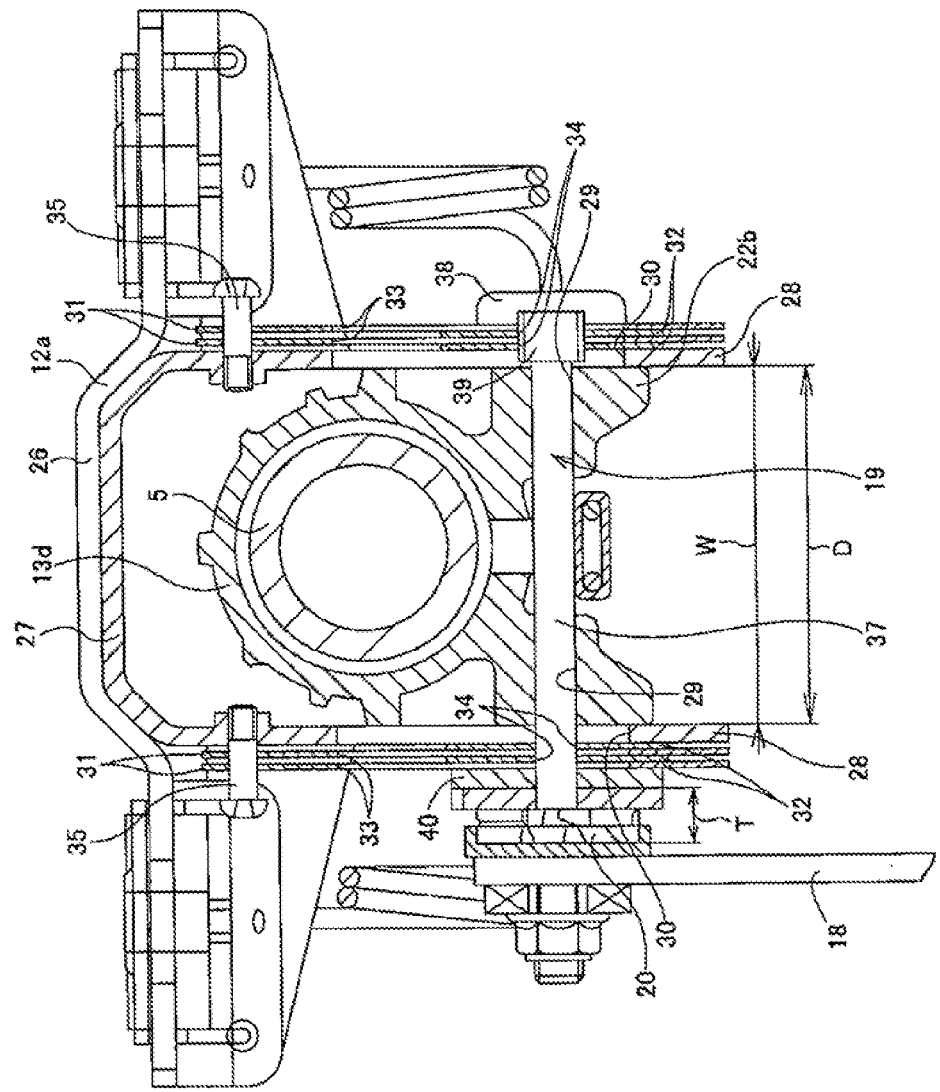
FIG. 52 is a cross-sectional view of section V-V in FIG. 51.

The support section 46 that is formed on the inner circumferential surface of the outer column 42 and the outer circumferential surface of the inner column 43 that overlaps with the support section 46 come in contact at three locations in the circumferential direction. Therefore, it is possible to bring the raised sections 47a, 47b in contact with the outer circumferential surface of the inner column 42 without increasing the processing precision of these raised sections 47a, 47b of the support section 46. When the processing precision of support section 46 cannot be achieved sufficiently through just hydroforming, the tip end sections of the raised sections 47a, 47b of the support section 46 can be grinded. However, in the case of this example, the number of the raised sections 47a, 47b is only three. Therefore, it is sufficient if the diameter of the inscribed circle of these three raised sections 47a, 47b is the same in the axial direction, so the finishing work of grinding or pressing is not so troublesome. Moreover, the raised sections 47a, 47b of the support section 46 are formed into a triangular shape by hydroforming. Therefore, when compared with the construction illustrated in FIG. 50, it is possible to increase the rigidity for supporting the inner column 43.

Embodiment 1

Example 2

Figure 4:
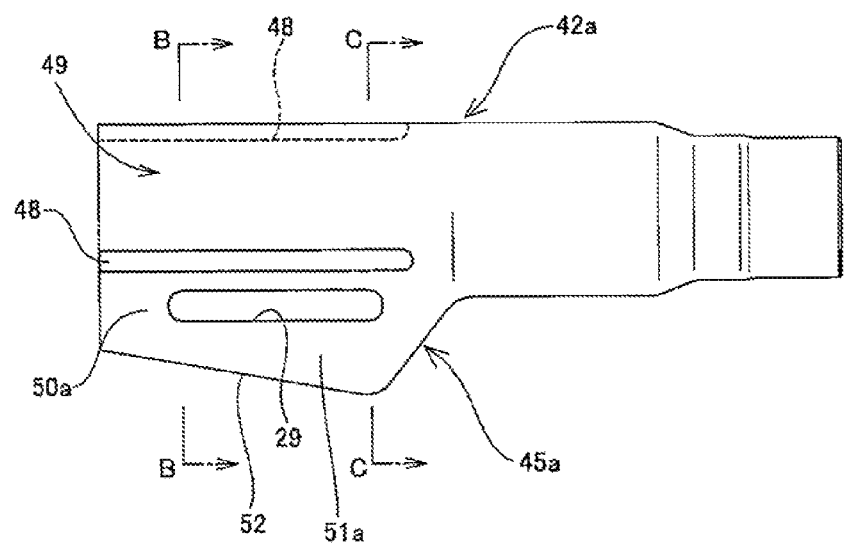
FIG. 4 is a side view illustrating just the removed outer column of a second example of the first embodiment of the present invention.
Figure 5:
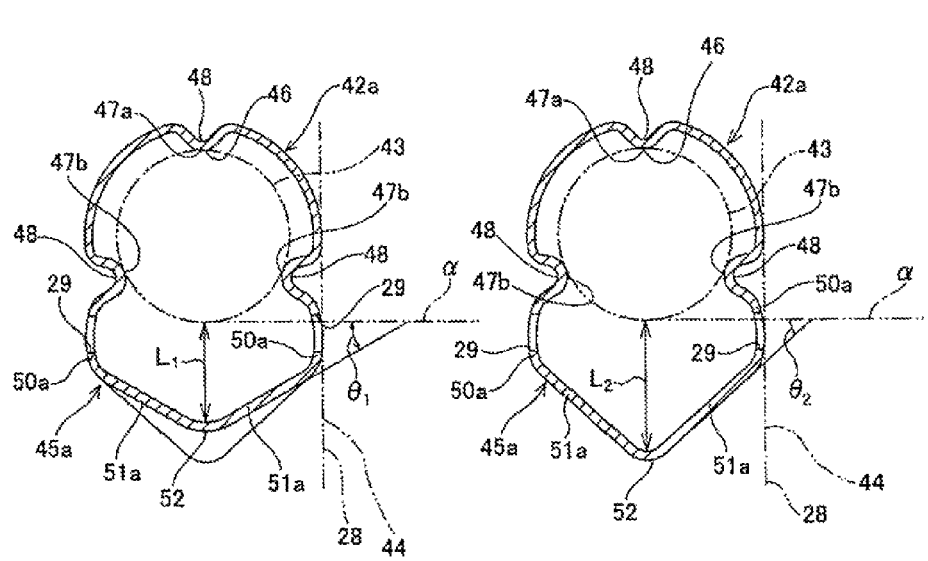
FIG. 5A is a cross-sectional view of section B-B in FIG. 4.
FIG. 5B is a cross-sectional view of section C-C.

FIG. 4 and FIGS. 5A and 5B illustrate a second example of the first embodiment of the present invention. In the case of the steering column apparatus of this example, as in the first example, the outer column 42 is located in rearward of the inner column 43. Also, as in the first example, long holes 29 on the column side that are long in the axial direction are formed at positions in the clamped sections 50a of the displacement bracket 45a that is integrally formed with the outer column 42a that are aligned with each other.

In part of the displacement bracket 45a that is aligned with the through holes 29 on the column side in the axial direction, the angle that is formed between the inclined sections 51a of the displacement bracket 45a and the direction a in which the support plate sections 28 of the fastened bracket 44 apply pressure (clamping force) to the clamped sections 50, becomes larger going toward the rear (right side in FIG. 4).

In other words, the angle $\theta_2$ (FIG. 5B) that is formed between the inclined sections 51a of the displacement bracket 45a and the direction a in which the support plate sections 28 of the fastened bracket 44 apply pressure (clamping force) to the clamped sections 50 in the part that is aligned with the portions toward the rear end of the through holes 29 on the column side in the axial direction, is larger than the angle $\theta_1$ (FIG. 5A) that is formed between the inclined sections 51a of the displacement bracket 45a and the direction a in which the support plate sections 28 of the fastened bracket 44 apply pressure (clamping force) to the clamped sections 50 in the part that is aligned with the portions toward the front end of the through holes 29 on the column side in the axial direction ($\theta_2 > \theta_1$). The angle that is formed between the inclined sections 51a of the displacement bracket 45a and the direction a in which the support plate sections 28 of the fastened bracket 44 apply pressure (clamping force) to the clamped sections 50 continuously changes from the front toward the rear.

In the part that is aligned with the long holes 29 on the column side in the axial direction, the distance between the inner circumferential surface of the connecting section 52 of the inclined sections 51a and the outer circumferential surface of the inner column 43 becomes larger going toward the rear. In other words, the distance $L_2$ (FIG. 5B) between the inner circumferential surface of the connecting section 52 and the bottom end of the outer circumferential surface of the inner column 43 in the part that is aligned with the portions near the rear end of the long holes 29 on the column side are aligned, is greater than the distance $L_1$ (FIG. 5A) between the inner circumferential surface of the connecting section 52 and the bottom end of the outer circumferential surface of the inner column 43 in the part that is aligned with the portions near the front end of the long holes 29 on the column side are aligned ($L_1 > L_2$).

In the case of the telescopic steering apparatus of this example, the rigidity in the width direction of the clamped sections 50a of the displacement bracket 45a becomes less toward the rear. Therefore, according to the length of the portion where the outer column 42 overlaps in the axial direction with the inner column 43, it is possible to obtain stable operability of the adjustment lever 18 without greatly changing the operating force applied to the adjustment lever 18. As a result, it is possible to apply stable support rigidity (tightening force) to the inner column 43.

In other words, in the case where measures are not taken, when the length in the axial direction of the portion where the outer column and the inner column overlap in the radial direction is long (when the rod shaped member 19 is near the rear ends of the through holes 29 on the column side), the force (operating force applied to the adjustment lever 18) required to reduce the distance in the width direction between the clamped sections becomes large. On the other hand, when the length in the axial direction of the portion where the outer column and the inner column overlap in the radial direction is short (when the rod shaped member 19 is near the front ends of the through holes 29 on the column side), the force required to reduce the distance in the width direction between the clamped sections can be comparatively small. When the operating force applied to the adjustment lever 18 changes due to the dimension in the axial direction of the portion where the outer column and inner column overlap in the radial direction in this way, the operability (operating feeling) when adjusting the position in the forward/backward direction of the steering wheel 1 is not stable.

On the other hand, with the construction of this example, the rigidity in the width direction of the clamped sections 50a of the displacement bracket 45a decreases going toward the rear, so the tightening torque of the adjustment lever 18 required for fastening the outer column 42a and inner column 43 does not greatly change regardless of the state of the overlap in the radial direction of the outer column 42a and the inner column 43, and it is possible to stabilize the operability of the adjustment lever 18. As a result, it is possible to apply stable support rigidity (tightening force) to the inner column 43. The construction and function of the other parts are the same as in the first example. Construction for changing the rigidity of the held portion of the outer column according to the depth of the fit between the outer column and the inner column in this example, can also be applied to the conventional construction illustrated in FIG. 46 to FIG. 52.

Embodiment 1

Example 3

Figure 6:
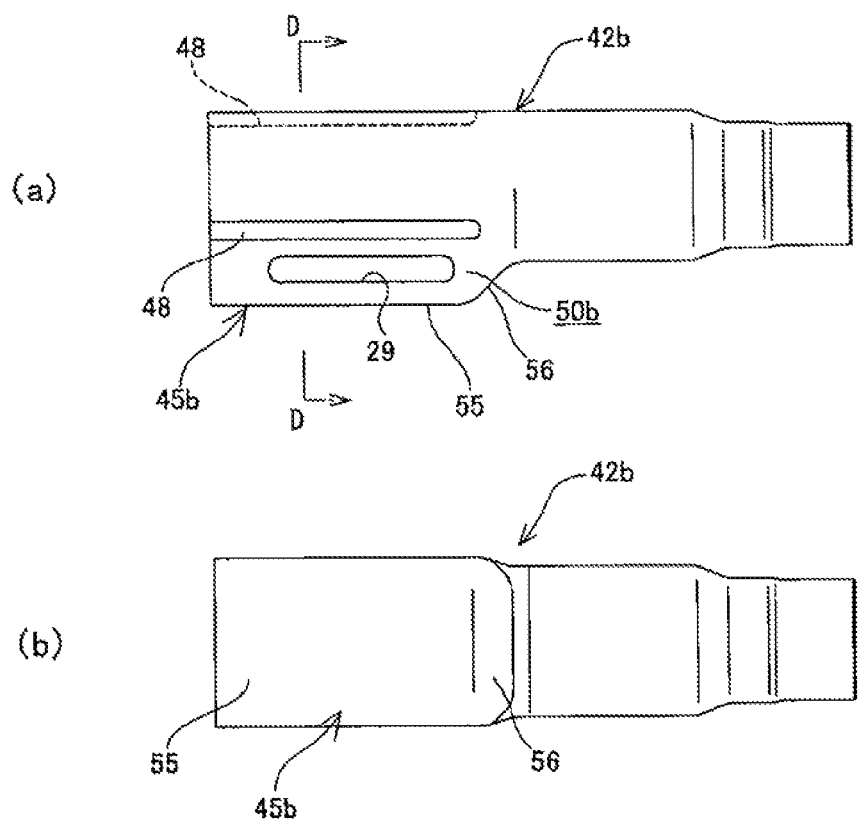
FIGS. 6A and 6B illustrated just the removed outer column of a third example of the first embodiment of the present invention, where
Figure 7:
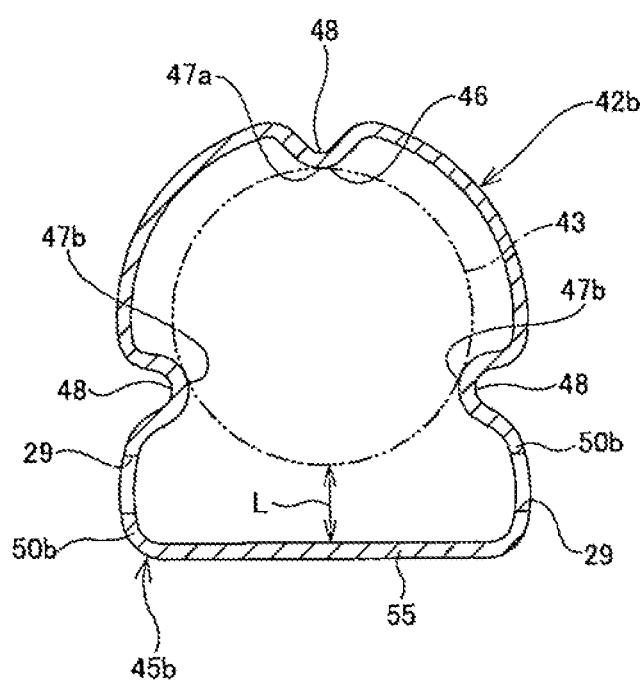
FIG. 7 is a cross-section view of section D-D in FIG. 6A.

FIGS. 6A and 6B and FIG. 7 illustrate a third example of the first embodiment of the present invention. In the case of the construction of the steering column of this example as well, the outer column 42b is located in rearward of the inner column 43. Moreover, through holes 29 on the column side that are long in the axial direction are formed in aligned portions of the clamped sections 50b of the displacement bracket 45b that is integrally formed with the outer column 42b. One of the ends (bottom ends in FIG. 6A) of these clamped sections 50b are connected in the width direction by way of a flat plate shaped bottom section 55. The rear end side of the bottom section 55 is connected in the axial direction with the outer circumferential surface of the outer column 42b by way of a connecting section 56. When the pair of through holes 29 on the column side are aligned in the axial direction, the distance L between the inner surface of the bottom section 55 and the bottom end of the circumferential surface of the inner column 43 is constant along the axial direction. The construction and function of other parts are the same as in the first example of the first embodiment.

Embodiment 1

Example 4

Figure 8:
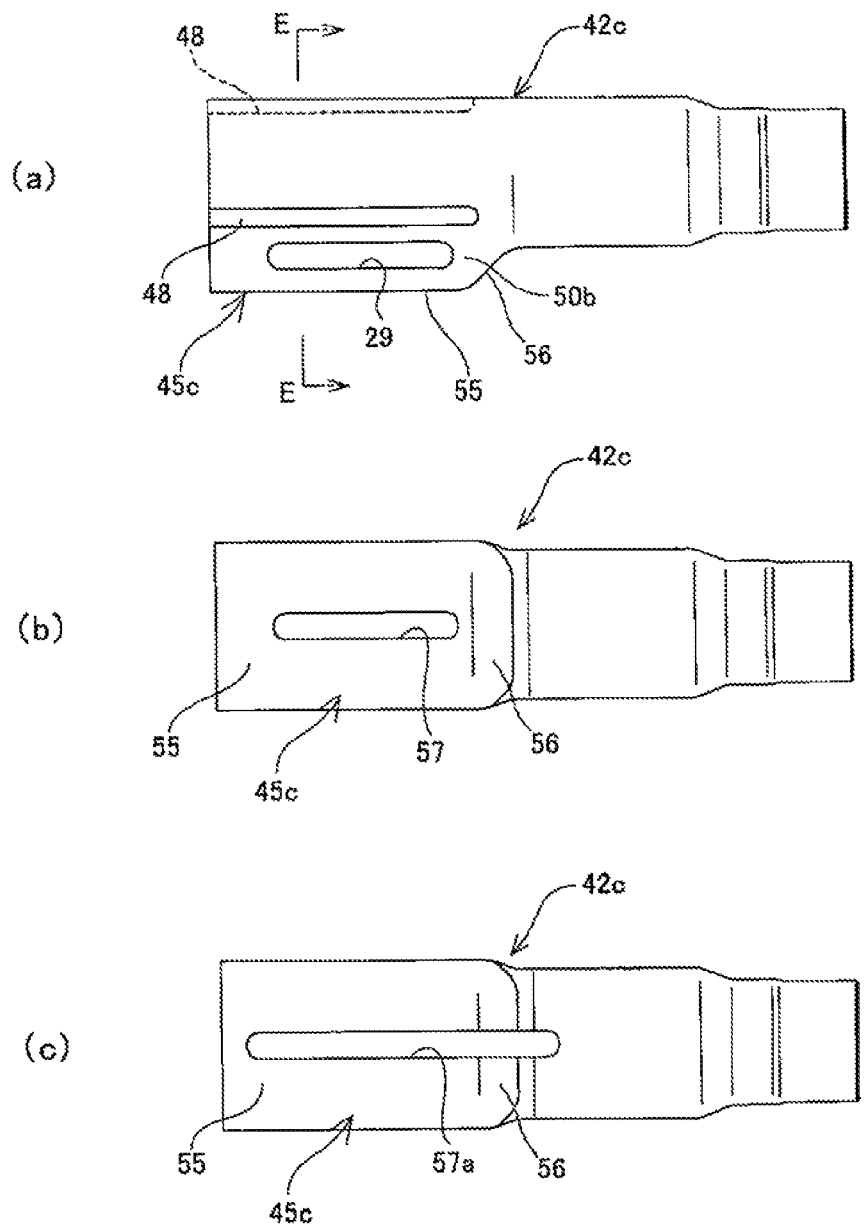
FIGS. 8A to 8C illustrate just the removed outer column of a fourth example of the first embodiment of the present invention, where
Figure 9:
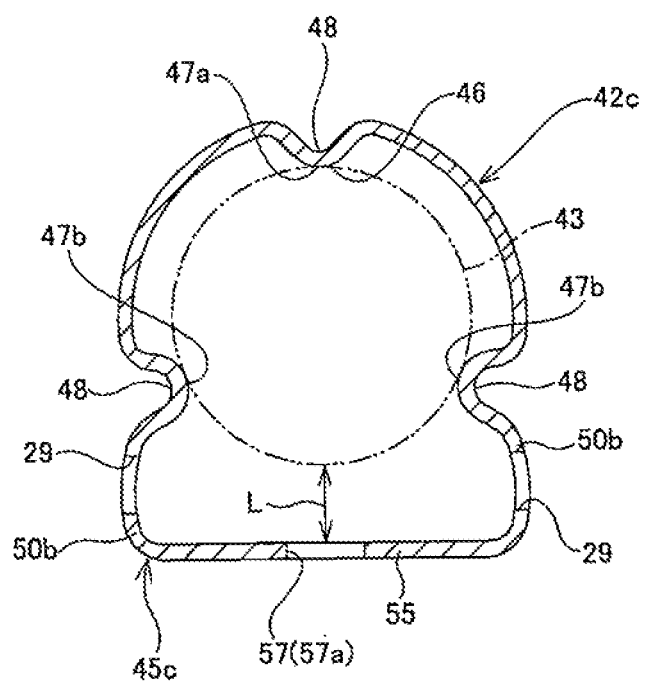
FIG. 9 is a cross-sectional view of section E-E in FIG. 8A.

FIGS. 8A to 8C and FIG. 9 illustrate a fourth example of the first embodiment of the present invention. The outer column 42c of the steering column apparatus of this example has the same basic construction as the outer column 42b of the third example of the first embodiment. In this example, as illustrated in FIG. 8B and FIG. 8C, long holes 57, 57a that are long in the axial direction are formed at least in part of the displacement bracket 45c that is aligned with the through holes 29 on the column side which is located in the axial direction and in the center in the width direction of the bottom section 55 of the displacement bracket 45c.

The long hole 57 illustrated in FIG. 8B coincides with the through holes 29 on the column side in the axial position relation. On the other hand, the dimension in the axial direction of the long hole 57a illustrated in FIG. 8C is greater than the dimension in the axial direction of the through holes 29 on the column side and the long hole 57. In other words, the long hole 57a is formed in the bottom section 55 from further in the front in the axial direction than the front end in the axial direction of the through holes 29 on the column side to the outer circumferential surface of the outer column 42c by way of the connecting section 56 that connects the rear end in the axial direction of the bottom section 55 with the outer circumferential surface of the outer column 42c. These long holes 57, 57a can be formed at the same time by hydroforming (refer to JP2006-255785(A)).

In the case of the steering column apparatus of this example, by forming long holes 57, 57a in the bottom section 55 of the displacement bracket 45c, the rigidity in the width direction of the bottom section 55 and the clamped sections 50b is decreased. Particularly, as illustrated in FIG. 8C, by forming the long hole 57a from the bottom section 55 to the outer circumferential surface of the outer column 42c by way of the connecting section 56 that connects the rear end section of the bottom section 55 with the outer circumferential surface of the outer column 42c, it is possible to sufficiently decrease the rigidity of the near the rear end of the bottom section 55 and the clamped sections 50b. This example can be combined with all of the examples of the first embodiment. Particularly, when this example is combined with the first example or second example of the first embodiment, the inclined sections 51 (51a) are the portion that corresponds to the bottom section 55. This example can be applied regardless of the support construction of the outer column and inner column. The construction and function of the other parts are the same as in the first and second examples of the first embodiment.

Embodiment 1

Example 5

Figure 10:
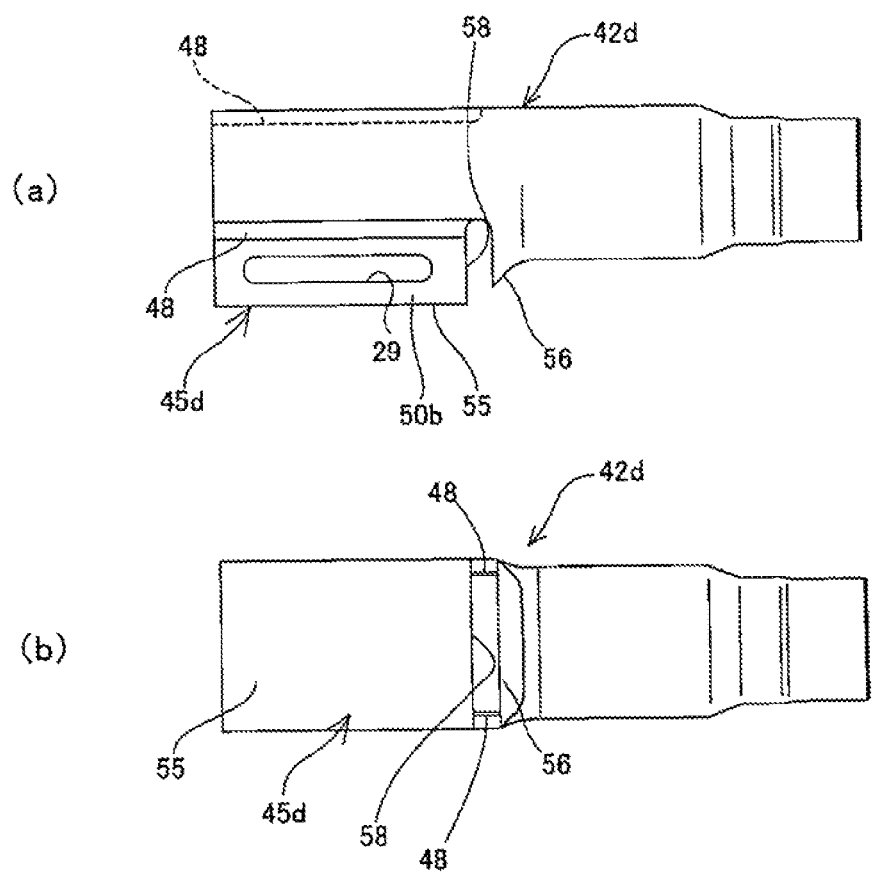
FIGS. 10A and 10B illustrate just the removed outer column of a fifth example of the first embodiment of the present invention, where
Figure 11:
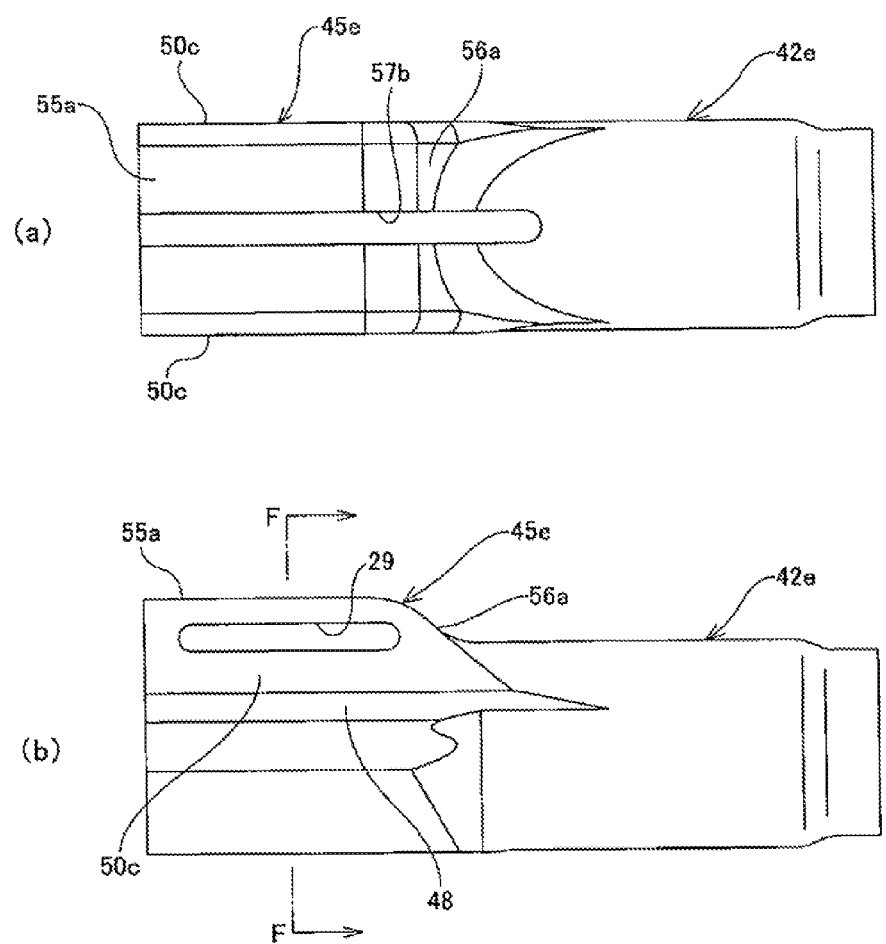
FIGS. 11A and 11B illustrate just the removed outer column of a sixth example of the first embodiment of the present invention, where
Figure 12:
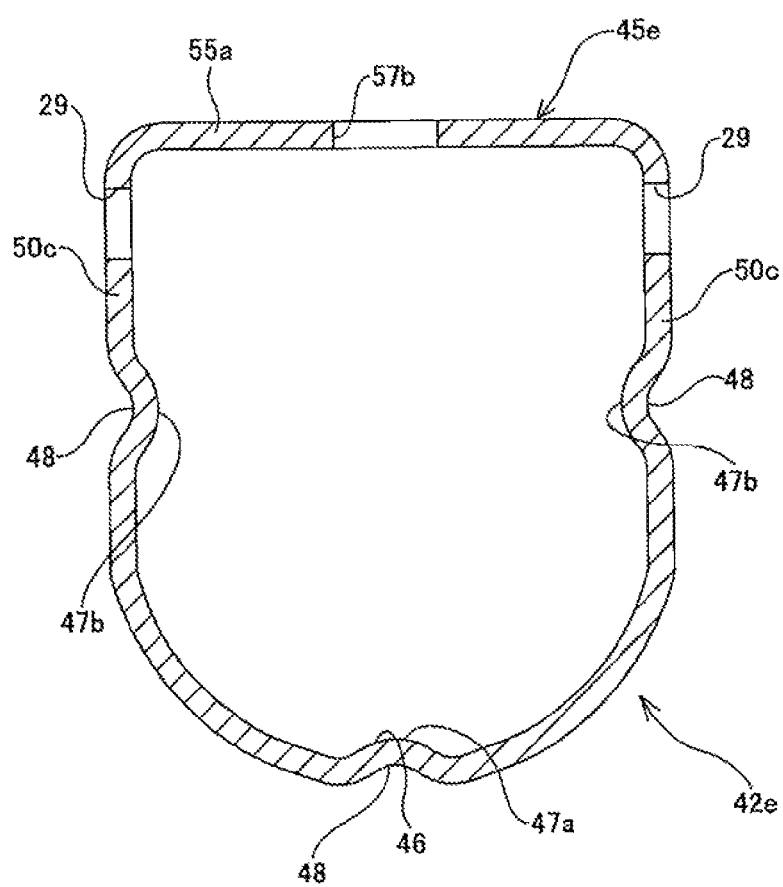
FIG. 12 is a cross-sectional view of section F-F in FIG. 11B.

FIGS. 10A and 10B illustrate a fifth example of the first embodiment of the present invention. The outer column 42d of the steering column apparatus of this example comprises the same basic construction as the outer column 42b of the third example of the first embodiment. Particularly, in this example, the outer column 42d is such that a long hole 58 is formed in the rear end section in the axial direction (the front end section of the connecting section 56 that connects the rear end in the axial direction of the bottom section 55 with the outer circumferential surface of the outer column 42*d*) of the displacement bracket 45*d* such that it is continuous in the width direction from one clamped section 50*b* to the other clamped section 50*b* by way of the bottom section 55.

With the steering column apparatus of this example, the rigidity in the width direction of the rear end section in the axial direction of the displacement bracket 45*d* can be reduced. In other words, there is a connecting section 56 in the rear end section in the axial direction of the displacement bracket 45*d*, so when compared with the front end section in the axial direction, the rigidity in the width direction is high. Therefore, the rigidity in the width direction of the rear end section in the axial direction of the displacement bracket 45*d* is reduced by forming the long hole 58. As a result, the tightening torque of the adjustment lever 18 that is required for fastening the outer column 42*d* and the inner column 43 does not greatly differ regardless of the overlapping state (dimension in the axial direction of the overlapping portion) of the outer column 42*d* and the inner column 43, and thus operability of the adjustment lever 18 can be stabilized. This example can be combined with all of the examples of the first embodiment. The construction and function of other parts are the same as in the third example of the first embodiment.

Embodiment 1

Example 6

FIG. 11A to FIG. 13 illustrate a sixth example of the first embodiment of the present invention. The displacement bracket 45*e* of the steering column of this example protrudes upward from the front end section of the outer column 42*e*. This displacement bracket 45*e*, which has symmetrical construction in the radial direction (up/down direction) with the displacement bracket 45*c* of the fourth example of the first embodiment, comprises a pair of left and right clamped section 50*c* and a bottom section 55*a*.

The clamped sections 50*c* are formed so at to continue upward from the main portion of the outer column 42*e*, and are parallel with each other. The bottom section 55*a* is provided so at to connect in the width direction the edges on one of the ends of the clamped sections 50*c* (edges on the top ends in FIG. 12 and FIG. 13). As in the fourth example of the first embodiment, through holes 29 that are long in the axial direction are formed in portions of the clamped sections 50*c* of the displacement bracket 45*e* that are aligned with each other.

A long hole 57*b* that is long in the axial direction is formed in the bottom section 55*a* of the displacement bracket 45*e* that extends from the edge on the front end in the center in the width direction of the bottom section 55*a* (left side in FIG. 11A) to the outer circumferential surface of the outer column 42*e* by way of a connecting section 56*a* that connects the rear end in the axial direction of the bottom section 55*a* with the outer circumferential surface of the outer column 42*e*. This long hole 57*b* can also have a shape such that the front end side is closed like the long hole 57 illustrated in FIG. 8B or the long hole 57*a* illustrated in FIG. 8C. The construction in this example can be combined with all of the examples of the first embodiment.

Figure 13:
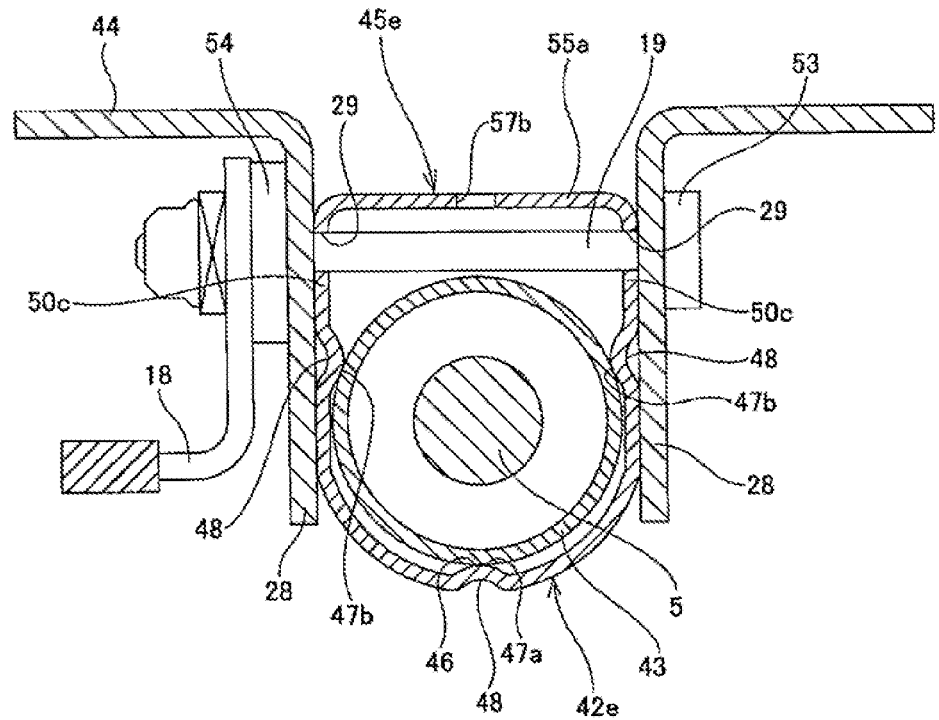
FIG. 13 illustrates a sixth example of the first embodiment of the present invention, and is the cross-sectional view similar to FIG. 1.

The outer column 42*e* of the steering column apparatus of this example is assembled as illustrated in FIG. 13. In this assembled state, the operation when adjusting the position in the forward/backward direction of the steering wheel 1, and the operation when fastening the position of the steering wheel 1 after adjustment is the same as the operation of the apparatus of the first example of the first embodiment.

In the case of this example, the displacement bracket 45*e* protrudes upward from the front end section of the outer column 42*e*. Therefore, the rod shaped member 19 is not located below the front end section of the outer column 42*e*, which can simplify the design of construction that can prevent interference with the knees of the driver. The construction and function of other parts is the same as in the fourth example of the first embodiment.

Embodiment 1

Example 7

Figure 14:
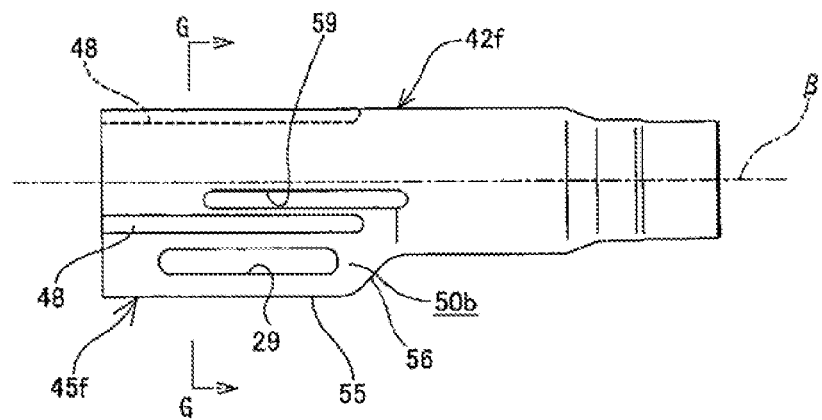
FIG. 14 illustrates just the removed outer column of a seventh example of the first embodiment of the present invention.
Figure 15:
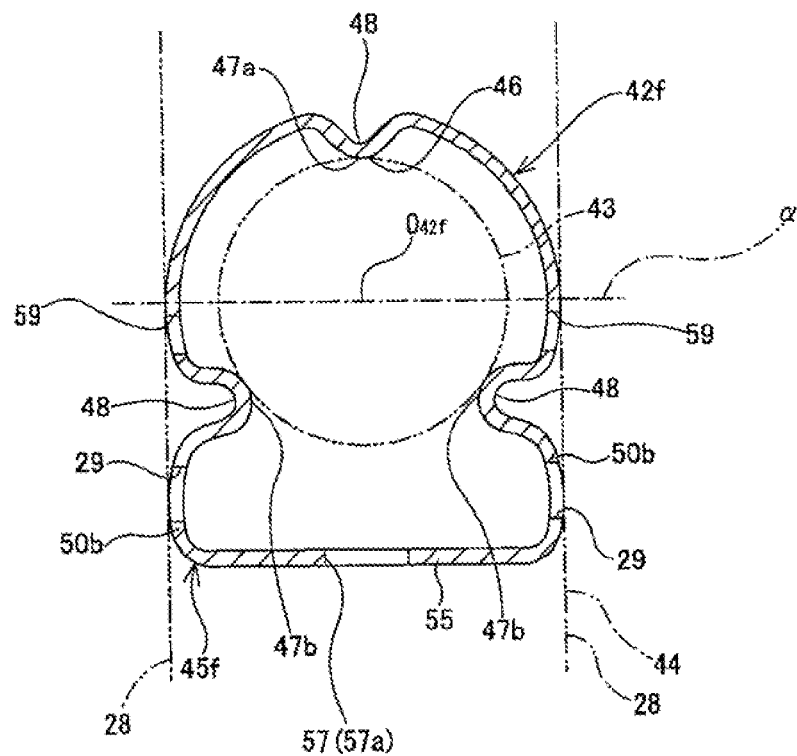
FIG. 15 is a cross-sectional view of section G-G in FIG. 14.

FIG. 14 and FIG. 15 illustrate a seventh example of the first embodiment of the present invention. The outer column 42*f* of the steering column apparatus of this example has the same basic construction as the outer column 42*c* of the fourth example of the first embodiment. In this example, a pair of long column holes 59 that are long in the axial direction are formed in the outer column 42*f* in the portion of the outer column 42*f* extends in the axial direction from the portion a little further toward the rear than the center section in the axial direction of the through holes 29 on the column side to the portion a little further to the rear than the rear end section in the axial direction of the displacement bracket 45*f* (the front end section of the connecting section 56 that connects the rear end in the axial direction of the bottom section 55 and the outer circumferential surface of the outer column 42*f*). The position of the front ends in the axial direction of these long column holes 59 is not limited to the position in this example, and can be formed at a position further toward the front than the front end of the through holes 29 on the column side.

The long column holes 59 are formed in the circumferential direction of the outer column 42*f* further toward the displacement bracket 45*f* side (downward in FIG. 14 and FIG. 15) than a virtual plane α that passes through the center axis $O_{42f}$ of the inscribed circle (outer circumferential surface of the inner column 43) of the support section 46 of the outer column 42*f*, and that is orthogonal to the support plate sections 28 of the fastened bracket 44, and above the lower raised sections 47*b* of the raised sections 47*a*, 47*b* of the support section 46.

In this example, the long column holes 59 are formed at two locations in the circumferential direction of the outer column 42*f*, however, the position where these long column holes 59 are formed and the number can be appropriately set in consideration of the support rigidity (tightening force) applied to the inner column 43.

With the steering apparatus of this example, the rigidity in the width direction of the displacement bracket 45*f* of positions aligned in the axial direction with the long column holes 59 can be reduced. Particularly, there is a connecting section 56 in the rear end section in the axial direction of the displacement bracket 45*f*, so when compared with the front end section in the axial direction, the rigidity is higher. Therefore, in this example, the position in the axial direction of the rear end section of the long column holes 59 is a little further toward the rear than the connecting section. Consequently, the rigidity in the width direction of the rear end section in the axial direction of the displacement bracket 45*f* can be reduced. This example can be combined with the other examples of the first embodiment. The other construction and functions are the same as in the fourth example of the first embodiment.

Embodiment 1

Example 8

Figure 16:
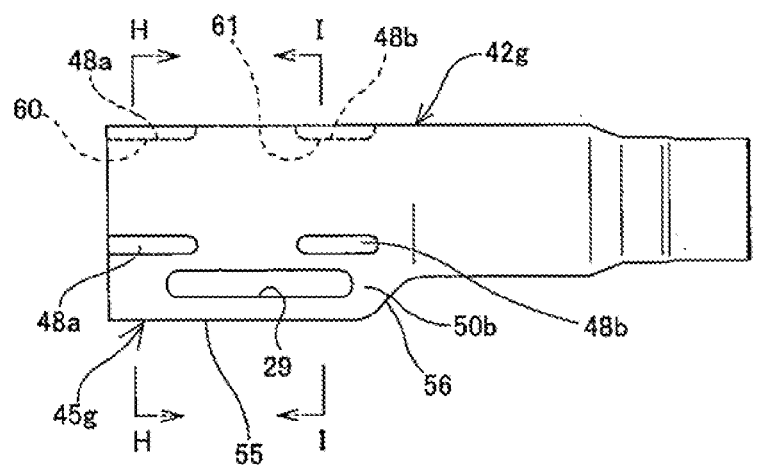
FIG. 16 is a side view that illustrates just the removed outer column of an eighth example of the first embodiment of the present invention.
Figure 17:
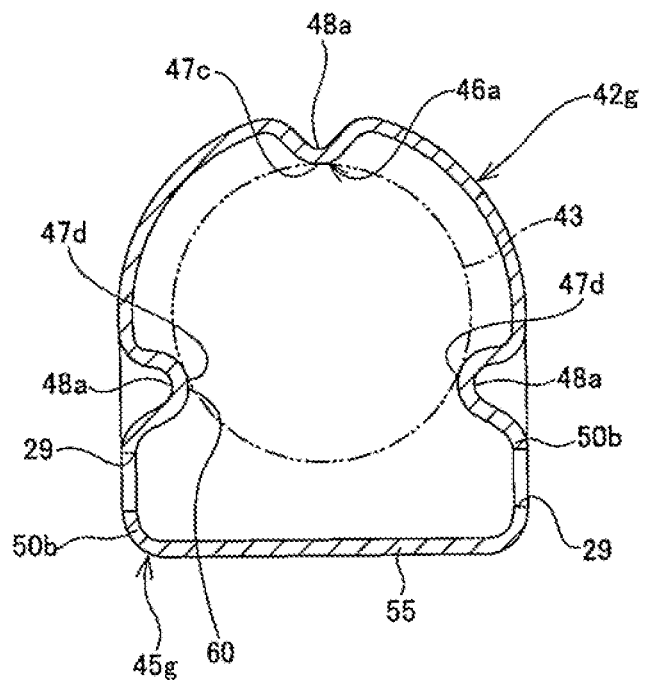
FIG. 17A is a cross-sectional view of section H-H in FIG. 16.
FIG. 17B is a cross-sectional view of section I-I.
Figure 17:
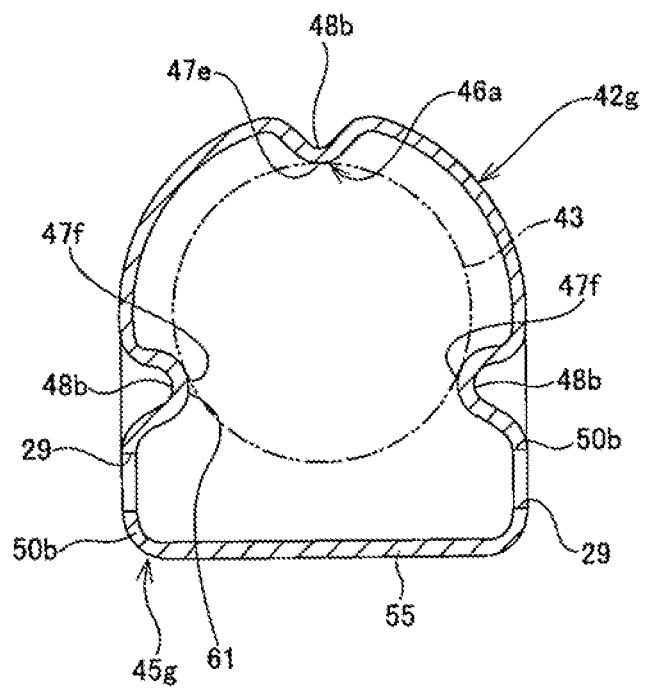

FIG. 16 and FIGS. 17A and 17B illustrate an eighth example of the first embodiment of the present invention. The outer column 42g of the steering column apparatus of this example has the same basic construction as the outer column 42c of the fourth example of the first embodiment. In this example, the support section 46a of the outer column 42g comprises a front support section 60 and a rear support section 61. Both the front support section 60 and the rear support section 61 are provided at positions where even when the dimension in the axial direction of the overlapping portion of the outer column 42g and the inner column 43 in radial direction is a minimum, contact with the outer circumferential surface of the inner column 43 is possible.

The front support section 60 comprises raised sections 47c, 47d that are formed at three uniformly spaced locations in the circumferential direction on the inner circumferential surface of the outer column 42g that are parallel in the axial direction and that extend from the front end section of the outer column 42g to the portion near the front end of the through holes 29 on the column side of the displacement bracket 45g, and protrude inward in the radial direction from the inner circumferential surface of the outer column 42g. Moreover, concave sections 48a that are recessed inward in the radial direction from the outer circumferential surface of the outer column 42g are formed at positions on the outer circumferential surface of the outer column 42g that correspond in the circumferential direction with the raised sections 47c, 47d.

On the other hand, the rear support section 61 comprises raised sections 47e, 47f that are formed at three uniformly spaced locations in the circumferential direction on the inner circumferential surface of the outer column 42g that are parallel in the axial direction and that extend from portions near the rear end of the through holes 20 on the column side of the displacement bracket 45g to the positions that separated a little toward the rear from the rear end sections of the through holes 29 on the column side, and protrude inward in the radial direction from the inner circumferential surface of the outer column 42g. Moreover, concave sections 48b that are recessed inward in the radial direction from the outer circumferential surface of the outer column 42g are formed at positions on the outer circumferential surface of the outer column 42g that correspond in the circumferential direction with the raised sections 47e, 47f.

The portion on the inner circumferential surface of the outer column 42g in between the front support section 60 and rear support section 61 in the axial direction does not come in contact with the outer circumferential surface of the inner column 43. In this example, raised sections and concave sections are not formed in this portion, and the outer circumferential surface of the outer column 42g connects direction with the displacement bracket 45g.

In the case of the steering column apparatus of this example, regardless of the overlapped state in the radial direction of the outer column 42g and the inner column 43, it is possible to always support the inner column 43 by the front support section 60 and the rear support section 61 of the support section 46a of the outer column 42g at that same two positions in the axial direction. Therefore, even when a moment is applied between the inner column 43 and the outer column 42g that causes the center axis lines of the inner column 43 and the outer column 42g to incline in the up/down direction, for example, it is possible for the front support section 60 and the rear support section 61 to stably support the inner column 43. This example can be combined with the other examples of the first embodiment. The other construction and functions are the same as in the fourth example of the first embodiment.

Embodiment 1

Example 9

Figure 18:
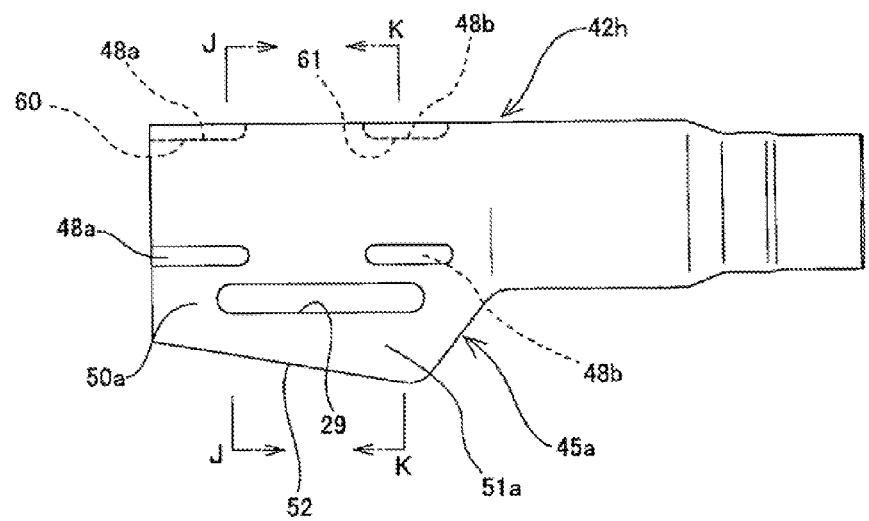
FIG. 18 is a side view that illustrates just the removed outer column of a ninth example of the first embodiment of the present invention.
Figure 19:
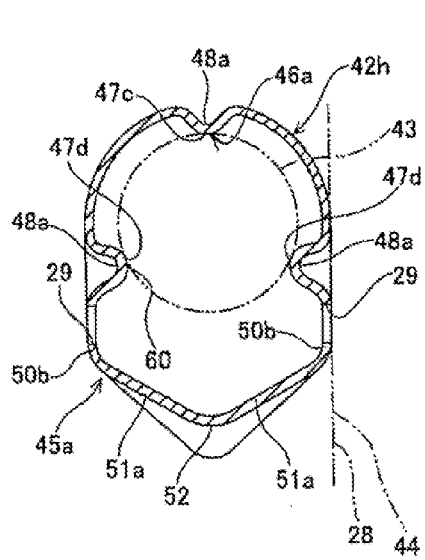
FIG. 19A is a cross-sectional view of section J-J in FIG. 18.
FIG. 19B is a cross-sectional view of section K-K.
Figure 19:
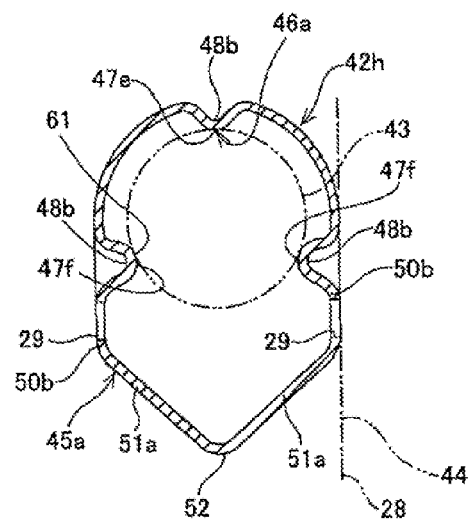
Figure 20:
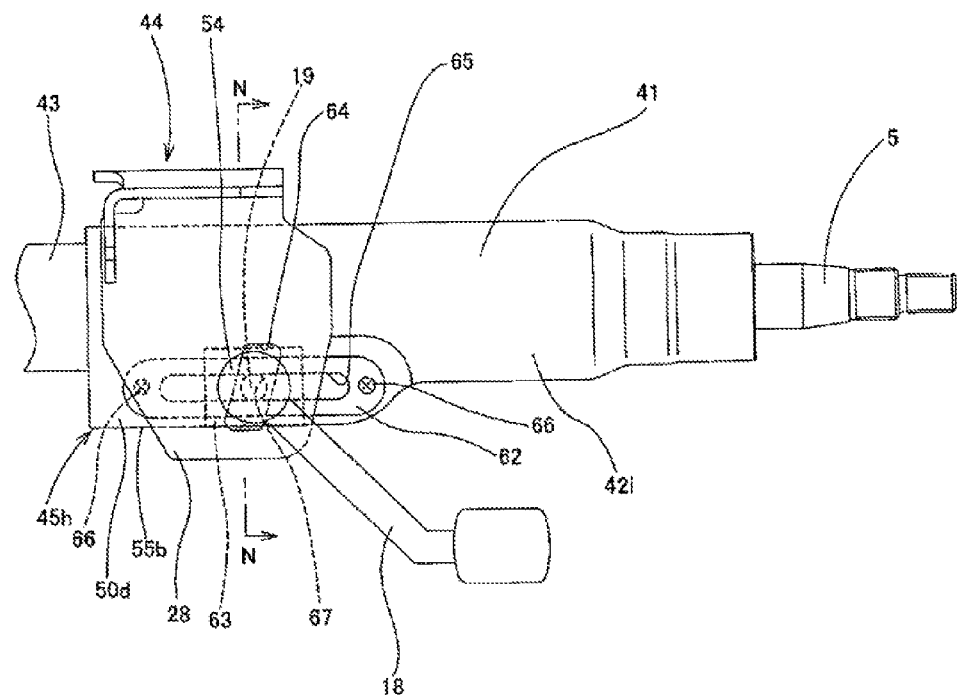
FIG. 20 is a partial side view illustrating a tenth example of the first embodiment of the present invention.
Figure 21:
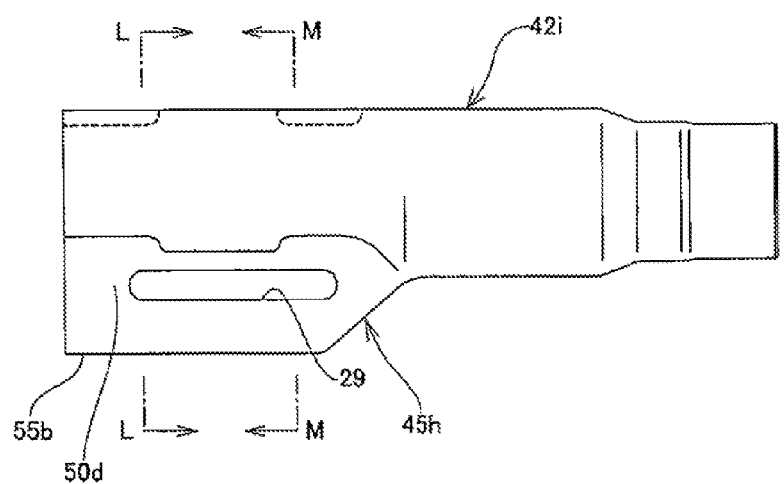
FIG. 21 illustrates just the removed outer column of a tenth example of the first embodiment of the present invention.

FIG. 18 and FIGS. 19A and 19B illustrate a ninth example of the first embodiment of the present invention. The outer column 42h of the steering column apparatus of this example has the same basic construction as the outer column 42a of the second example of the first embodiment. In this example, the support section 46a of the outer column 42h comprises a front support section 60 and rear support section 61. The front support section 60 and rear support section 61 are provided at the same positions as in the construction of the eighth example of the first embodiment, and when the dimension in the axial direction of the overlapping portion of the outer column 42h and the inner column 43 is a minimum, both the front support section 60 and the rear support section 61 can come in contact with the outer circumferential surface of the inner column 43. This example can be combined with the other examples of the first embodiment. The other construction and functions are the same as in the second example and eighth example of the first embodiment.

Embodiment 1

Example 10

FIG. 20 to FIG. 23 illustrate a tenth example of the first embodiment of the present invention. The construction of the steering column of this example is different from the construction of the apparatuses of the other examples of the first embodiment in that a first friction plate 62 and a second friction plate 63 are provided, and the construction of the displacement bracket 45h has been devised in order to provide these friction plates 62, 63.

As in each of the examples of the first embodiment, the outer column 42i of the steering column apparatus of this example is cylindrical and the inner diameter of at least part in the axial direction is able to elastically expand and contract, and this outer column 42i comprises a support section 46b for supporting an inner column 43 on the inner diameter side of this outer column 42i so as to be able to displace in the axial direction.

This support section 46b comprises a front support section 60a and a rear support section 61a. The positions in the axial direction of the front support section 60a and rear support section 61a are the same as in the eighth example of the first embodiment.

The front support section 60a comprises raised sections 47g, 47h that are formed at three uniformly spaced locations in the circumferential direction on the inner circumferential surface of the outer column 42i that are parallel in the axial direction and that extend from the front end section of the outer column 42i to the portion near the front end of the through holes 29 on the column side of the displacement bracket 45h, and protrude inward in the radial direction from the inner circumferential surface of the outer column 42i. The raised section 47g is formed at one position on the inner circumferential surface at the top in FIG. 22A. On the other hand, the raised sections 47h are formed at two locations that are uniformly spaced in the circumferential direction and separated from the raised section 47g (separated by 120° in the figure). The edges on the tip ends of these raised sections 47g, 47h come in contact with the outer circumferential surface of the inner column 43.

On the other hand, the rear support section 61a comprises raised sections 47i, 47j that are formed at three uniformly spaced locations in the circumferential direction on the inner circumferential surface of the outer column 42*i* that are parallel in the axial direction and that extend from the portion near the rear end of the through holes 29 on the column side of the displacement bracket 45*h* to a position that is separated a little to the rear from the edges on the rear end of the through holes 29 on the column side, and as in the front support section 60*a*, these raised sections 47*i*, 47*j* protrude inward in the radial direction from the inner circumferential surface of the outer column 42*i*. The raised section 47*i* is formed at one position on the inner circumferential surface at the top in FIG. 22B. On the other hand, the raised sections 47*j* are formed at two locations that are uniformly spaced in the circumferential direction and separated from the raised section 47*i* (separated by 120° in the figure). The edges on the tip ends of these raised sections 47*i*, 47*j* come in contact with the outer circumferential surface of the inner column 43. The portion on the inner circumferential surface of the outer column 42*i* that is between the front support section 60*a* and the rear support section 61*a* in the axial direction does not come in contact with the outer circumferential surface of the inner column 43.

Figure 23:
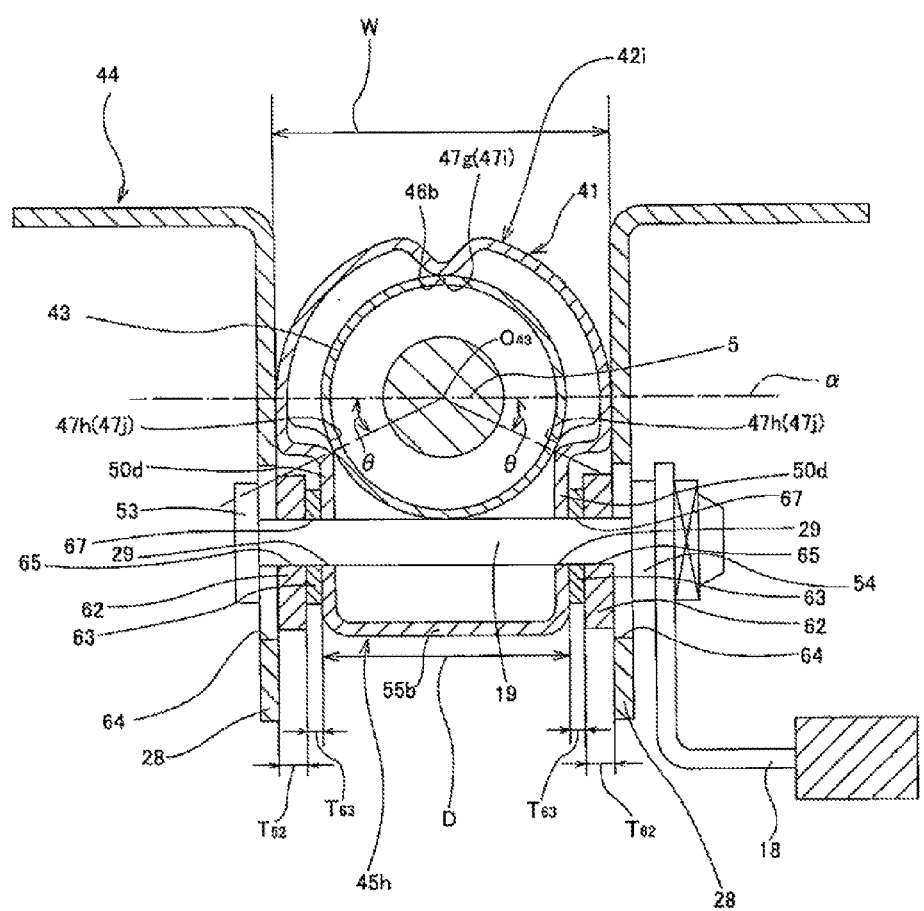
FIG. 23 is a cross-sectional view of section N-N in FIG. 20.

In a state that the outer column 42*i* is assembled as illustrated in FIG. 23, both end surfaces in the width direction (left/fright direction in FIG. 23) of outer circumferential surface of the outer column 42*i* comes in contact with the inside surfaces of the support plate sections 28 of the fastened bracket 44. In this way, the support rigidity in the width direction is increased, and vibration of the steering column 41 in the width direction becomes difficult.

Figure 22:
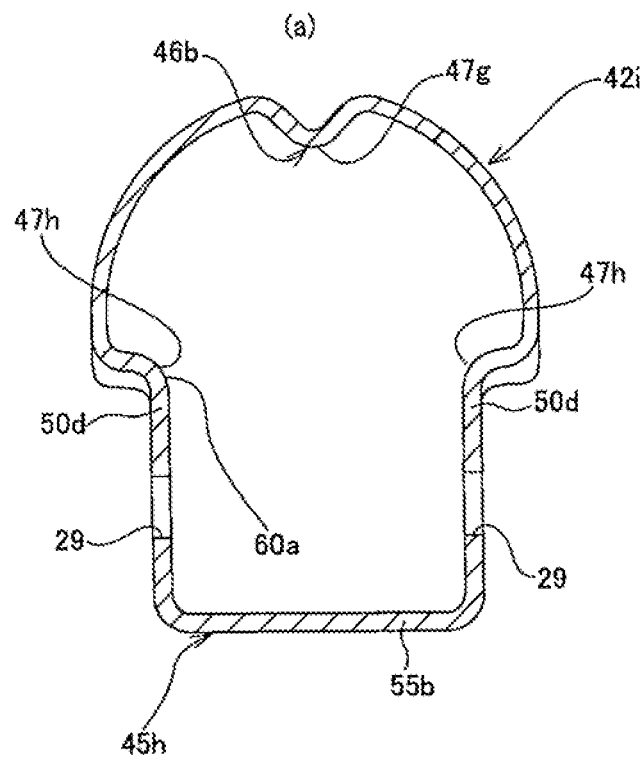
FIG. 22 A is a cross-sectional view of section L-L in FIG. 21.
Figure 22:
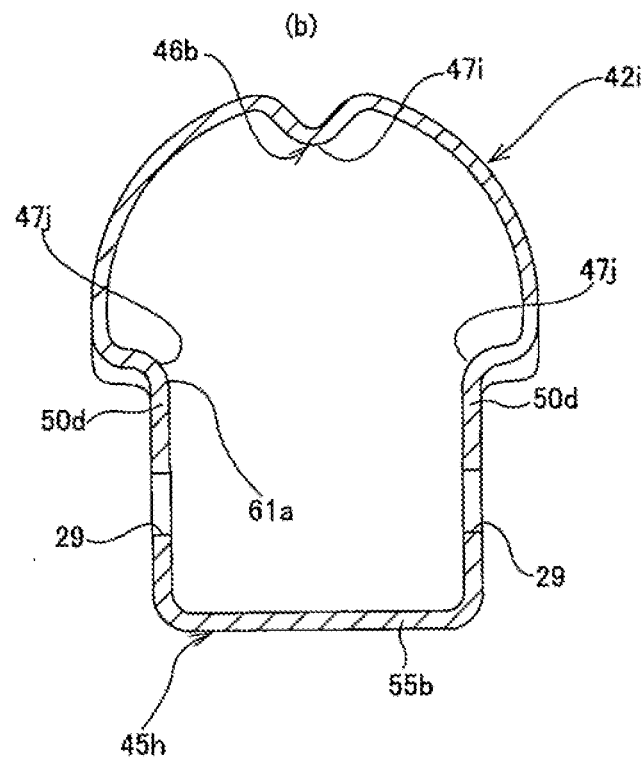

Of the raised sections 47*g*, 47*h* (47*i*, 47*j*) of the front support sections 60*a* and rear support section 61*a*, the raised sections 47*h* (47*j*) that are formed in the lower part in FIG. 22 and FIG. 23, and the outer circumferential surface of the inner column 43 come in contact at positions that are inclined at an angle θ (30° in the example in the figure) on the displacement bracket 45*h* side with respect to a virtual plane α that passes through the center $0_{43}$ of the inner column 43 and is orthogonal to the support plate sections 28. The larger the angle θ is, or in other words, the smaller the dimension in the width direction the space between the raised sections 47*h* (47*j*) that are formed in lower part illustrated in FIG. 23 is, the larger the support rigidity in the up/down direction of the outer column 42*i* can be, and formability of the displacement bracket 45*h* can be improved. However, when the angle θ is too large, the support rigidity in the width direction decreases. Therefore, the size of this angle θ is appropriately set in consideration of the support rigidity that is required in each direction, and the thickness of the first friction plate 62 and second friction plate 63.

Figure 47:
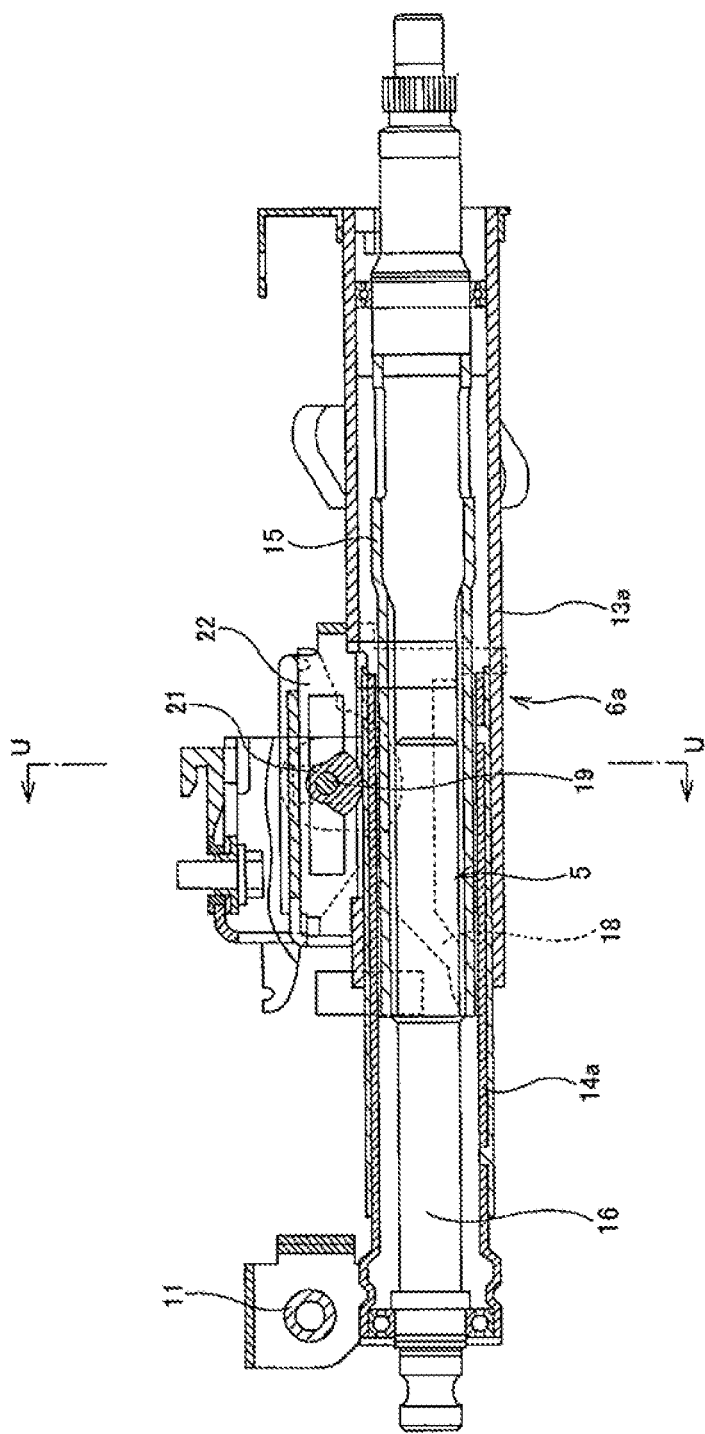
FIG. 47 is a vertical cross-sectional side view illustrating a first example of a conventional steering column apparatus.
Figure 48:
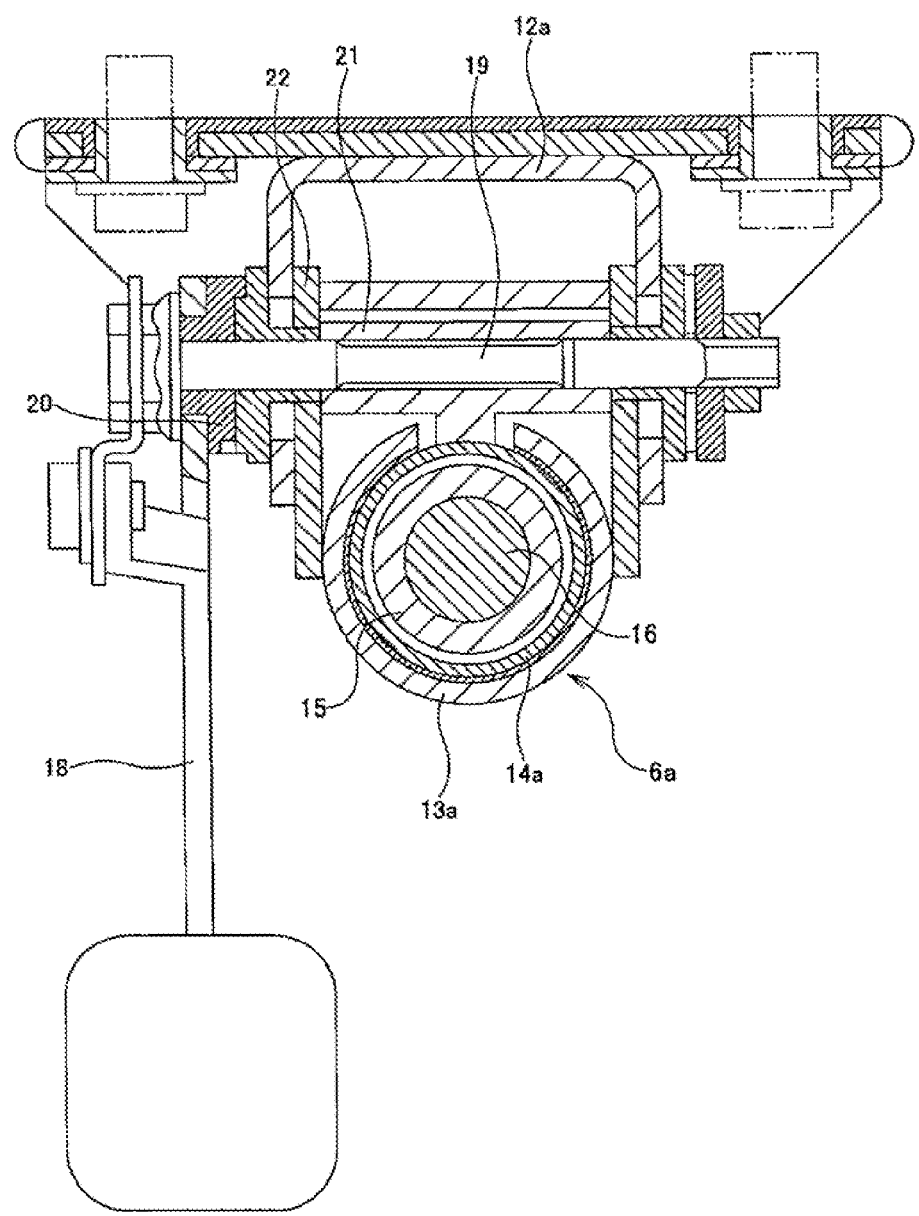
FIG. 48 is an enlarged cross-sectional view of section U-U in FIG. 47.
Figure 49:
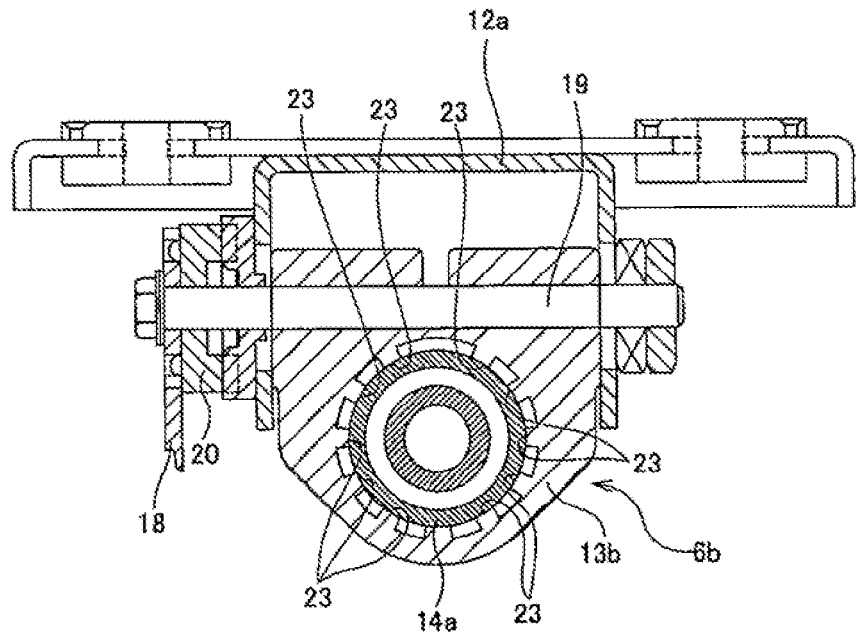
FIG. 49 illustrates a second example of a conventional steering column apparatus, and is a cross-sectional view similar to that of FIG. 48.

In this example, the displacement bracket 45*h* protrudes upward from the front end section of the outer column 42*i*, and comprises a pair of clamped sections 50*d*, which are capable of expanding and contracting in the width direction as the pair of support plate sections 28 of the fastened bracket 44 expand or contract in the width direction, and a bottom section 55. Through holes 64 on the vehicle side that are long in the up/down direction and through which the rod shaped member 19 can inserted are formed at positions in the support plate sections 28 of the fastened bracket 44 that are aligned with each other. As a result, as a steering apparatus comprising a tilt mechanism, the steering column 41 is supported by the vehicle body 10 such that pivotal displacement around a pivot shaft 11 that is arranged in the width direction is possible (FIG. 47).

The clamped sections 50*d* are such that one of the ends is continuous from the bottom ends of the lower raised sections 47*h*, 47*j* of the raised sections 47*g*, 47*h* (47*i*, 47*j*) of the outer column 42*i* and are parallel with the pair of support plate sections. The portion on the outer column 42*i* that is between the front support section 60*a* and the rear support section 61*a* in the axial direction is such that both ends in the width direction (left/right direction in FIG. 22 and FIG. 23) of the outer column 42*i* are bent toward the inside in the width direction, and connected to the edges on the top ends of the clamped sections 50*d*. Moreover, the width W in the width direction of the inside surfaces in the width direction of the support plate sections 28 is the same as the length D between the outside surfaces in the width direction (left/right direction in FIG. 23) of the clamped sections 50*d* and the total $T_{ALL}$ ($T_{ALL}=2T_{62}+2T_{63}$) of the thickness $T_{62}$ of each first friction plate 62 and the thickness $T_{63}$ of each second friction plate 63 ($W \approx D+T_{ALL}$). Furthermore, through holes 29 on the column side that are long in the axial direction are formed in positions in the clamped sections 50*d* that are aligned with each other.

The bottom section 55*b* connects between the edges on the bottom ends of the clamped sections 50*d*. Therefore, the displacement bracket 45*h* is in the shape of a box that is open in front. Moreover, first friction plates 62 and second friction plates 63 are arranged in the portions between the inside surfaces in the width direction of the support plate sections 28 and the outside surfaces in the width direction of the clamped sections 50*d*. In this example, there is one first friction plate 62 and one second friction plate 63 in each portion, and the second friction plate 63 is located on the inside in the width direction of the first friction plate 62. The positional relationship in the width direction of these friction plates 62, 63 could be opposite that of this example.

The first friction plate is a plate shaped member that is long in the forward/backward direction and is made of a ferrous alloy, or a light alloy such as an aluminum alloy or magnesium alloy. Moreover, long holes 65 on the first friction plate side that are long in the forward/backward direction and through which the rod shaped member can be inserted are formed in the portions of the first friction plates 62 that are aligned at least with the through holes 29 on the column side that are formed in the clamped sections 50*d*. The first friction plates 62 are such that the portions near the rear ends and the portions near the front ends are supported by the clamped sections 50*d* by guide pins 66 such that displacement in the width direction is possible, but displacement in the axial direction and displacement in the up/down direction is prevented. In other words, the first friction plates 62 are supported by the displacement bracket 45*h* such that they can move together with the displacement bracket 45*h* in the axial direction and up/down direction.

On the other hand, the second friction plates 63 are plate shaped members that are made of a ferrous alloy or a light alloy such as an aluminum alloy or magnesium alloy. Through holes 67 on the second friction plate side, through which the rod shaped member can be inserted such there is no backlash, are formed in the center position of the second friction plates 63. In other words, when the rod shaped member 19 is inserted through the through holes 67 on the second friction plate side, the second friction plates 63 can move together with the rod shaped member 19, and can displace in the axial direction of this rod shaped member 19.

The outer column 42*i*, the first friction plates 62 and the second friction plates 63 of the steering column apparatus of this example are assembled as illustrated in FIG. 23. In the assembled state as illustrated in FIG. 23, when adjusting the position in the forward/backward direction of the steering wheel 1, the adjustment lever 18 is rotated in a specified direction, and the space in the width direction between the nut 54, which is a pressure member and that is provided on one end (right end in FIG. 23) of the rod shaped member 19, and the head section 53, which is a pressure member that is provided on the other end of the rod shaped member 19, is expanded. As a result, the space between the inside surfaces of the support plate sections 28 is elastically expanded and the contact pressure at the areas of contact between the support plate sections 28, the first friction plates 62, the second friction plates 63 and the clamped sections 50 is reduced or lost. Therefore, the contact pressure in the fitting section between the support section 46b (front support section 60a, rear support section 61a) of the outer column 42i and the outer circumferential surface of the inner column 43 is reduced or lost, and the outer column 42i and the inner column 43 can displace relative to each other in the axial direction (forward/backward direction). As a result, it is possible to adjust the forward/backward position and up/down position of the steering wheel 1.

After the position has been adjusted, by rotating the adjustment lever 18 in the opposite direction of the specified direction, the space between the nut 54 and the head section is reduced. In doing so, the space between the inside surfaces of the support plate sections 28 is reduced, and the contact pressure at the areas of contact between the support plate sections 28, the first friction plates 62, the second friction plates 63 and the clamped sections 50d is increased. As this happens, the contact pressure in the fitting sections between the support section 46c (front support section 60a, rear support section 61a) of the outer column 42i and the outer circumferential surface of the inner column 43 increases. As a result, the steering wheel 1 is maintained at the adjusted position. When performing operation to maintain the steering wheel 1 at the adjusted position, the inner diameter of the outer column 42i can be caused to contract not only by pressing the clamped sections 50d by way of the first friction plates 62 and second friction plates 63 but also by pressing the both end portions in the width direction of the outer circumferential surface of the outer column 42i.

In the case of the steering column apparatus of this example, a first friction plate 62 and second friction plate 63 are provided for each clamped section 50d. Therefore, the total friction surface area at the area of contact between the support plate sections 28, the first frictions plates 62, second friction plates 63 and clamped sections 50d is increased, so the total friction force can be increased. As a result, the steering wheel 1 can be stably maintained at the adjusted position. It is possible to use a larger number of friction plates 62, 63 than used in this example and further increase the holding force for maintaining the steering wheel 1 in the adjusted position. Moreover, the support section 46b of this example can have construction wherein the front and rear are integrated as in support section 46. Furthermore, this example can be combined with the other examples of the first embodiment. The other construction and functions are the same as in the third example and eighth example of the first embodiment.

Embodiment 1

Example 11

Figure 24:
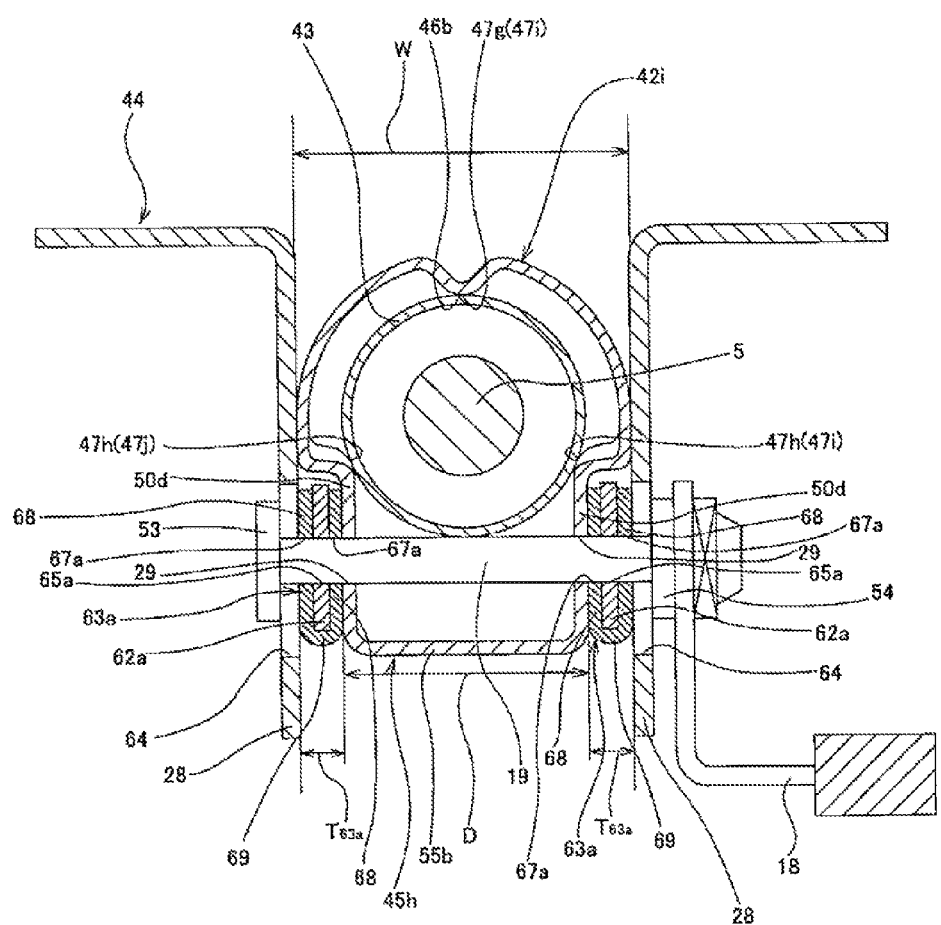
FIG. 24 illustrates an eleventh example of the first embodiment of the present invention, and is a cross-sectional view similar to FIG. 23.

FIG. 24 illustrates an eleventh example of the first embodiment of the present invention. The steering column apparatus of this example, as in the tenth example of the first embodiment, has one first friction plate 62a and one second friction plate 63a for each space between the inside surfaces in the width direction of both support plate sections 28 of the fastened bracket 44 and the outside surfaces in the width direction of both clamped sections 50d of the displacement bracket 45h. In this example, the dimension W in the width direction between the inside surfaces in the width direction of the support plate sections 28 is the same as the length D between the outside surfaces in the width direction of the clamped sections 50d, and the total thickness $T_{ALL}$ ($T_{ALL}=2T_{63a}$) of the thickness T63a of the second friction plates 63a (W≈D+$T_{ALL}$).

As in the construction of the first friction plates 62 of the tenth example of the first embodiment, the first friction plates 62a are plate shaped members that are long in the forward/backward direction, and are made of a ferrous alloy or a light alloy such as an aluminum alloy or magnesium alloy. Moreover, long holes 65a on the first friction plate side that are long in the forward/backward direction and through which the rod shaped member 19 can be inserted are formed in the portions of the first friction plates 62a that are aligned at least with the through holes 29 on the column side that are formed in the clamped sections 50d. The first friction plates 62a, as in the case of the first friction plates 62 of the tenth example of the first embodiment, are such that the portions near the rear ends and the portions near the front ends are supported by the clamped sections 50d using guide pins 66 (FIG. 20) such that only displacement in the width direction is possible. In other words, the first friction plates 62a are supported by the displacement bracket 45h such that they can move together with the displacement bracket 45h in the axial direction and up/down direction.

On the other hand, the second friction plates 63a have a U-shaped cross section, and comprise a pair of friction plate sections 68 that are parallel with each other, and a connecting section 69 that connects the bottom end sections of the these friction plate sections 69. The second friction plates 63a are formed by bending a plate shaped member that is made of a ferrous alloy or a light alloy such as an aluminum alloy or a magnesium alloy. Moreover, through holes 67a on the second friction plate side, through which the rod shaped member 19 can be inserted such there is no backlash, are formed in portions of the friction plate sections 68 that are aligned with each other. In other words, when the rod shaped member 19 is inserted through the through holes 67a on the second friction plate side, the second friction plates 63a can move together with the rod shaped member 19, and can displace in the axial direction of this rod shaped member 19.

The first friction plates 62a and second friction plates 63a are arranged such that, for each of the spaces between the inside surfaces in the width direction of the support plate sections 28 of the fastened bracket 44 and the clamped sections 50d of the displacement bracket 45h, the connecting section 69 of the second friction plates 63a is located on the lower side and the first friction plate 62a is held between the friction plate sections 68 of the second friction plate 63a.

In the case of the steering column apparatus of this example, it is possible to further increase the total friction surface area of the area of contact between the first friction plates 62a and the second friction plates 63a and increase the friction force more than in the case of the construction of the tenth example of the first embodiment. Therefore, it is possible to stably maintain the steering wheel 1 in the adjusted position. The support section 46b of this example can be constructed such that the front and rear are integrated as in the support section 46. The other construction and functions are the same as in the tenth example of the first embodiment.

Embodiment 1

Example 12

Figure 25:
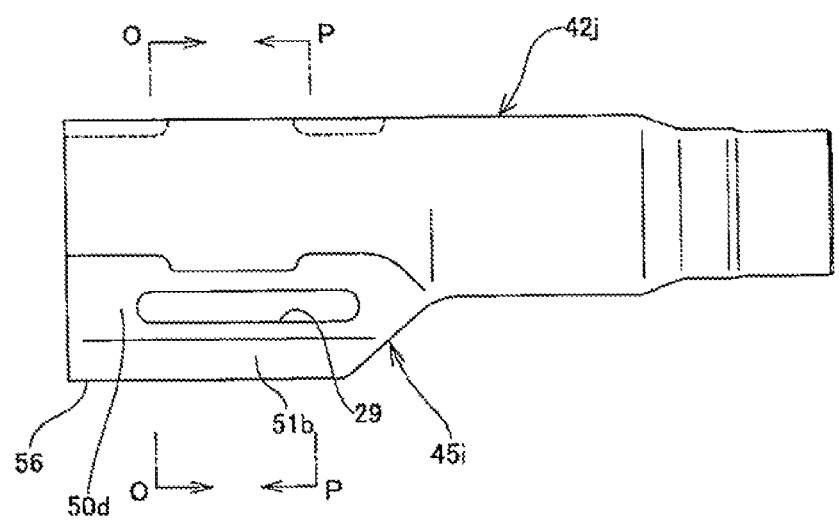
FIG. 25 is a side view illustrating just the removed outer column of a twelfth example of the first example of the present invention.
Figure 26:
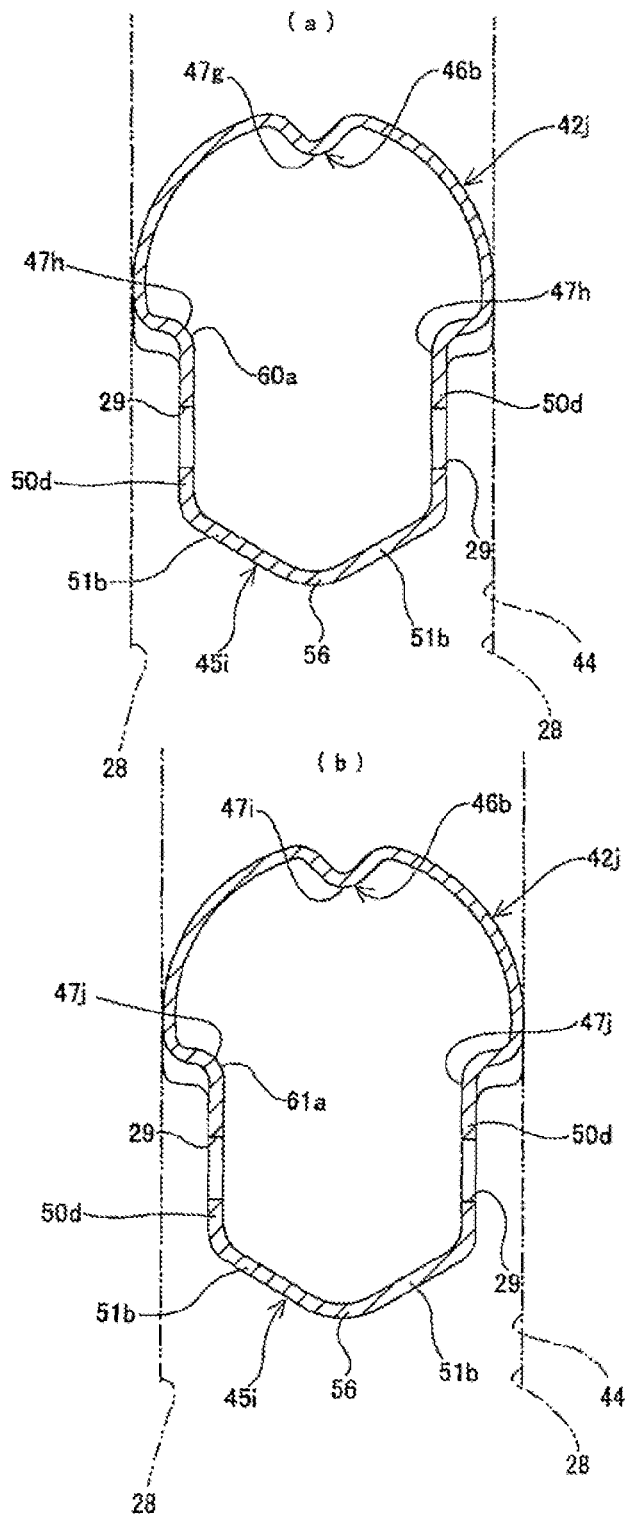
FIG. 26A is a cross-sectional view of section O-O in FIG. 25.
FIG. 26B is a cross-sectional view of section P-P.

FIG. 25 and FIGS. 26A and 26B illustrate a twelfth example of the first embodiment of the present invention. The construction of the steering apparatus of this example differs from the construction of the tenth example of the first embodiment in that inclined sections 51b are provided on the other end (bottom end in FIG. 26) of the clamped sections 50d of the displacement bracket 45i. Other than the inclined sections 51b, the construction of the outer column 42j and the displacement bracket 45i is the same as the construction of the outer column 42i of the eleventh example of the first embodiment. The structural feature of the inclined sections 51b is the same as that of the inclined sections 51 in the first example of the first embodiment.

When the outer column 42j of the steering column apparatus of this example is assembled, a first friction plate 62 and second friction plate 63 that are the same as those of the tenth example of the first embodiment, or a first friction plate 62a and a second friction plate 63 that are the same as those of the eleventh example are arranged in each of the spaces between the inside surfaces in the width direction of the support plate sections 28 of the fastened bracket 44 and the clamped sections 50d of the displacement bracket 45i. The support section 46b of this example can also be constructed by integrating the front and the rear as in the construction of the support section 46. The other construction and functions are the same as in the first and the eleventh examples of the first embodiment.

Embodiment 1

Example 13

Figure 27:
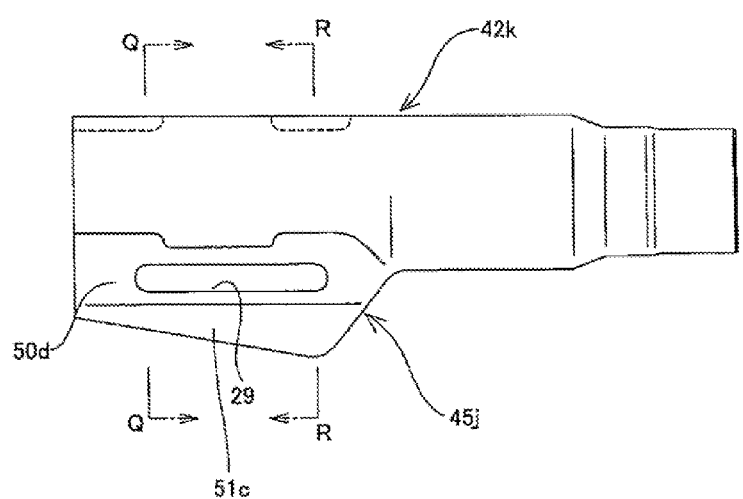
FIG. 27 is a side view illustrating just the removed outer column of a thirteenth example of the first example of the present invention.
Figure 28:
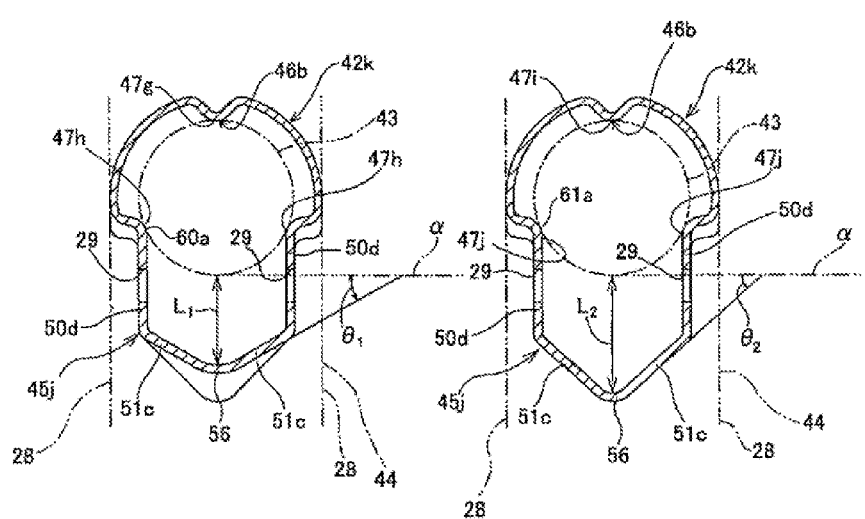
FIG. 28A is a cross-sectional view of section Q-Q in FIG. 27.
FIG. 28B is a cross-sectional view of section R-R.

FIG. 27 and FIGS. 28A and 28B illustrate a thirteenth example of the first embodiment of the present invention. The construction of the steering column apparatus of this example differs from the construction of the tenth example of the first embodiment in that inclined sections 51c are provided on the other end (bottom end in FIGS. 28A, 28B) of the clamped sections 50d of the displacement bracket 45j. Except for these inclined sections 51c, the construction of the outer column 42k and the displacement bracket 45kj are the same as the construction of the outer column 42i in the tenth example of the first embodiment. Moreover, the structural feature of the inclined sections 51c is the same as that of the inclined sections 51a of the displacement bracket 45a of the second example of the first embodiment. With the outer column 42k of the steering column apparatus of this example assembled, a first friction plate 62 and a second friction plate 63 that are the same as those of the tenth example of the first embodiment, or a first friction plate 62a and a second friction plate 63a that are the same as those of the eleventh example are arranged in each of the spaces between the inside surfaces in the width direction of the support plate sections 28 of the fastened bracket 44 and the clamped sections 50d of the displacement bracket 45j. The support section 46b of this example can also be constructed by integrating the front and the rear as in the construction of the support section 46. The other construction and functions are the same as in the second example and the tenth example of the first embodiment.

Embodiment 1

Example 14

Figure 29:
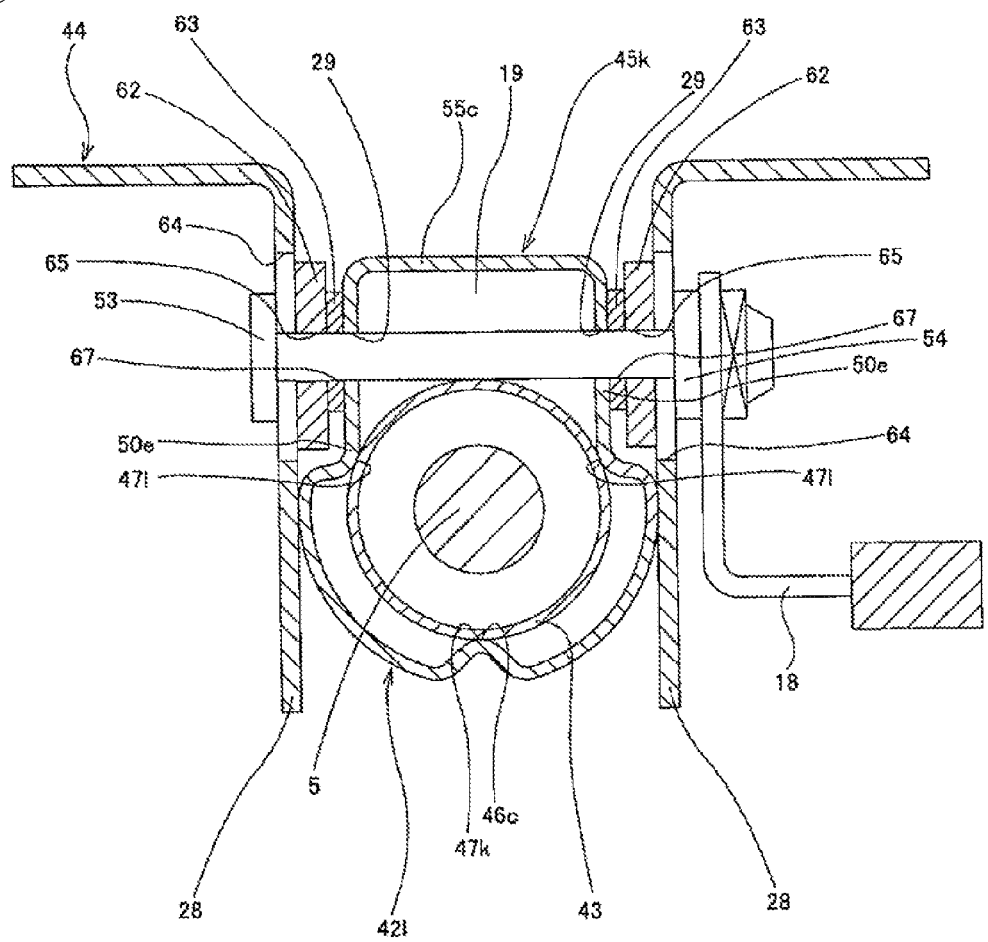
FIG. 29 illustrates a fourteenth example of the first embodiment of the present invention, and is a view similar to that of FIG. 1.

FIG. 29 illustrates a fourteenth example of the first embodiment of the present invention. The displacement bracket 45k of the steering column apparatus of this example protrudes upward from the front end section of the outer column 42l. This displacement bracket 45k is such that the support section 46c is not divided in the front and rear direction but is integrated, and basically it has the nearly symmetrical construction in the radial direction (up/down direction) as the displacement bracket 45h of the tenth example of the first embodiment, and comprises a pair of left and right clamped sections 50e and bottom section 55c.

The clamped sections 50e continue upward from the main portion of the outer column 42l, and are parallel with each other. The bottom section 55c is continuous in the width direction between the edges on one ends of the clamped sections 50e (edges on the top ends in FIG. 29). Through holes 29 on the column side that are long in the axial direction are formed in portions of the clamped sections 50e of the displacement bracket 45k that are aligned with each other.

A first friction plate 62 and a second friction plate 63 are arranged in each of the portions between the inside surfaces in the width direction of the support plate sections 28 of the fastened bracket 44 and the outside surfaces in the width direction of the clamped sections 50e of the displacement bracket 45k.

In the case of the steering column apparatus of this example, the displacement bracket 45k protrudes upward from the front end section of the outer column 42l. Therefore, the rod shaped member 19 is not located below the front end section of the outer column 42l, which can simplify the design of construction that can prevent interference with the knees of the driver. The other construction and functions are the same as in the tenth example of the first embodiment.

Embodiment 1

Example 15

Figure 30:
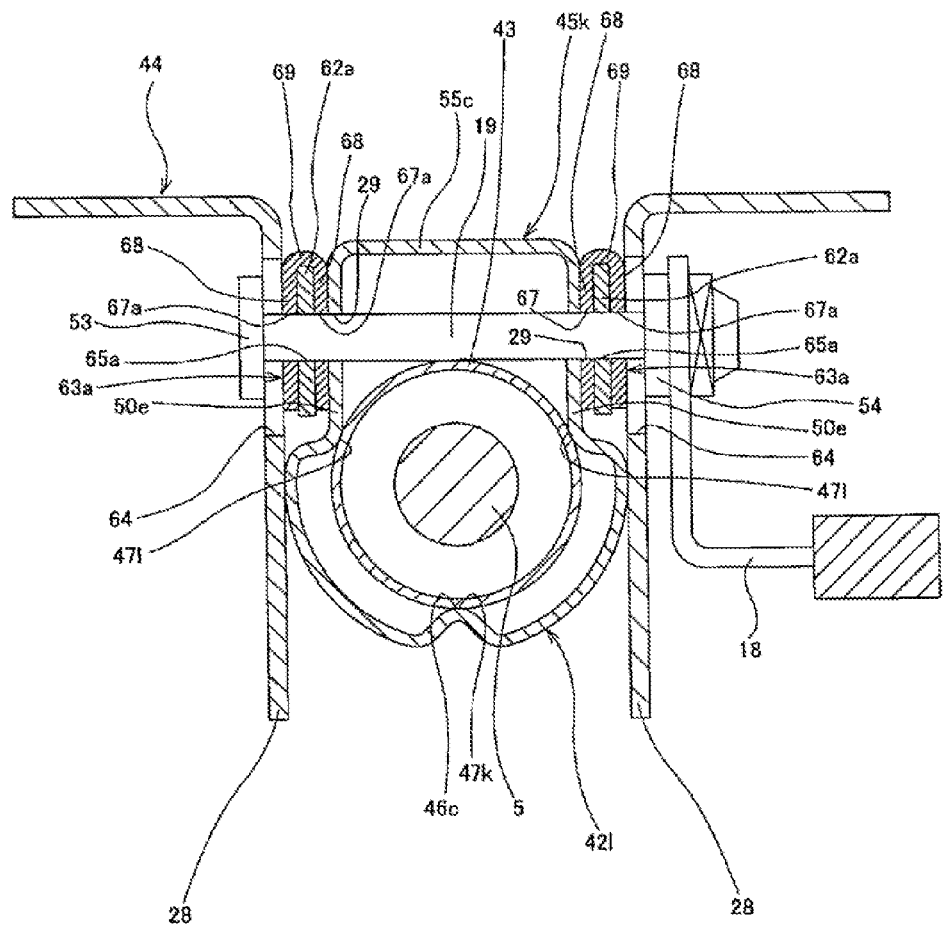
FIG. 30 illustrates a fifteenth example of the first embodiment of the present invention, and is a view similar to that of FIG. 1.

FIG. 30 illustrates a fifteenth example of the first embodiment of the present invention. The construction of the outer column 42l and the displacement bracket 45k of the steering column apparatus of this example is the same as the construction of the fourteenth example of the first embodiment.

In this example, as in the eleventh example of the first embodiment, a first friction plate 62a and a second friction plate 63a that have the same construction of those of the eleventh example of the first embodiment are arranged in the each of the portions between the inside surfaces in the width direction of the support plate sections 28 of the fastened bracket 44 and the outside surfaces in the width direction of the clamped sections 50e of the displacement bracket 45k. The other construction and functions are the same as those of the eleventh example of the first embodiment.

Embodiment 1

Example 16

FIGS. 31A to 31C and FIG. 32 illustrate a sixteenth example of the first embodiment of the present invention. In the construction of the steering column apparatus of this example as well, the outer column 42m is located in rearward of the inner column 43. Except for the support section 46c being integrated and not separated in the front and rear, the outer column 42m has the same basic construction as the outer column 42i of the tenth example of the first embodiment.

Figure 31:
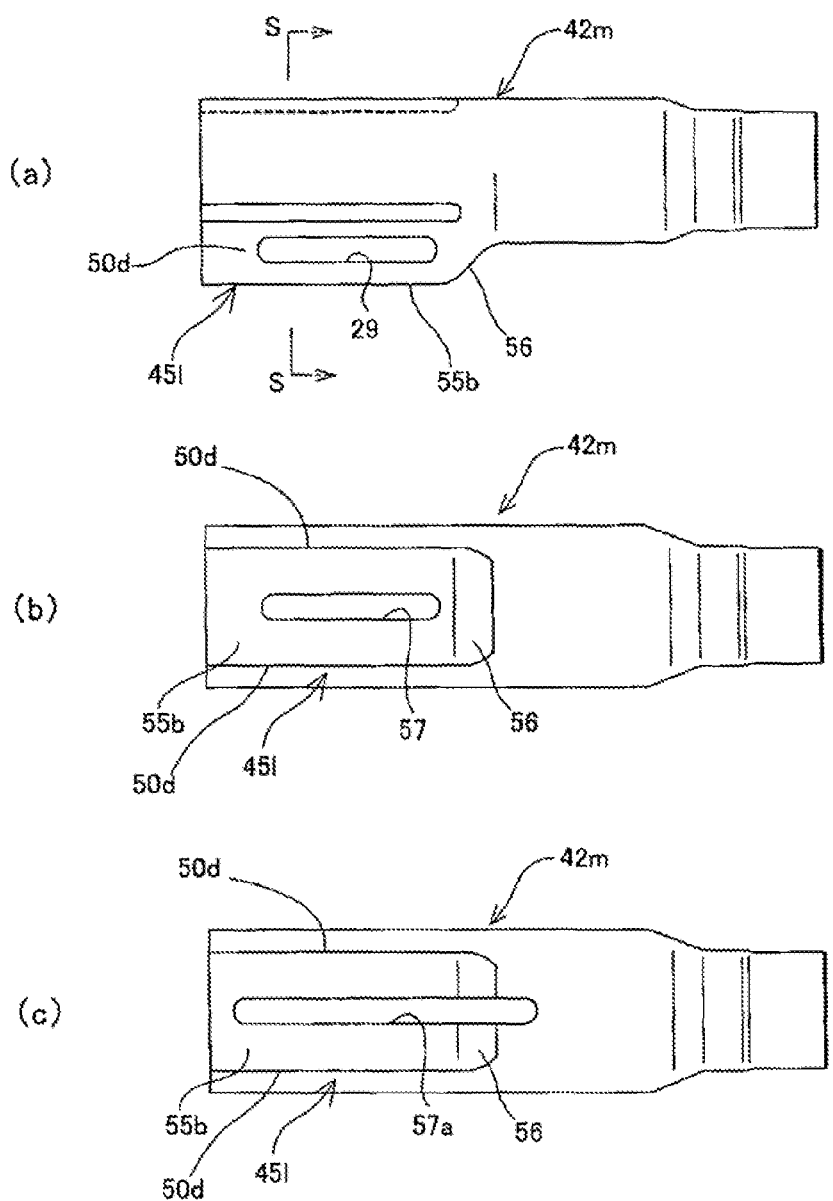
FIG. 31 illustrates a sixteenth example of the first embodiment of the present invention, where
Figure 32:
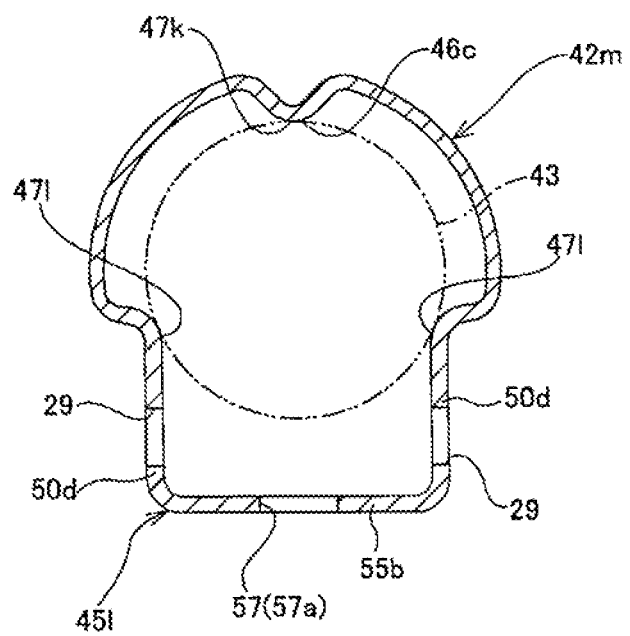
FIG. 32 is a cross-sectional view of section S-S in FIG. 31.

As illustrated in FIGS. 31B and 31C, the outer column 42m is such that a long hole 57 (57a) that is long in the axial direction is formed in a position in the center in the width direction of the bottom section 55b of the displacement bracket 45l that corresponds in the axial direction with at least the pair of left and right through holes 29 on the column side. The function of the long hole 57 (57a) is the same as in the fourth example of the first embodiment. The other construction and functions are the same as those of the fourth and tenth example of the first embodiment.

Embodiment 1

Example 17

Figure 33:
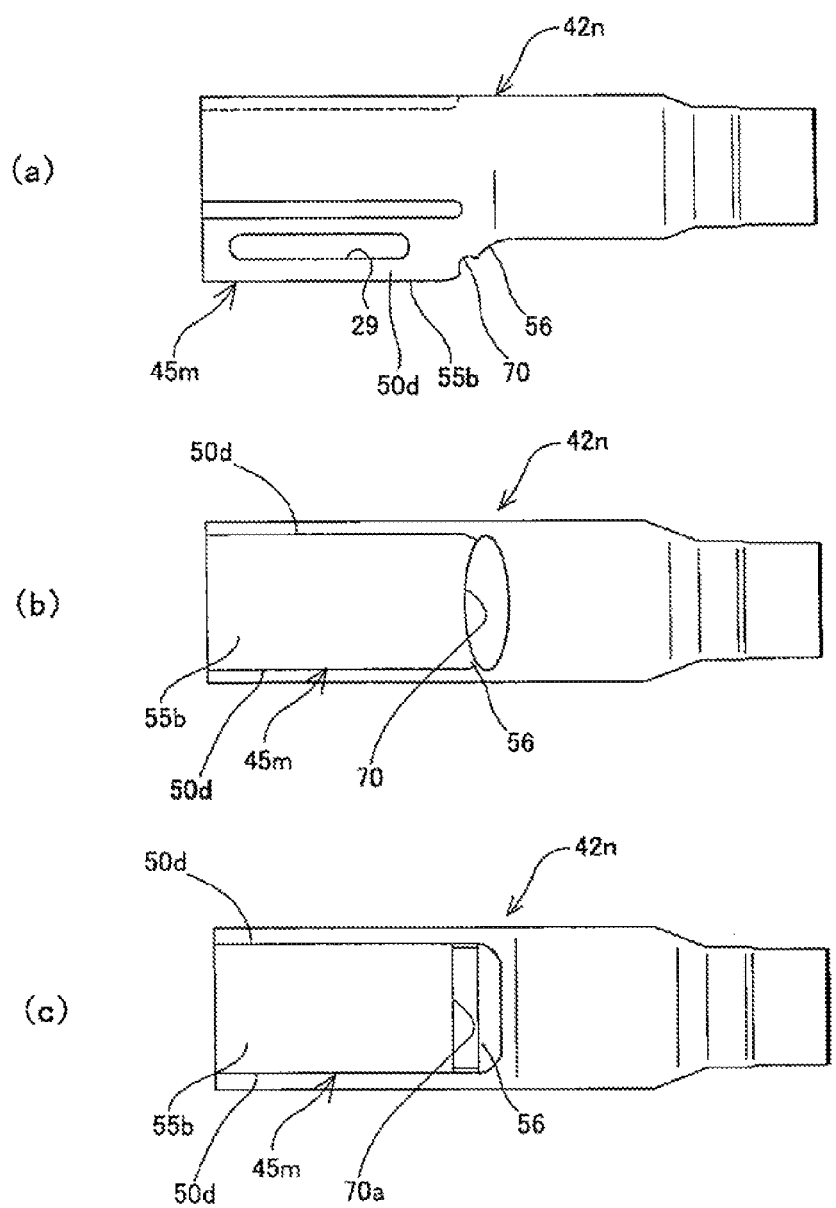
FIG. 33 illustrates a seventeenth example of the first embodiment of the present invention, where

FIG. 33 illustrates a seventeenth example of the first embodiment of the present invention. The outer column 42n of the steering column apparatus of this example, except for the support section 46c being integrated and not divided in the front and rear, has the same basic construction as the outer column 42i of the tenth example of the first embodiment.

The outer column 42n is such that a long hole 70 that is long in the width direction, which is a long circular hole that is long in the width direction, is formed in the connecting section 56 on the rear end side that connects the rear end in the axial direction of the bottom section 55b of the displacement bracket 45m and the outer circumferential surface of the outer column 42n as illustrated in FIG. 33B. The shape of the long hole 70 in the width direction is not limited to a long circular hole as in this example, and could also be a long rectangular hole in the width direction. Moreover, as in the case of the long hole 70a in the width direction illustrated in FIG. 33C, both end sections in the width direction can be formed so as to reach the clamped sections 50d of the displacement bracket 45m. The function of the long hole 70 (70a) in the width direction is the same as the long hole 58 of the fifth example of the first embodiment, and with this long hole 70 (70a) in the width direction, it is possible to reduce the rigidity in the width direction of the rear end section in the axial direction of the displacement bracket 45m. The other construction and functions are the same as those of the fifth example and tenth example of the first embodiment.

Embodiment 1

Example 18

Figure 34:
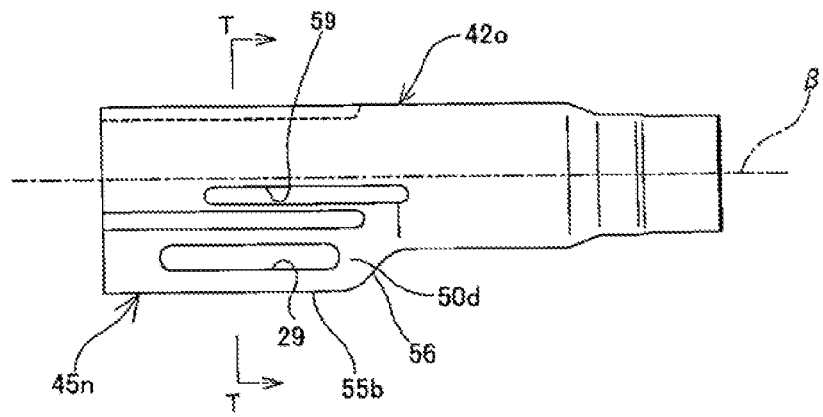
FIG. 34 is a side view illustrating just the removed outer column of an eighteenth example of the first embodiment of the present invention.
Figure 35:
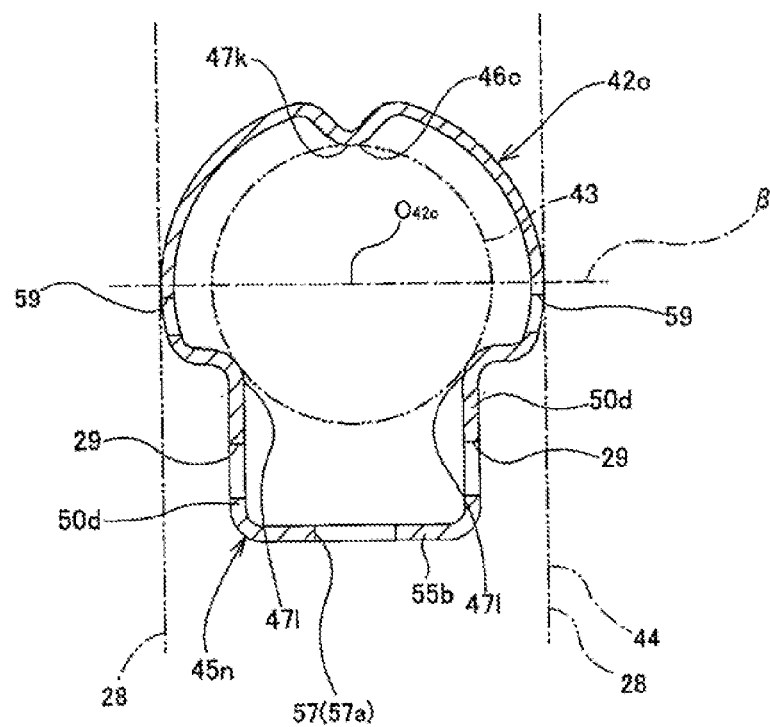
FIG. 35 is a cross-sectional view of section T-T in FIG. 33.

FIG. 34 and FIG. 35 illustrate an eighteenth example of the first embodiment of the present invention. The outer column 42o of the steering column apparatus of this example has the same basic construction as the outer column 42m of the sixteenth example of the first embodiment. The outer column 42o is such that a pair of left and right long column holes 59 that are long in the axial direction are formed in portions of the outer column 42o that extend from the portions a little in front of the center section in the axial direction of the through holes 29 on the column side to the portions a little behind the rear end section in the axial direction of the displacement bracket 45n (connecting section on the rear end side that connects the rear end in the axial direction of the bottom section 55b and the outer circumferential surface of the outer column 42o) such that these long column holes 59 are aligned with each other. The positions of the front ends of these long column holes 59 are not limited to the positions in this example, and could be formed so as to extend to positions further in front of the front end of the through holes 29 on the column side.

The function of these long column holes 59 is the same as that of the long column holes 59 of the seventh example of the first embodiment. In this example as well, the long column holes 59 are formed in the circumferential direction of the outer column 42o further toward the displacement bracket 45n side (downward in FIG. 34 and FIG. 35) than a virtual plane β that passes through the center axis $O_{42o}$ of the inscribed circle (outer circumferential surface of the inner column 43) of the support section 46c of the outer column 42o, and that is orthogonal to the support plate sections 28 of the fastened bracket 44, and above the lower raised sections 47l of the raised sections 47k, 47l of the support section 46c. The other construction and functions are the same as those of the seventh example and sixteenth example.

Embodiment 2

Example 1

FIG. 36 to FIG. 41 illustrate a first example of a second embodiment of the present invention. The steering column apparatus of this example comprises a steering column 71, a displacement bracket 74, a pair of left and right long holes 29 in the forward/backward direction, which are first long holes in the forward/backward direction, a support bracket 75, a pair of left and right long holes 30 in the up/down direction, which are first through holes, a pair of left and right first friction members 76, a pair of left and right second long holes 77 in the forward/backward direction, a pair of left and right second friction members 78, a pair of left and right circular holes 79, which are second through holes, and a pressure apparatus 80.

By fitting together the front end section of the outer column 72 on the rear side with the rear end section of the inner column 73 on the front side such that displacement in the axial direction is possible, the steering column 71 is able to expand or contract over the entire length. This kind of steering column is such that the front end section of the inner column 73 is supported by the vehicle body by way of a pivot shaft 11 (FIG. 51) so that pivotal displacement in the up/down direction is possible.

The displacement bracket 74 is integrally formed with the outer column 72 by hydroforming and is provided on the front end section of the outer column 72 of the steering column 71. The displacement bracket 74 is formed into an arch shape wherein the top end sections of a pair of left and right side plate sections 81 that are parallel with each other are connected together by a top plate section 82. Long holes 29 that are long in the forward/backward direction are formed in portions of the side plate sections 81 that are aligned with each other. Moreover, a locking hole 83 is formed in the center section of the top plate section 82. In the case of this example, the shape of this locking hole 83 is that of a venturi tube where the width dimension of both the front and rear end sections are wider than the middle section.

The support bracket 75 is formed by joining and fastening together an upper bracket element 26 and a lower bracket element 27, which are formed by bending metal plate, such as steel plate, having sufficient strength and rigidity, by welding or the like. The lower bracket element 26 comprises a pair of left and right support plate sections 28 that hold the displacement bracket 74 on both sides in the width direction. The support bracket 75 is such that installation plate sections 84 that are provided on both the left and right end sections of the upper bracket element 26 are supported by the vehicle body so as to be able to break away in the forward direction by way of a locking capsule 85 due to an impact load that is applied during a secondary collision. Long holes 30 that are long in the up/down direction are formed in portions of the support plate sections 28 that are aligned with each other. The direction of these long holes 30 in the up/down direction is a direction where the inclination angle with respect to the horizontal direction is a little less than a partial arc that is centered around the pivot shaft 11. The reason for this is such that the driver can be completely protected during a collision accident by preventing the position of the steering wheel 1 from rising upward regardless of the fit between the outer circumferential surface of the rod shaped member and the front edges of the long holes 30 in the up/down direction. This kind of construction was disclosed in JP2010-52639(A), and is not related to the scope of the present invention, so a detailed explanation is omitted here.

The first friction members 76 are formed by cutting a light alloy material such as an aluminum alloy material that been extruded or drawn to a specified size, and then trimmed to remove any unneeded portion, and each comprises a first friction plate section 86, a connecting plate section 87, a locking section 88, a second ling hole 77 in the forward/backward direction, a support concave section 89, and an locking groove section 90. The first friction plate section 86, except for the portion where the support concave section 89 is provided, is formed into a flat plate shape, and is held between the inside surface of the support plate section 28 (surface on the center side in the width direction that faces the displacement bracket 74) and the second friction member 78. The connecting plate section 87 is bent inward in the width direction from the edge on the top end of the first friction plate section 86 toward the center section in the width direction of the displacement bracket 74. The locking section 88 is hook shaped having an L-shaped cross section, and is bent from the inside end section in the width direction of the connecting plate section 87 in a direction toward the first friction plate section 86. The second long hole 77 in the forward/backward direction is long in the axial direction of the steering column 71 and is formed in the bottom surface of the support concave section 89.

In the case of this example, an impact absorbing sleeve 92 is supported by and fastened to the support concave section 89 of the first friction member 76. This impact absorbing sleeve 92 is made of an elastic material such an elastomer like rubber, vinyl or the like, and has a third long hole 93 in the forward/backward direction that is long in the axial direction of the steering column 71. The length in the forward/backward direction of this third long hole 93 in the forward/backward direction is a little less than the length in the forward/backward direction of the second long hole 77 in the forward/backward direction. The impact absorbing sleeve 92 is fastened to inside of the support concave section 89 with adhesive or the like so that the third long hole 93 in the forward/backward direction is aligned with the second long hole 77 in the forward/backward direction. In this state, the rear end section of the third long hole 93 in the forward/backward direction is located in a portion further near the front than the rear end section of the second long hole 77 in the forward/backward direction, and front end section of the third long hole 93 in the forward/backward direction is located in a portion further near the rear than the front end section of the second long hole 77 in the forward/backward direction. That is, part of the elastic material of the impact absorbing sleeve 92 protrudes further to the portion near the center of the second long hole 77 in the forward/backward direction than the edges on both ends in the forward/backward direction of the second long hole 77 in the forward/backward direction.

The first friction member 76 is assembled in the displacement bracket 74 so that it displaces together with the displacement bracket 74 (in a state where displacement relative to the displacement bracket 74 is prevented). In other words, the first friction member 76 is assembled as illustrated in FIG. 38A and FIG. 38B. First, with the inside surface of the first friction plate section 86 of the first friction member 76 in contact with the outside surface of the displacement bracket 74, the first friction member 76 and displacement bracket 74 are brought close together in the up/down direction. Then, with the bottom surface of the connecting plate section 87 in contact with the top surface of the displacement bracket 74, the first friction member 76 is displaced outward in the width direction with respect to the displacement bracket 74. As a result, the locking section 88 is locked with the edge on the end in the width direction of the locking hole 83, and a space is formed between the inside surface of the first friction plate section 86 and the outside surface of the displacement bracket 74 in which the second friction plate section 91 of the second friction member 78 can be inserted. In this state, the second long hole 77 in the forward/backward direction is aligned with the long hole 29 in the forward/backward direction that is formed in the side plate section 28.

The second friction plate member 78 comprises a flat plate shaped second friction plate section 91 in which a circular hole 79 is formed, and a wave shaped locking plate section 95 that is bent outward in the width direction from the top end section of the second friction plate section 91. The length dimension in the forward/backward direction of the lower half portion of the second friction plate section 91 that is lower than the circular hole 79 is long, such that the friction surface area thereof with the opposing member that it is in contact with is maintained. The circular hole 79 has a diameter that is a little larger than the outer diameter of the rod section 37 of the rod shaped member 19 of the pressure apparatus 80; and this rod shaped member 19 can be inserted though this circular hole 79 such that it is tight with no backlash, however, is such that it can rotate. The second friction member 78 is such that the locking plate section 95 engages with the locking groove section 90 of the first friction member 76 so that it can displace in the direction along the locking groove section 90 (axial direction of the steering column), and so that it is prevented from displacement in the up/down direction, which is the direction perpendicular to the locking groove section 90. In this state, the second friction members 78 are held between the outside surfaces of the side plate sections 81 of the displacement bracket 74 and the first friction members 76. Furthermore, the first friction members 76 are held between the inside surfaces of the pair of support plate sections 28 of the support bracket 75.

Furthermore, with these members in the assembled state, the pressure apparatus 80 is also assembled by inserting the rod shaped member 19 through the long holes 30 in the up/down direction, the third long holes 93 in the forward/backward direction, the second long holes 77 in forward/backward direction, the circular holes 79 and the long holes 29 in the forward/backward direction. This rod shaped member 19 comprises a male screw section 96 that is formed on the tip end section of the rod section 37 (left end section in FIG. 36 and FIG. 37), an outward facing flange section 38 that is formed on the base end section (right end section in FIG. 36 and FIG. 37), and a convex locking section 39 that is formed on the inside surface (left side surface in FIG. 36) of the flange section 38. This convex locking section 39 is a long rectangular shape that is long in the up/down direction and fits inside one of the pair of long holes 30 in the up/down direction (right hole in FIG. 36 and FIG. 37) such that it can move only in the up/down direction. In other words, with the convex locking section fitted inside one of the long holes 30 in the up/down direction, the rod shaped member 19 is not able to rotate.

Figure 36:
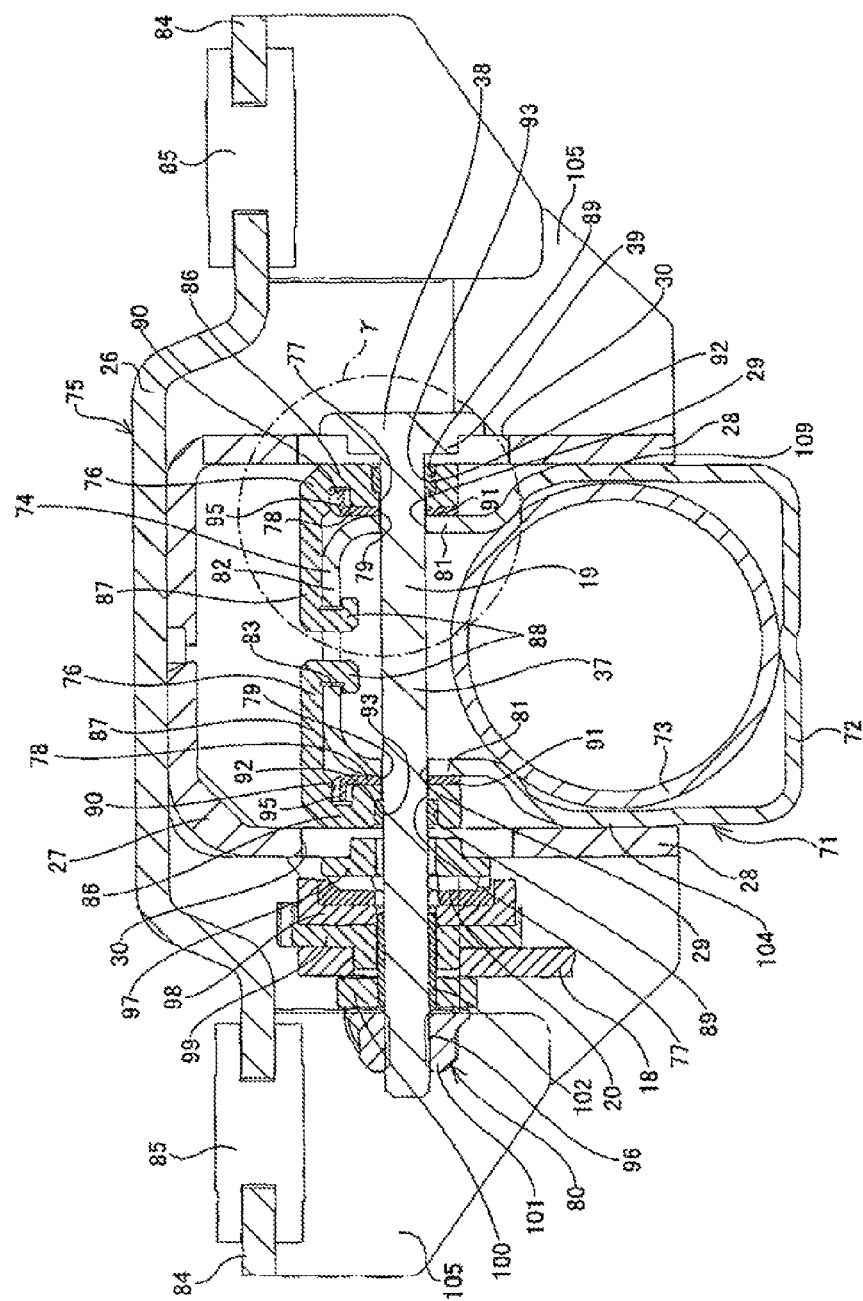
FIG. 36 is a cross-sectional view illustrating a first example of the second embodiment of the present invention.
Figure 37:
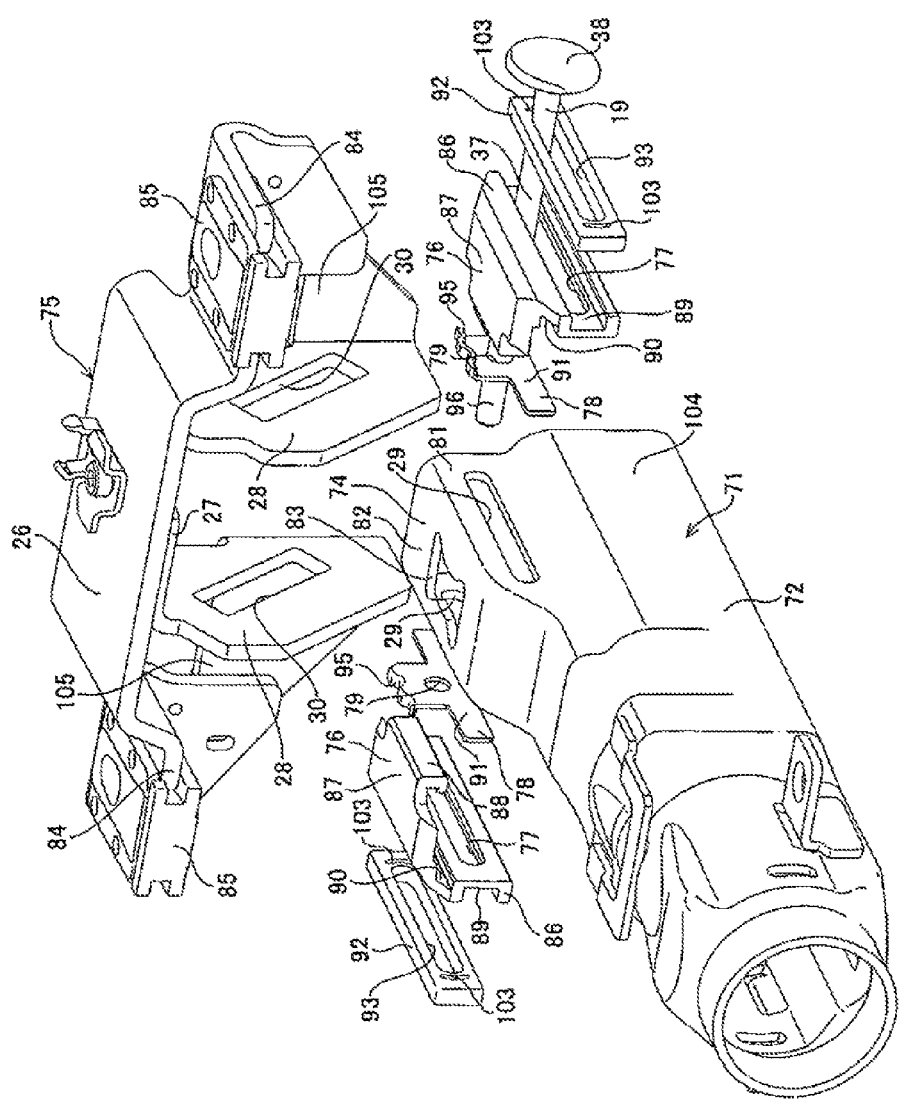
FIG. 37 is a perspective view of the main parts of a second example of a second embodiment of the present invention.
Figure 38:
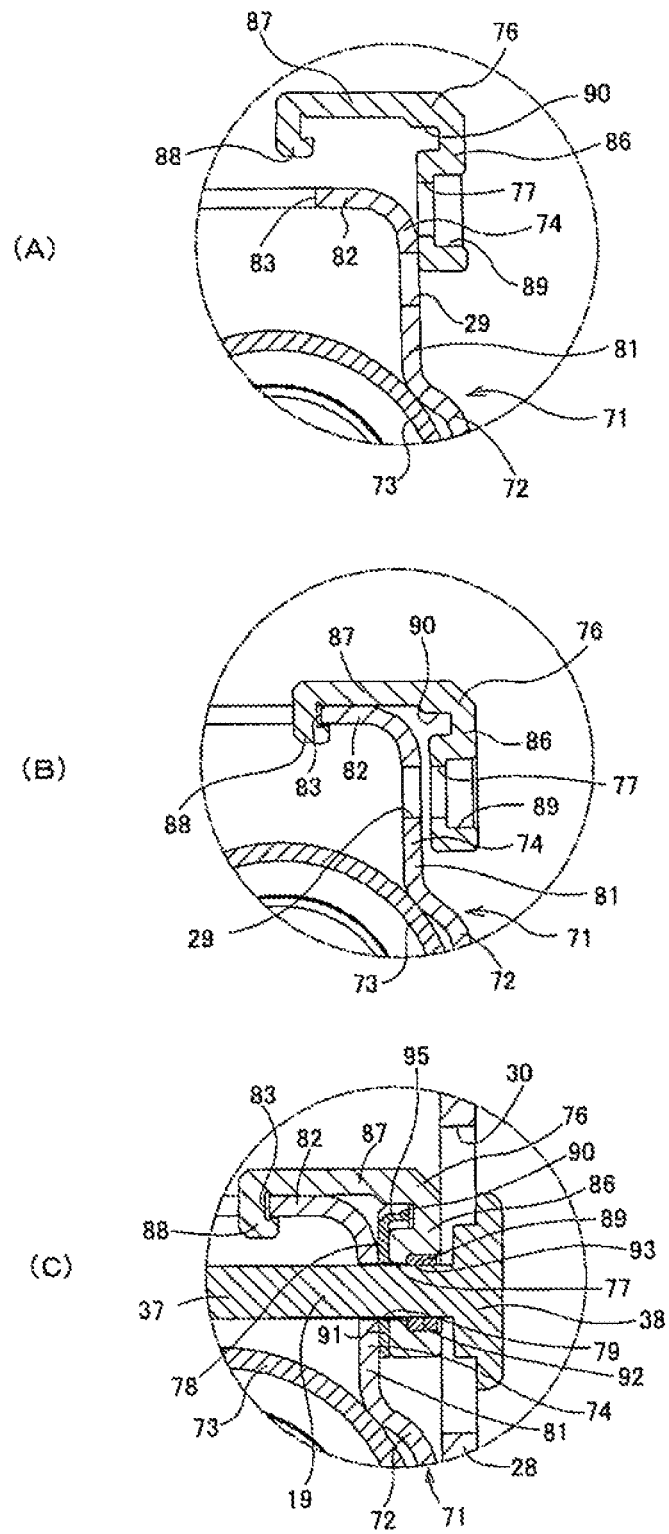
FIGS. 38A to 38C are drawings illustrating the assembly procedure for part γ in FIG. 36.
Figure 39:
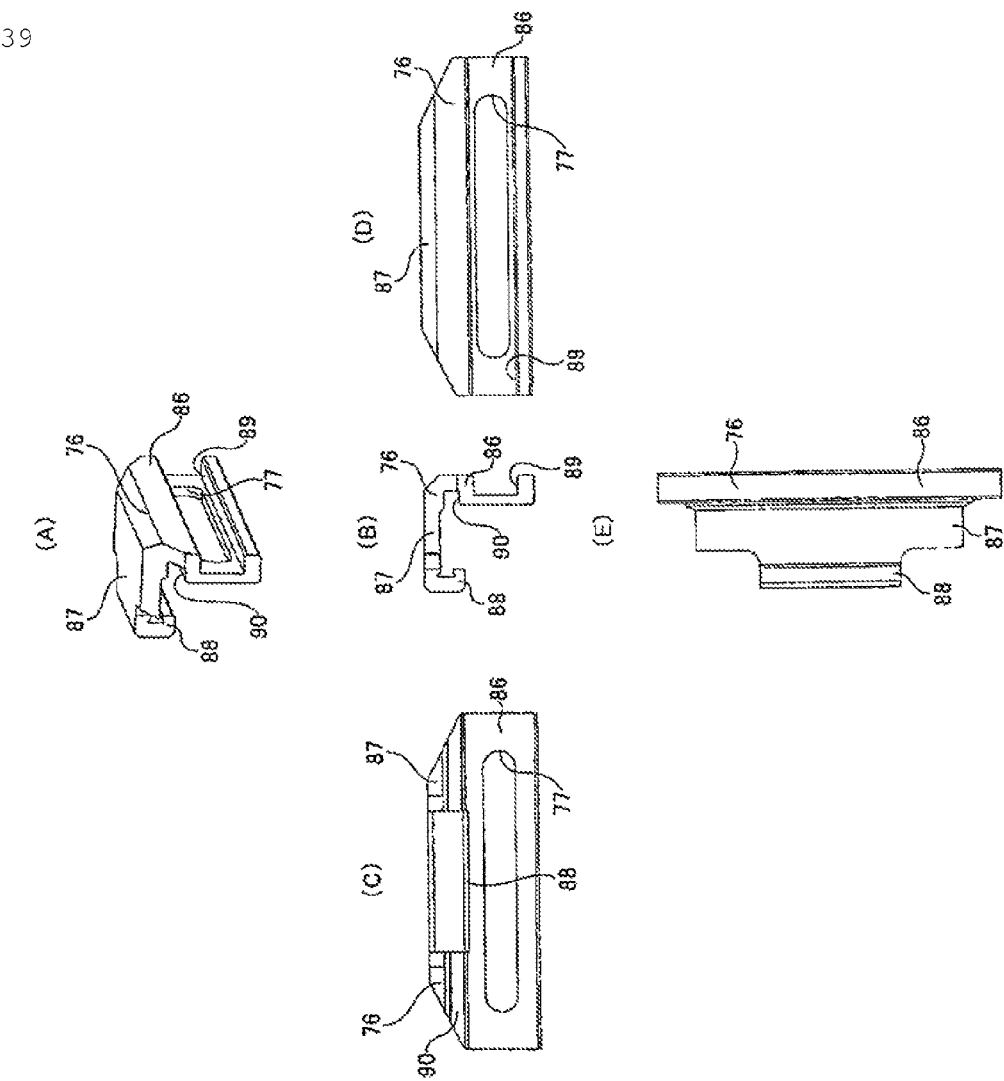
FIG. 39A is a perspective view of a first friction member.
FIG. 39B is a view of the end surface as seen from the front/rear direction.
FIG. 39C is a view of the inside surface as seen from the left in FIG. 39B.
FIG. 39D is a view of the outside surface as seen from the right.
FIG. 39E is a bottom view as seen from underneath.
Figure 40:
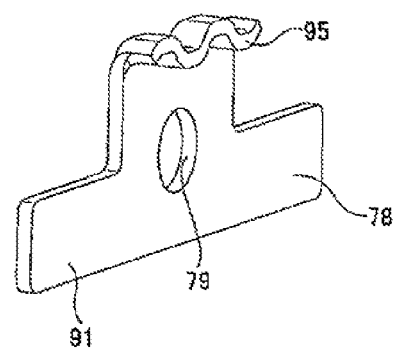
FIG. 40A is a perspective view of a second friction member.
FIG. 40B is a view of the end surface as seen from the front/rear direction.
FIG. 40C is a view of the outside surface as seen from the right side in FIG. 40B.
FIG. 40D is a bottom view as seen from underneath in FIG. 40C.
Figure 40:
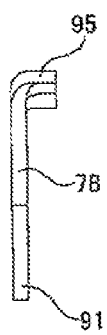
Figure 40:
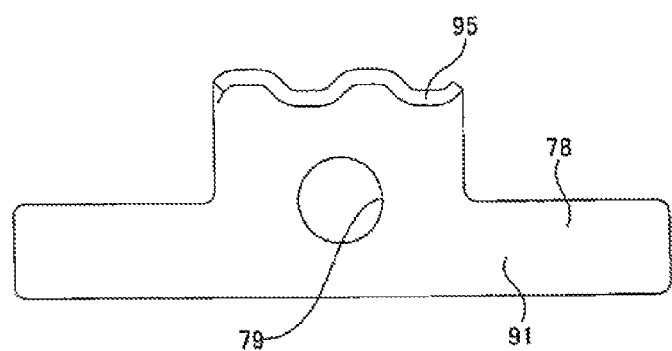
Figure 40:
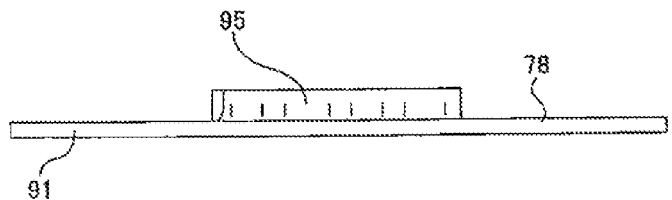
Figure 41:
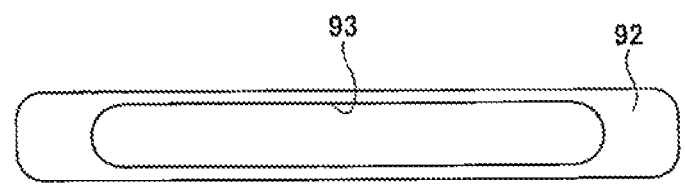
FIG. 41 is a side view of an impact absorbing sleeve.
Figure 42:
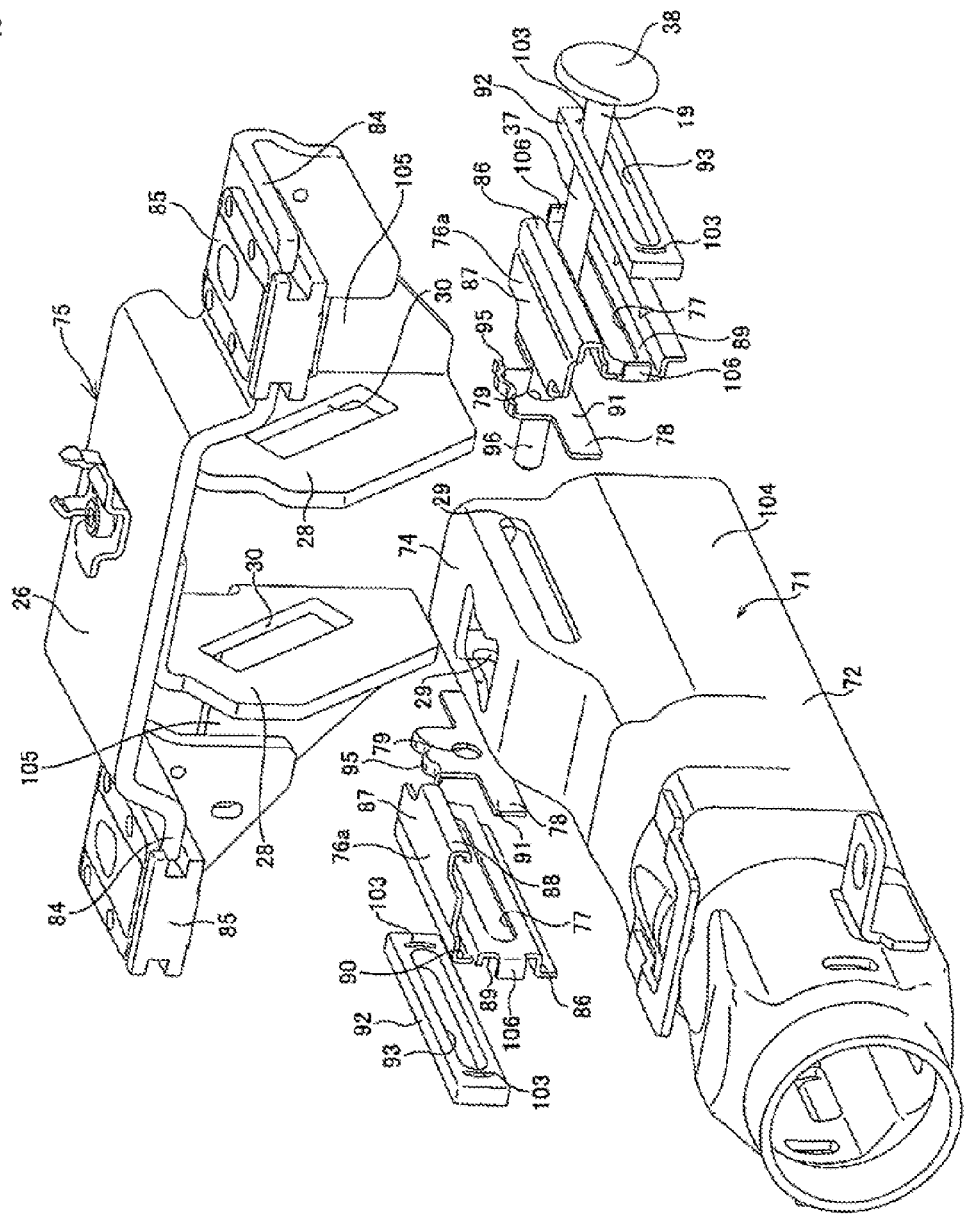
FIG. 42 is a perspective view of the main parts of a second example of the second embodiment of the present invention.
Figure 43:
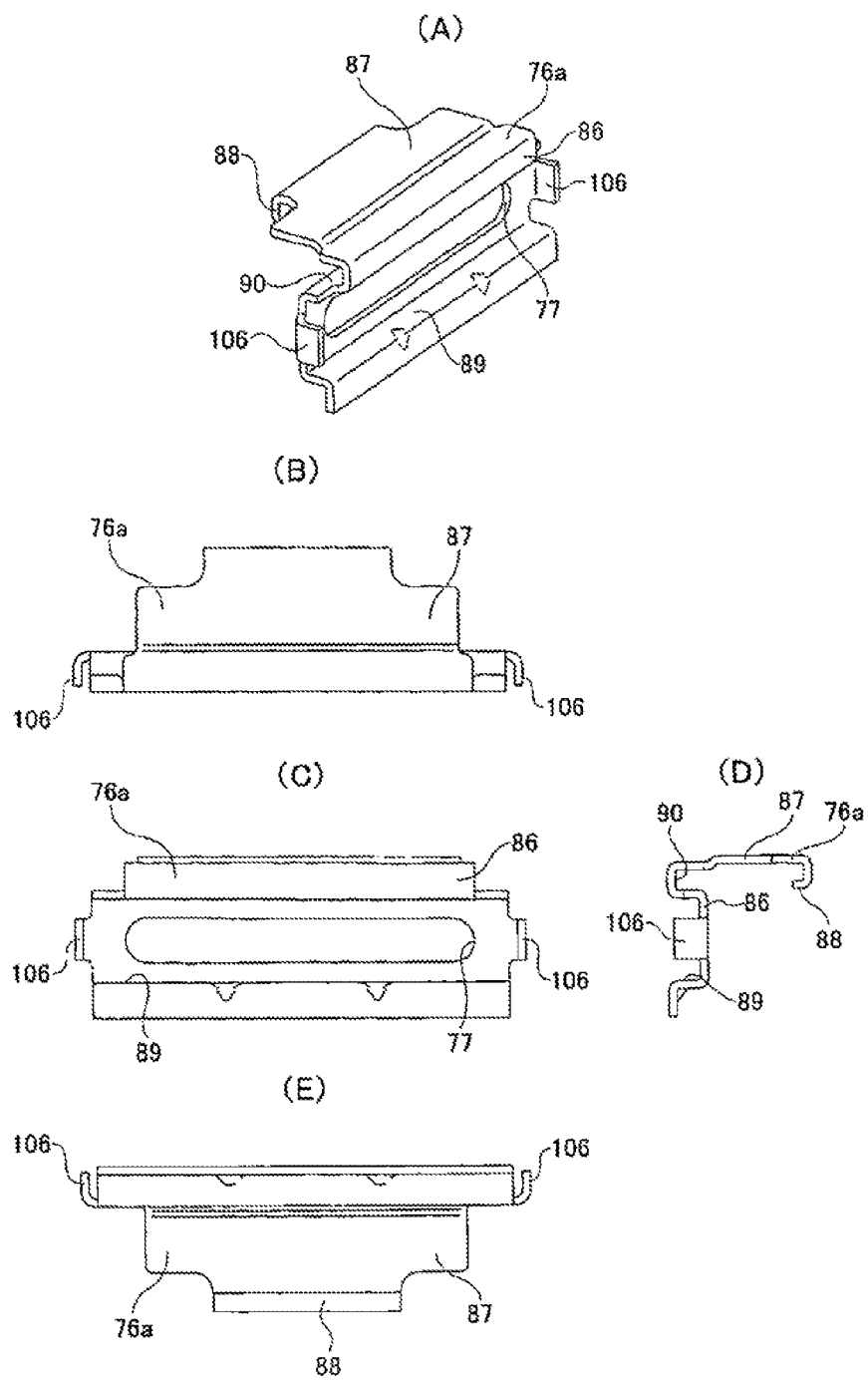
FIG. 43A is a perspective view of a first friction member.
FIG. 43B is a top view.
FIG. 43C is a view of the outside surface as seen from underneath in FIG. 43B.
FIG. 43D is an end view in the forward/backward direction as seen from the right.
FIG. 43E is a bottom view as seen from underneath.

Before the rod shaped member 19 is inserted through the long holes 30 in the up/down direction, the third long holes 93 in the forward/backward direction, the second long holes 77 in the forward/backward direction, the circular holes 79 and the long holes 29 in the forward/backward direction, these members are combined as illustrated in FIG. 36. In FIG. 37, for convenience in order to more easily understand that state of the combined first friction members 76, the second friction members 78 and the impact absorbing sleeves 92, the state of the rod section of the rod shaped member being inserted through the holes 77, 79, 93 that are formed in these members 76, 78, 92 is illustrated. However, in actuality, before this rod shaped member 19 is inserted through the holes 77, 79, 93, it is inserted through one of the long holes 30 in the up/down direction.

When assembling the steering column apparatus of this example, as illustrated in FIG. 36, the support bracket 75, steering column 71, first friction members 76, second friction members 78 and impact absorbing sleeves 92 are combined, and then the rod section 37 of the rod shaped member 19 is inserted through the long holes 30 in the up/down direction, the second long holes 77 in the forward/backward direction, the circular holes 79 and the long holes 29 in the forward/backward direction. Then the pressure apparatus 80 is attached to the portion on the tip end section of the rod section 37 that protrudes from one of the outside surface of the support plate sections 28 by way of the other long hole 30 in the up/down direction (left hole in FIG. 36 and FIG. 37). To construct this pressure apparatus 80, a driven cam 97, a drive cam 98, a holder 99, an adjustment lever 18 and a washer 100 fitted on the tip end section of the rod section 37 in that order from the outside surface of the one of the support plate sections 28. The washer 100 is prevented from displacing in a direction away from the support plate section 28 by a nut 101 that is screwed onto the male screw section 96. The driven cam 97 fits in the other long hole 30 in the up/down direction so as to be able to displace only along this long hole 30 in the up/down direction (being prevented from rotating around the rod section 37). The drive cam 98 and the adjustment lever 18 are combined by way of a holder 99 so that they can rotate together, and they are supported by a radial bearing 102 so that they can rotate around the tip end section of the rod section 37. With this construction, by rotating and driving the drive cam 98 by the adjustment lever 18, the dimension in the axial direction of the cam apparatus 20, which comprises this drive cam 98 and the driven cam 97, can be expanded or contracted.

In the construction of this example, when adjusting the position of the steering wheel 1, the adjustment lever 18 is pivotally displaced downward, reducing the dimension in the axial direction of the cam apparatus 20. As a result, the space between the flange section 38 that is formed on the base end section of the rod shaped member 19 and the driven cam 97 expands, and the areas of friction engagement, or in other words, the contact pressure at the friction engagement sections between the inside surfaces of the support plate sections 28 and the outside surfaces of the first friction plate sections 86, the friction engagement sections between the inside surfaces of the first friction plate sections 86 and the outside surfaces of the second friction plate sections 91, and the friction engagement sections between the inside surfaces of the second friction plate sections 91 and the outside surfaces of the side plate sections 81 is reduced or lost. In this state, the forward/backward position of the steering wheel 1 can be adjusted within the range that the rod section 37 of the rod shaped member 19 can displace inside the long holes 29 in the forward/backward direction. Moreover, the up/down position of the steering wheel 1 can be adjusted within the range that the rod section 37 can displace inside the long holes 30 in the up/down direction.

As this steering wheel 1 is moved in the forward/backward direction to an adjustable limited position, the outer circumferential surface of the rod section 37 of the rod shaped member 19 collides against the front end sections or rear end sections of the inner circumferential surfaces of the third long holes 93 in the forward/backward direction that are formed in the impact absorbing sleeves 92. The outer circumferential surface of the rod section 37 does not collide against the front end sections or rear end sections of the inner circumferential surfaces of the long holes 29 in forward/backward direction or second long holes 77 in the forward/backward direction that are formed in metal members. The impact absorbing sleeves 92 are made of an elastic material, so even though the outer circumferential surface of the rod section 37 collides with the front end sections or rear end sections of the inner circumferential surface of the third long holes 93 in the forward/backward direction, the impact does cause the driver operating the steering wheel 1 to have a strange or uncomfortable feeling. Slits 103 (FIG. 37) are formed between both the front and rear end surfaces of the impact absorbing sleeves 92 and the long holes 93 in the forward/backward direction that are formed the sleeves, making it possible to adjust the absorption of these impact absorbing sleeves 92.

After the up/down position and forward/backward position of the steering wheel 1 has been adjusted to desired positions, the adjustment lever 18 is pivotally displaced upward, expanding the dimension in the axial direction of the cam apparatus 20, and making it possible to maintain the steering wheel 1 at the adjusted position. In other words, in this state, the space between the flange section 38 and the driven cam 97 is reduced and the contact pressure at the areas of frictional engagement is increased. The first friction members 76 are prevented from displacing with respect to the displacement bracket 74 of the steering column 71, and the second friction members are prevented from displacing with respect to the rod shaped member 19. This rod shaped member 19 is supported between the support plate sections 28 in a state such that displacement in the forward/backward direction is prevented. Therefore, the number of friction engagement section that function for maintaining the forward/backward position of the steering wheel 1 can be increased more than when first friction members 76 and second friction members 78 are not provided, or in other words, when the displacement bracket 74 is simply held between the support plate sections 28. Therefore, by increasing the friction surfaces area by increasing the number of friction surfaces, it is possible to increase the holding force for maintaining the forward/backward position of the steering wheel 1 in the adjusted position.

The holding force for maintaining the up/down position of the steering wheel 1 is maintained by friction engagement at two locations each on both the left and right sides between the inside surfaces of the support plate sections 28 and the portions that move up and down together with the steering wheel 1. In other words, in this example, a pair of left and right clamped flat plate sections 104 are formed on the portions of part of the outer column 72 located on bottom side of the displacement bracket 74. When the adjustment lever 18 is pivotally displaced upward, the displacement bracket 74 is held by the top section of the inside surfaces of the support plate sections 28 by way of the first friction members 76 and the second friction members 78, and at the same time the clamped flat plate sections 104 are held by the bottom sections of the inside surfaces of the support plate sections 28. Bent sections 105 are formed on the front end sections of the support plate sections 28, and the rigidity of the support plate sections 28 in the width direction of the support bracket 75 is sufficiently high. Therefore, the force for clamping the clamped flat plate sections 104 by the bottom sections of the inside surfaces of the support plate sections 28 is also sufficiently high. In this way, it is possible to sufficiently increase not only the holding force for maintaining the forward/backward position of the steering wheel 1, but also the holding force for maintaining the up/down position.

The steering column apparatus of this example is such that the work of assembling the first friction members 76 and second friction member 78 that are used for increasing the holding force for maintaining the forward/backward position can be performed easily. Therefore, it is possible to reduce costs by simplifying the work of assembling a telescopic steering apparatus having a large holding force. Moreover, in the case where the steering wheel 1 has been moved to an adjustable limit position in the forward/backward direction, construction that does not give the driver a strange or uncomfortable feeling can also be achieved at low cost.

Embodiment 2

Example 2

FIG. 42 and FIGS. 43A to 43E illustrate a second example of the second embodiment of the present invention. In this example, the pair of left and right first friction members 76a are made by bending an intermediate raw material that is obtained by punching a ferrous alloy plate such as carbon steel plate or stainless steel plate. A pair of bent sections 106 are formed on both the front and rear end sections of the supporting concave section 89 that is formed in the first friction member 76a so as to close part of the openings on both the front and rear ends of the supporting concave section 89. The space between these bent sections 106 coincides with the length in the forward/backward direction of the impact absorbing sleeve 92 that is supported inside the supporting concave section 89. The impact absorbing sleeves 92 that are held in the support concave sections 89 of the first friction members 76a are held on both the front and rear sides by the bent sections 106, preventing these impact absorbing sleeves 92 from shifting in the forward/backward direction with respect to the first friction members 76a. Therefore, in this example, the impact absorbing sleeves 92 do not need to be adhered to the first friction members 76a. The other construction and functions are the same as in the first example of the second embodiment.

Embodiment 2

Example 3

Figure 44:
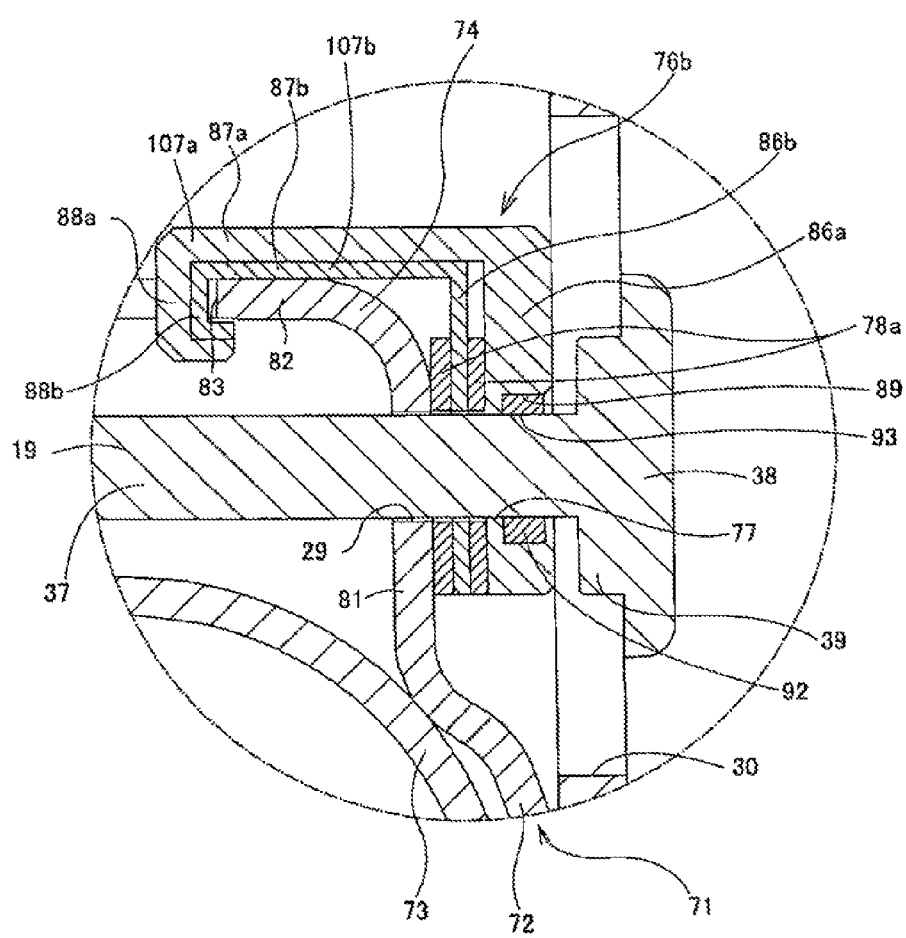
FIG. 44 illustrates a third example of the second embodiment of the present invention, and is a drawing similar to FIG. 38C.

FIG. 44 illustrates a third example of the second embodiment of the present invention. In this example, the first friction members 76b comprise a combination of a pair of first friction member elements 107a, 107b. These first friction member elements 107a, 107b are combined such that both the connecting plate sections 87a, 87b and the locking sections 88a, 88b overlap, and such that the first friction plate sections 86a, 86b are separated. In this state, as in the case of the first example of the second embodiment, the first friction members 76b are supported by the displacement bracket 74 so that displacement with the displacement bracket 74 is possible. Moreover, in this example, there two flat plate shaped second friction members 78a on both sides of the displacement bracket 74 for a total of four. With these second friction members 78a fitted around the rod section 37 of the rod shaped member 19, they are held between both sides surfaces of one first friction plate section 86b and the outside surface of the displacement bracket 74 and the inside surface of the other first friction plate section 86a.

In this example, by further increasing the number of frictions surfaces when the dimension in the axial direction of the cam apparatus 20 is expanded (FIG. 46) by pivotally displacing the adjustment lever 18 upward, the holding force for maintaining the forward/backward position of the steering wheel 1 after adjustment is further increased. The other construction and functions are the same as same as in the first example of the second embodiment.

Embodiment 2

Example 4

Figure 45:
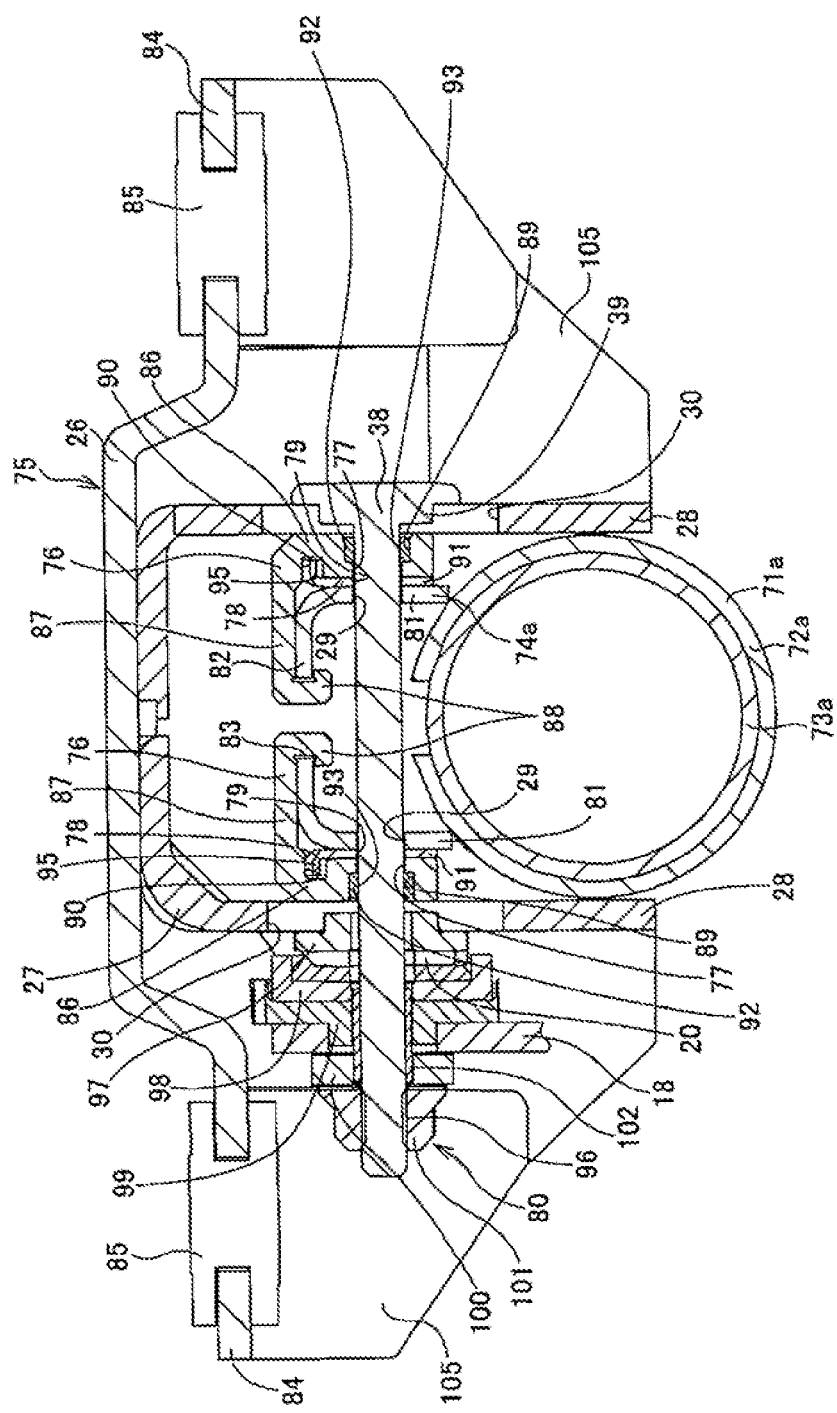
FIG. 45 illustrates a fourth example of the second embodiment of the present invention, and is a drawing similar to FIG. 36C.
Figure 46:
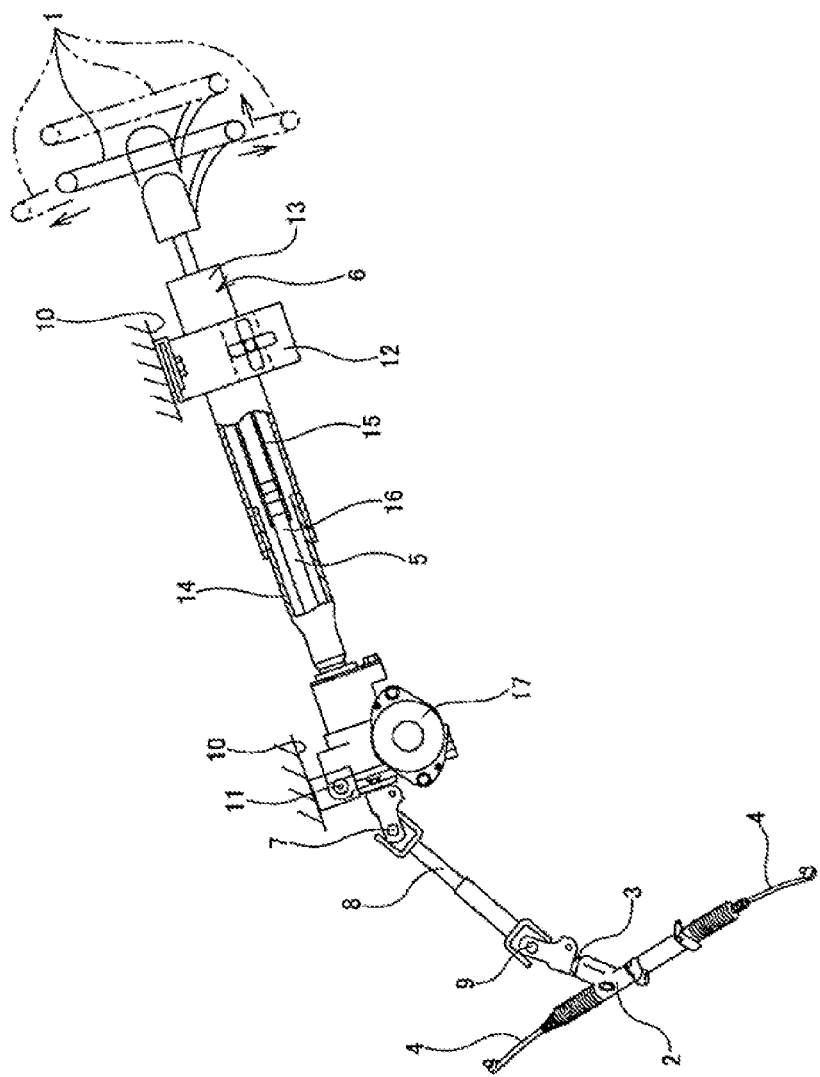
FIG. 46 is a partial cross-sectional side view illustrating a first example of a telescopic steering apparatus for an automobile.

FIG. 45 illustrates a fourth example of the second embodiment of the present invention. In this example, the outer column 72a and the displacement bracket 74a of the steering column 71a are joined and fastened together separate members by welding. The construction and functions of the other parts are the same as in the first example of the second embodiment.

INDUSTRIAL APPLICABILITY

In the first aspect of the present invention, except for part, a steering apparatus comprising a telescopic mechanism for adjusting the forward/backward position of a steering wheel was explained. However, the present invention, as explained in the tenth and eleventh examples of the first embodiment and the in the second embodiment, can also be applied to construction that comprises a tilt mechanism for adjusting the up/down position of the steering wheel. On the other hand, in the example that was explained using construction comprising a tilt mechanism, it is possible to omit the tilt mechanism. Furthermore, in the sixth example, fourteenth example and fifteenth example of the first embodiment construction wherein the displacement bracket is provided on the top side of the steering column was illustrated, however, it is also possible to provide the displacement bracket on the top side of the steering column in the other examples as well. In regards to this, it is sufficient to just simply turn the displacement bracket and steering column upside down. The front and rear position of the outer column and inner column of the steering column also does not matter. The present invention can be applied to construction where the inner column is on the rear side and to construction where the outer column is on the rear side.

EXPLANATION OF THE REFERENCE NUMBERS

1 Steering wheel
2 Steering gear unit
3 Input shaft
4 Tie rod
5 Steering shaft
6, 6a to 6d Steering column
7 Universal joint
8 Intermediate shaft
9 Universal joint
10 Vehicle body
11 Pivot shaft
12, 12a Fastened bracket
13, 13a to 13d Outer column
14, 14a Inner column
15 Outer shaft 16 Inner shaft
17 Electric motor
18 Adjustment lever
19 Rod shaped member
20 Cam apparatus
21 Cam member
22, 22a, 22b Displacement bracket
23 Raised section
24 Support tab
25 Clamped section
26 Upper bracket element
27 Lower bracket element
28 Support plate section
29 Long hole in the forward/backward direction (though hole on the column side)
30 Long hole in the up/down direction
31 First friction plate
32 Second friction plate
33 First long hole
34 Second long hole
35 First locking screw
36 Second locking screw
37 Rod section
38 Flange section
39 Locking convex section
40 Pressure plate
41 Steering column
42, 42a to 42o Outer column
43 Inner column
44 Fastened bracket
45, 45a to 45m Displacement bracket
46, 46a to 46c Support section
47a to 47l Raised section
48, 48a, 48b Concave section
49 Portion where the inner diameter can be expanded or contracted
50, 50a to 50e Clamped section
51, 51a to 51c Inclined section
52 Connecting section
53 Head section
54 Nut
55, 55a to 55c Bottom section
56, 56a Connecting section
57, 57a, 57b Long hole
58 Long hole
59 Long column hole
60, 60a Front support section
61, 61a Rear support section
62, 62a First friction plate
63, 63a Second friction plate
64 Through hole on the vehicle side
65, 65a Through hole on the first friction plate side
66 Guide pin
67, 67a Through hole on the second friction plate side
68 Friction plate section
69 Connecting section
70, 70a Long hole in the width direction
71, 71a Steering column
72, 72a Outer column
73 Inner column
74, 74a Displacement bracket
75 Support bracket (fastened bracket)
76, 76a, 76b First friction member
77 Second long hole in the forward/backward direction
78, 78a Second friction member
79 Circular hole
80 Pressure apparatus
81 Side plate section
82 Top plate section
83 Locking hole
84 Installation plate section
85 Locking capsule
86, 86a, 86b First friction plate section
87, 87a, 87b Connecting plate section
88, 88a, 88b Locking section
89 Supporting concave section
90 Locking groove section
91 Second friction plate section
92 Impact absorbing sleeve
93 Third long hole in the forward/backward direction
94 Friction plate section
95 Locking plate section
96 Male screw section
97 Driven cam
98 Drive cam
99 Holder
100 Washer
101 Nut
102 Radial bearing
103 Slit
104 Clamped flat plate section
105 Bent plate section
106 Bent section
107a, 107b First friction member element

What is claimed is:

1. A steering column apparatus for a telescopic steering apparatus, comprising:

a steering column provided with: a cylindrical shaped outer column having a portion of which the inner diameter of at least part in the axial direction can expand and contract and support sections that are formed in three locations or more in the circumferential direction of the inner circumferential surface, the outer column with the support sections obtained by swelling a hollow tube outward in the radial direction; and a cylindrical shaped inner column having an outer circumferential surface that comes in contact with the support sections in at least three locations in the circumferential direction, the inner column fitted inside the inner diameter side of the outer column and supported by the support sections so as to move in the axial direction; this steering column supporting a steering shaft, to which a steering wheel is mounted to the rear end section, on the inside thereof such that the steering shaft can rotate freely;

a fastened bracket provided with: a portion fastened to the vehicle body; a pair of support plate sections supported by the portion fastened to the vehicle body, and holding the portion of the outer column, of which the inner diameter can expand and contract, on both sides in the width direction; and through holes on the vehicle side formed in positions in the pair of support plate section that are aligned with each other;

a displacement bracket provided with: a pair of clamped sections, that are integrally formed with the outer column by swelling the hollow tube, and that are clamped by the pair of support plate sections; and though holes on the column side formed in the clamped sections that are long in the axial direction of the outer column;

a mechanism provided with: a rod shaped member that is arranged in the width direction passing through the through holes on the vehicle side and the through holes on the column side, the mechanism expanding or contracting the space between the pair of support plate sections according to rotation of the rod shaped member; and an adjustment lever provided on the base end section of the rod shaped member so as to rotate the rod shaped member.

2. The steering column apparatus according to claim 1, wherein
the outer column is located in rearward of the inner column;
the displacement bracket further comprises a pair of inclined sections, these inclined sections being such that one end is connected to the pair of clamped sections, the inclined sections then extending from the pair of clamped sections in the width direction toward each other, with the other ends connected to each other by way of a connecting section; and
in part of the displacement bracket that is aligned with the through holes on the column side in the axial direction of the outer column, the angle that is formed between the pair of inclined sections and the direction in which the support plate sections apply pressure to the clamped sections becomes greater going from the front toward the rear.

3. The steering column apparatus according to claim 1, wherein
the outer column is located in rearward of the inner column;
the displacement bracket further comprises a bottom section that connects the pair of clamped sections in the width direction; and
a long hole that is long in the axial direction is formed in the middle section in the width direction of this bottom section.

4. The steering column apparatus according to claim 1, wherein
the displacement bracket further comprises a bottom section that connects the pair of clamped section in the width direction; and
a long hole is formed in the rear end section in the axial direction of the displacement bracket that is continuous from one of the clamped sections to the other clamped section by way of the bottom section.

5. The steering column apparatus according to claim 1, wherein
long column holes that are long in the axial direction of the outer column are formed in a portion of the outer column that are partly aligned with the through holes on the column side in the axial direction.

6. The steering column apparatus according to claim 5, wherein
the long column holes are formed further on the displacement bracket side in the circumferential direction of the outer column than a virtual plane that passes through the center axis of the inscribed circle of the support sections and is orthogonal to the pair of support plate sections of the fastened bracket.

7. The steering column apparatus according to claim 5, wherein
the displacement bracket further comprises a bottom section that connects the pair of clamped sections in the width direction;
the rear end in the axial direction of the bottom section and the outer circumferential surface of the outer column are connected by a connecting section on the rear end side; and
the positions in the axial direction of the rear end sections of the long column holes are further toward the rear than the connecting section on the rear end side.

8. The steering column apparatus according to claim 1, wherein
the support sections are formed at two positions separated in the axial direction of the outer column both of which exist in a section where the outer column overlaps in the circumferential direction with the inner column in a state where the dimension in the axial direction of the overlapping section is shortest.

9. The steering column apparatus according to claim 8, wherein
the support sections are formed at the two positions on the inner circumferential surface of the outer column which exist in a portion which corresponds in the axial direction of the outer column with a portion near the front end of the displacement bracket, and in a portion which corresponds in the axial direction of the outer column with a portion near the rear end of the displacement bracket.

10. The steering column apparatus according to claim 8, wherein
a first friction plate that is supported by the displacement bracket, and a second friction plate that is supported by a rod shape member so as to be able to move with the operation of the rod shaped member, are alternately placed in each of the portions between the outside surfaces of the pair of clamped sections of the displacement bracket and the inside surfaces of the pair of support plate sections of the fastened bracket.

* * * * *